(12) United States Patent
Kato et al.

(10) Patent No.: US 10,277,845 B2
(45) Date of Patent: Apr. 30, 2019

(54) DRIVING METHOD FOR SOLID-STATE IMAGING DEVICE, AND SOLID-STATE IMAGING DEVICE

(71) Applicant: OLYMPUS CORPORATION, Hachioji-shi, Tokyo (JP)

(72) Inventors: Hideki Kato, Tokyo (JP); Yasunari Harada, Ebina (JP); Masato Osawa, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/902,014

(22) Filed: Feb. 22, 2018

(65) Prior Publication Data

US 2018/0184026 A1   Jun. 28, 2018

Related U.S. Application Data

(63) Continuation of application No. PCT/JP2015/077784, filed on Sep. 30, 2015.

(51) Int. Cl.
*H04N 5/335* (2011.01)
*H04N 5/363* (2011.01)
(Continued)

(52) U.S. Cl.
CPC .......... *H04N 5/363* (2013.01); *H04N 5/3575* (2013.01); *H04N 5/365* (2013.01); *H04N 5/378* (2013.01)

(58) Field of Classification Search
CPC .................................................... H04N 5/365
See application file for complete search history.

(56) References Cited

U.S. PATENT DOCUMENTS 9,344,652 B2 * 5/2016 Itano ...................... H04N 5/378
2003/0193585 A1 10/2003 Ogura et al.
(Continued)

FOREIGN PATENT DOCUMENTS

JP   2003-259227 A   9/2003
JP   2005-143078 A   6/2005
(Continued)

OTHER PUBLICATIONS

Yonemoto, "Basic and application of CCD/CMOS image sensor," CQ Publishing Co., Ltd., pp. 119-120, 194-198, Aug. 10, 2003, (10 sheets, including partial English translation).

(Continued)

Primary Examiner — Gary C Vieaux
(74) Attorney, Agent, or Firm — Westerman, Hattori, Daniels & Adrian, LLP

(57) ABSTRACT

There is provided a method of driving a solid-state imaging device, the solid-state imaging device including a plurality of column circuits which are arranged for each column of pixels and an amplification and selection circuit configured to amplify a differential signal based on a column pixel signal and a column reset signal, the method including causing the amplification and selection circuit to perform at least two operations among a first operation of sampling the column pixel signal, a second operation of sampling the column reset signal, and a third operation of output the amplified differential signal in parallel in the same period; and causing components connected to different horizontal signal lines to perform operations corresponding to the first to third operation in that order, and causing the components to perform different operations in parallel in the same period with respect to the first to third operations.

6 Claims, 16 Drawing Sheets

(51) Int. Cl.
    *H04N 5/365*     (2011.01)
    *H04N 5/378*     (2011.01)
    *H04N 5/357*     (2011.01)

(56) References Cited

U.S. PATENT DOCUMENTS

2005/0083420 A1     4/2005   Koseki et al.
2007/0229687 A1   10/2007   Hiyama et al.
2009/0147117 A1     6/2009   Suzuki et al.

FOREIGN PATENT DOCUMENTS

JP     2007-274591 A     10/2007
JP     2009-141631        6/2009

OTHER PUBLICATIONS

International Search Report dated Dec. 15, 2015, issued in counterpart International Application No. PCT/JP2015/077784 (4 pages, including Japanese original and English translation).

\* cited by examiner

DRIVING METHOD FOR SOLID-STATE IMAGING DEVICE, AND SOLID-STATE IMAGING DEVICE

The present application is a continuation application based on PCT Patent Application No. PCT/JP2015/077784, filed on Sep. 30, 2015.

TECHNICAL FIELD

The present invention relates to a method of driving a solid-state imaging device, and a solid-state imaging device.

BACKGROUND ART

As a configuration of a conventional solid-state imaging device, for example, in Kazuya Yonemoto's "Basic and application of CCD/CMOS image sensor," CQ Publishing Co., Ltd., pp. 119 to 120 and 194 to 198 published issued on Aug. 10, 2003 "(hereinafter referred to as "Document 1"), a configuration of a solid-state imaging device including a column circuit for removing noise in pixels such as reset noise (KTC noise) for each column of pixels arranged in a two-dimensional matrix is disclosed. This column circuit removes a noise component included in an optical signal by performing a correlated double sampling (CDS) process of taking a difference between an optical signal photoelectrically converted by a pixel and a reset signal when the pixel is reset.

FIG. 14 is a circuit diagram showing a schematic configuration of a conventional solid-state imaging device including a column circuit. In FIG. 14, a configuration of a conventional solid-state imaging device 900 including a plurality of pixels 911 arranged in a two-dimensional matrix, a plurality of column circuits 950 corresponding to each column of the pixels 911, and an output amplifier 990 configured to amplify an optical signal after noise removal output from each column circuit 950 and output the amplified signal is shown. The column circuit 950 includes sampling switches 951, clamp capacitors 952, clamp switches 953, sampling capacitors 954, column output amplifiers 955, and column selection switches 956.

In the solid-state imaging device 900, optical signals and reset signals from the pixels 911 arranged in the same row are output to the corresponding column circuits 950.

Each of the column circuits 950 holds an optical signal after noise removal by taking the difference between the optical signal and the reset signal according to the configuration of the sampling switch 951, the clamp capacitor 952, the clamp switch 953, and the sampling capacitor 954. Thereafter, the column circuits 950 sequentially output optical signals after noise removal to the output amplifier 990 via the column output amplifiers 955 and the column selection switches 956 in accordance with selection of a column. Thereby, the output amplifier 990 amplifies the optical signals after the noise removal and sequentially outputs the amplified optical signals as final output signals (optical signals) output from the solid-state imaging device 900.

Meanwhile, although a noise component such as reset noise in each pixel can be removed in the solid-state imaging device 900 having the configuration shown in FIG. 14, other fixed pattern noise (FPN) also occurs and image quality will deteriorate. This fixed pattern noise is caused by a difference in characteristics between the column circuits 950 connected to the columns of the pixels 911 in the solid-state imaging device 900 having the configuration shown in FIG. 14, more specifically, a difference (variation) in characteristics between the column output amplifiers 955 provided in the column circuits 950.

Thus, Document 1 also discloses a solid-state imaging device with a configuration including an output circuit configured to output a signal of a level according to a difference between a signal level of a held optical signal and a signal level of a held reset signal as an output signal after each of the optical signal output from the pixel and the reset signal is temporarily held or sampled in the column circuit. However, in the solid-state imaging device with this configuration, it is not possible to completely remove fixed pattern noise due to variations in column circuits because sampling circuits provided in the column circuit (a sampling circuit for holding or sampling the optical signal and a sampling circuit for holding or sampling the reset signal) are controlled by different transistors.

Therefore, a solid-state imaging device having a configuration in which fixed pattern noise caused by the column circuit is removed by further sampling and holding the optical signal after noise removal output by the column circuit and the reset signal when the column circuit is reset can be conceived. In the solid-state imaging device with this configuration, a correlated double sampling circuit for sampling and holding each of the optical signal output from the column circuit and the reset signal and performing the correlated double sampling process is provided at a position of a stage previous to the output amplifier. A configuration in which the correlated double sampling circuit is provided at the position of the stage previous to the output amplifier has been applied to the conventional solid-state imaging device configured without a column circuit.

FIG. 15 is a circuit diagram showing a schematic configuration of a conventional solid-state imaging device including the correlated double sampling circuit in a stage previous to an output amplifier. In FIG. 15, an example of a configuration of a conventional solid-state imaging device 910 provided with a correlated double sampling (CDS) circuit 1000 configured to perform the correlated double sampling process by sampling and holding an optical signal and a reset signal after noise removal output from the column circuit 950 at a position previous to the output amplifier 990 provided in the conventional solid-state imaging device 900 shown in FIG. 14 is shown. The CDS circuit 1000 includes three sample-hold circuits (sample-hold circuits 1001 to 1003) and a differential amplifier 1004.

In the solid-state imaging device 910, column circuits 950 arranged in columns are sequentially selected, and final output signals (optical signals) corresponding to pixels 911 arranged in the columns are sequentially output. At this time, the CDS circuit 1000 samples and holds the reset signal of the column circuit 950 and the optical signal after the noise removal input from the column circuit 950 of the selected column via a horizontal signal line 960, and sequentially outputs a difference signal CDS-Out obtained by taking a difference between the sampled and held reset signal and the sampled and held optical signal after the noise removal to the output amplifier 990 as the optical signal after the noise removal output by the column circuit 950 of the selected column.

More specifically, in the CDS circuit 1000, the sample-hold circuit 1001 first holds (samples) the optical signal after the noise removal output by the column circuit 950 of a selected column in accordance with a sample-hold signal SHD. Thereafter, in the CDS circuit 1000, the sample-hold circuit 1003 holds (samples) the reset signal of the column circuit 950 of the selected column in accordance with a sample-hold signal SHP, and the sample-hold circuit 1002 holds (samples) the optical signal after the noise removal held in the sample-hold circuit 1001 again by moving the optical signal in accordance with the sample-hold signal SHP. In the CDS circuit 1000, the differential amplifier 1004 outputs the difference signal CDS-Out obtained by taking a difference between the optical signal after the noise removal held in the sample-hold circuit 1002 and the reset signal held in the sample-hold circuit 1003 to the output amplifier 990. Thereby, the output amplifier 990 amplifies the difference signal CDS-Out output from the CDS circuit 1000, i.e., the optical signal from which noise components in the pixel 911 and the column circuit 950 are removed, and outputs the amplified difference signal CDS-Out (optical signal) as a final output signal (optical signal) output by the solid-state imaging device 910.

Here, a driving timing in the solid-state imaging device 910 will be described. FIG. 16 is a timing chart showing an example of a driving timing in the conventional solid-state imaging device 910 including the correlated double sampling circuit (the CDS circuit 1000) in a stage previous to the output amplifier 990. In FIG. 16, an example of the driving timing when three columns are sequentially selected and the final output signal (optical signal) corresponding to the pixel 911 of each column is output is shown. More specifically, in FIG. 16, timings of a column selection control signal CSEL(1) for selecting the pixel 911 of a first column, a column selection control signal CSEL(2) for selecting the pixel 911 of a second column, a column selection control signal CSEL(3) for selecting the pixel 911 of a third column, the sample-hold signal SHD for controlling the holding (sampling) of the optical signal after noise removal, and the sample-hold signal SHP for controlling the holding (sampling) of the reset signal are shown. Also, in FIG. 16, a signal level of the difference signal CDS-Out from which noise is removed from a signal level of the horizontal signal line 960 by which each column circuit 950 outputs a signal is shown.

As shown in FIG. 16, in the CDS circuit 1000, during the period in which the column circuit 950 is selected by the column selection control signal CSEL(1), the column selection control signal CSEL(2), or the column selection control signal CSEL(3), the optical signal after noise removal output by the selected column circuit 950 is held (sampled) in the sample-hold circuit 1001 in accordance with the sample-hold signal SHD. Thereafter, in the CDS circuit 1000, the reset signal of the selected column circuit 950 is held (sampled) in the sample-hold circuit 1003 in accordance with the sample-hold signal SHP. Also, in the CDS circuit 1000, the optical signal after the noise removal held in the sample-hold circuit 1001 in accordance with the sample-hold signal SHP is moved to the sample-hold circuit 1002 and held (sampled). Thereby, in the CDS circuit 1000, the differential amplifier 1004 outputs the difference signal CDS-Out obtained by taking a difference between the optical signal after the noise removal held in the sample-hold circuit 1002 and the reset signal held in the sample-hold circuit 1003. At this time, the fixed pattern noise due to a variation in the column circuit 950 is removed from the difference signal CDS-Out.

SUMMARY OF INVENTION

According to a first aspect of the present invention, there is a provided a method of driving a solid-state imaging device, the solid-state imaging device comprising: a plurality of column circuits which are arranged for each column of a plurality of pixels arranged in a matrix and configured to output a column pixel signal according to a pixel signal output by a pixel of a corresponding column, to which the plurality column circuits are periodically classified and connected, the plurality of horizontal signal lines being configured to transfer the column pixel signal output by any one of the connected column circuits and a column reset signal when the column circuit having output the column pixel signal is reset, and an amplification and selection circuit configured to select and sequentially sample either of the column pixel signal and the column reset signal transferred by each of the plurality of horizontal signal lines, and to amplify a differential signal based on the column pixel signal and the column reset signal output from the same column circuit and output the amplified differential signal, the method comprising: causing the amplification and selection circuit to perform at least two operations among a first operation of sampling the column pixel signal, a second operation of sampling the column reset signal, and a third operation of amplifying the differential signal and outputting the amplified differential signal in parallel in the same period; and causing components connected to different horizontal signal lines to perform operations corresponding to the first operation, the second operation, and the third operation in that order, and causing the components to perform different operations in parallel in the same period with respect to the first to third operations.

According to a second aspect of the present invention, in the method of driving the solid-state imaging device of the above-described first aspect, the amplification and selection circuit may include: a plurality of column output holding units corresponding to the plurality of horizontal signal lines, including a sampling capacitor configured to hold the column pixel signal transferred by the corresponding horizontal signal line in the first operation and to hold the column reset signal transferred by the corresponding horizontal signal line in the second operation, and configured to output a differential signal into which a signal of a difference between the column pixel signal and the column reset signal held in the sampling capacitor is converted in the third operation; a feedback unit corresponding to all the plurality of column output holding units, including a first feedback capacitor and a second feedback capacitor for amplifying a signal, and configured to alternately switch a feedback capacitor for amplifying the differential signal output from the column output holding unit to either one of the first feedback capacitor and the second feedback capacitor for every third operation; and a differential amplification circuit configured to amplify the output differential signal to output the amplified differential signal as the difference signal in accordance with a ratio between the sampling capacitor provided in the column output holding unit configured to output the differential signal and the first feedback capacitor or the second feedback capacitor to which the feedback capacitor is switched in the third operation, and, during a period in which the differential amplification circuit performs the third operation, the method may include, causing one column circuit and another column circuit among adjacent column circuits connected to the horizontal signal lines different from the horizontal signal line corresponding to the column output holding unit configured to output the differential signal in the third operation to output the column pixel signal and the column reset signal, respectively, in parallel in the same period; causing the column output holding unit, which performs the first operation corresponding to the horizontal signal line by which the column pixel signal is transferred, to hold the transferred column pixel signal; causing the column output holding unit, which performs the second operation corresponding to the horizontal signal line by which the column reset signal is transferred, to hold the transferred column reset signal; and causing the differential amplification circuit to be initialized during a period in which the first operation, the second operation, and the third operation are switched.

According to a third aspect of the present invention, in the method of driving the solid-state imaging device according to the above-described first aspect, the amplification and selection circuit may include: a plurality of column output holding units corresponding to the plurality of horizontal signal lines, including a sampling capacitor configured to hold the column pixel signal transferred by the corresponding horizontal signal line in the first operation and to hold the column reset signal transferred by the corresponding horizontal signal line in the second operation, and configured to output a differential signal into which a signal of a difference between the column pixel signal and the column reset signal held in the sampling capacitor is converted in the third operation; a feedback unit corresponding to all the plurality of column output holding units, including a first feedback capacitor and a second feedback capacitor for amplifying a signal, and configured to alternately switch a feedback capacitor for amplifying the differential signal output from the column output holding unit to either one of the first feedback capacitor and the second feedback capacitor for every third operation; and a differential amplification circuit configured to amplify the output differential signal to output the amplified differential signal as the difference signal in accordance with a ratio between the sampling capacitor provided in the column output holding unit configured to output the differential signal and the first feedback capacitor or the second feedback capacitor to which the feedback capacitor is switched in the third operation, and the method may include: setting a group for every predetermined number of different horizontal signal lines and causing the column pixel signal and the column reset signal to be sequentially output simultaneously from different column circuits connected to the horizontal signal lines belonging to the same group to the connected horizontal signal lines; causing the column output holding units, each of which performs the first operation corresponding to the horizontal signal line by which the column pixel signal is transferred, to simultaneously hold transferred column pixel signals; causing the column output holding units, each of which performs the second operation corresponding to the horizontal signal line by which the column reset signal is transferred, to simultaneously hold transferred column reset signals; causing each column output holding unit, which outputs the differential signal in the third operation, to exclusively output the differential signal and causing the column output holding unit, which does not output the differential signal, to maintain hold states of the column pixel signal and the column reset signal or a hold state of the differential signal; and causing the differential amplification circuit to be initialized during a period in which the first operation, the second operation, and the third operation are switched.

According to a fourth aspect of the present invention, in the method of driving the solid-state imaging device according to the above-described first aspect, the column circuit may include a signal storage unit configured to hold column pixel signals according to pixel signals output by pixels arranged in a plurality of rows in a corresponding column, and the column circuit may cause holding of the column pixel signal according to the pixel signal output by the pixel arranged in any row for the signal storage unit and outputting of the held column pixel signal according to the pixel signal output by the pixel arranged in another row to be performed in parallel in the same period.

According to a fifth aspect of the present invention, a solid-state imaging device includes: a plurality of column circuits which are arranged for each column of a plurality of pixels arranged in a matrix and configured to output a column pixel signal according to a pixel signal output by a pixel of a corresponding column, to which the plurality column circuits are periodically classified and connected, the plurality of horizontal signal lines being configured to transfer the column pixel signal output by any one of the connected column circuits and a column reset signal when the column circuit having output the column pixel signal is reset, and an amplification and selection circuit configured to select and sequentially sample either of the column pixel signal and the column reset signal transferred by each of the plurality of horizontal signal lines, and to amplify a differential signal based on the column pixel signal and the column reset signal output from the same column circuit and output the amplified differential signal, the amplification and selection circuit including: a plurality of column output holding units corresponding to the plurality of horizontal signal lines, including a sampling capacitor configured to hold the column pixel signal transferred by the corresponding horizontal signal line in a first operation of sampling the column pixel signal and to hold the column reset signal transferred by the corresponding horizontal signal line in a second operation of sampling the column reset signal, and configured to output a differential signal into which a signal of a difference between the column pixel signal and the column reset signal held in the sampling capacitor is converted in a third operation of amplifying the difference signal to output the amplified difference signal; a feedback unit corresponding to all the plurality of column output holding units, including a first feedback capacitor and a second feedback capacitor for amplifying a signal, and configured to alternately switch a feedback capacitor for amplifying the differential signal output from the column output holding unit to either one of the first feedback capacitor and the second feedback capacitor for every third operation; and a differential amplification circuit configured to amplify the output differential signal to output the amplified differential signal as the difference signal in accordance with a ratio between the sampling capacitor provided in the column output holding unit configured to output the differential signal and the first feedback capacitor or the second feedback capacitor to which the feedback capacitor is switched in the third operation, wherein components provided in the amplification and selection circuit are vicinity to each other so that a wiring length between the differential amplification circuit and the sampling capacitor provided in the column output holding unit arranged at a position farthest from the differential amplification circuit becomes shorter than a wiring length of the horizontal signal line between the sampling capacitor and the column circuit arranged at a farthest position in the horizontal signal line.

According to a sixth aspect of the present invention, in the solid-state imaging device according to the above-described fifth aspect, the solid-state imaging device may further include: a first semiconductor substrate on which light is incident, a second semiconductor substrate stacked on a surface of the first semiconductor substrate, the surface being opposite to a surface on which the light is incident, and an inter-substrate connection portion which electrically connects the first semiconductor substrate to the second semiconductor substrate, at least the plurality of pixels arranged in the matrix may be formed on the first semiconductor substrate, and at least the amplification and selection circuit may be formed on the second semiconductor substrate.

DESCRIPTION OF EMBODIMENTS

First Embodiment

Figure 1:
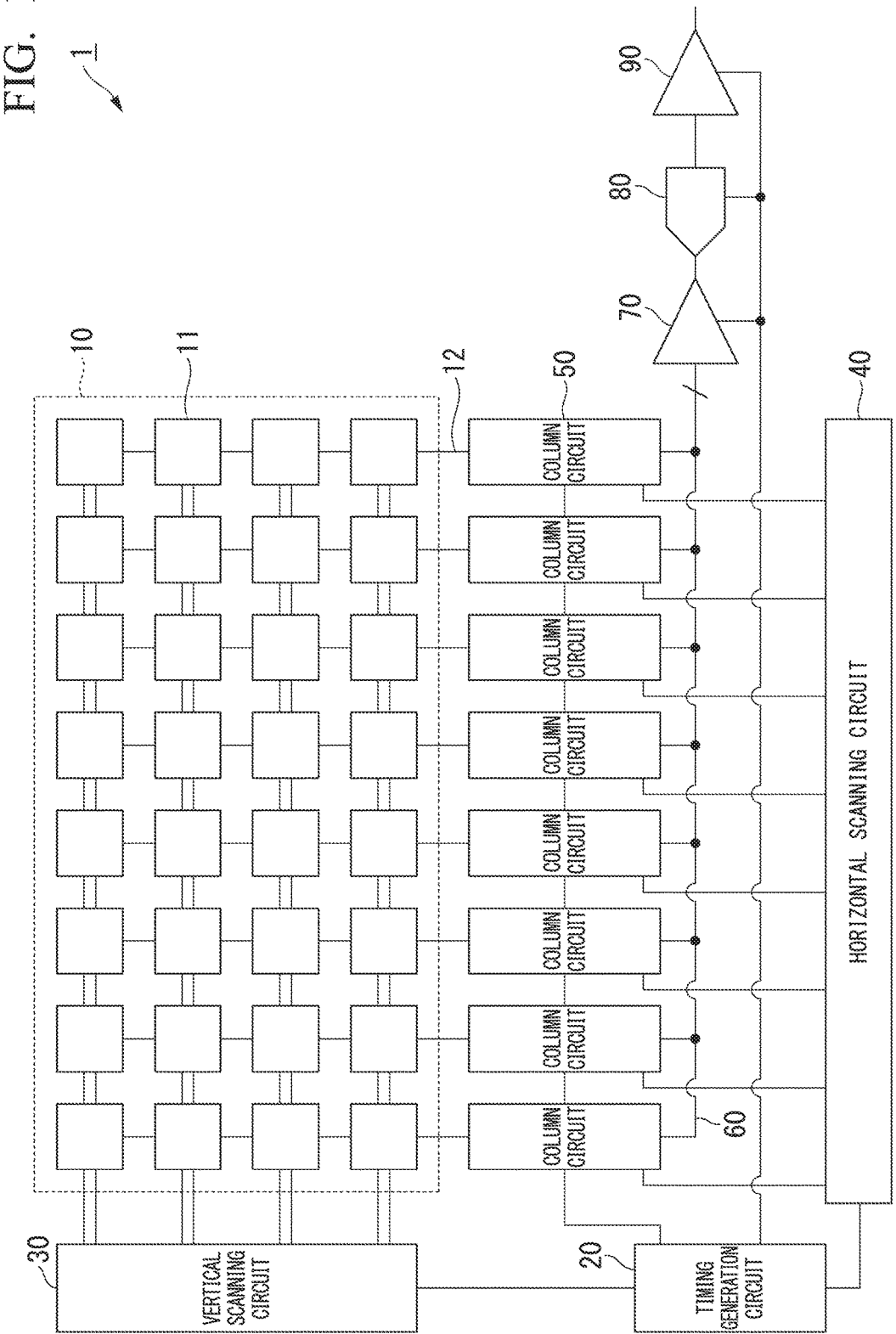
FIG. 1 is a block diagram showing a schematic configuration of a solid-state imaging device according to a first embodiment of the present invention.

Hereinafter, embodiments of the present invention will be described with reference to the drawings. FIG. 1 is a block diagram showing a schematic configuration of a solid-state imaging device according to a first embodiment of the present invention. The solid-state imaging device 1 according to the first embodiment includes a pixel array unit 10 in which a plurality of pixels 11 are arranged, a timing generation circuit 20, a vertical scanning circuit 30, a horizontal scanning circuit 40, a plurality of column circuits 50 corresponding to columns of the pixels 11 provided in the pixel array unit 10, an amplification and selection circuit 70, an analog-to-digital conversion circuit 80, and an output circuit 90. Also, in the solid-state imaging device 1 shown in FIG. 1, an example of the pixel array unit 10 in which the plurality of pixels 11 are two-dimensionally arranged in 4 rows and 8 columns is shown.

Each of the pixels 11 arranged in the pixel array unit 10 generates signal charges obtained by photoelectrically converting incident light (a light beam), and generates an optical signal corresponding to a magnitude of the generated signal charges as a pixel signal. The pixel 11 outputs the pixel signal to the corresponding vertical signal line 12 in accordance with the driving of reading by a control signal output from the vertical scanning circuit 30.

The timing generation circuit 20 controls the vertical scanning circuit 30, the horizontal scanning circuit 40, and the column circuit 50. More specifically, the timing generation circuit 20 controls a timing at which a pixel signal is read from each pixel 11 provided in the pixel array unit 10, a timing of signal processing performed on the pixel signal, a timing at which a pixel signal subjected to signal processing is output to the outside of the solid-state imaging device 1 as a final output signal, and the like.

The vertical scanning circuit 30 is a driving circuit configured to control each pixel 11 within the pixel array unit 10 in accordance with control from the timing generation circuit 20 and cause a pixel signal generated in each pixel 11 to be output to the vertical signal line 12. The vertical scanning circuit 30 outputs a control signal for driving the pixel 11 for each row of the pixels 11 provided in the pixel array unit 10. Thereby, the pixel signal output from each pixel 11 provided in the pixel array unit 10 is transferred to the corresponding column circuit 50 via the vertical signal line 12 for each row of the pixels 11.

Each of the column circuits 50 performs signal processing such as noise suppression or signal amplification on the pixel signal output from the pixel 11 of the corresponding column in accordance with the control from the timing generation circuit 20. The column circuit 50 is, for example, a CDS circuit configured to perform a correlated double sampling (CDS) process. Each of the column circuits 50 outputs a pixel signal subjected to signal processing to the horizontal signal line 60 in accordance with the driving of reading by a control signal output from the horizontal scanning circuit 40. In the solid-state imaging device 1, a plurality of horizontal signal lines 60 are provided. Accordingly, each of the column circuits 50 outputs the pixel signal subjected to the signal processing to the corresponding horizontal signal line 60.

The control of the operation of the correlated double sampling process in each column circuit 50 may be configured to be performed by a control signal output by the vertical scanning circuit 30 or the horizontal scanning circuit 40 in accordance with control from the timing generation circuit 20 without being configured to be performed by the control signal output by the timing generation circuit 20. For example, the vertical scanning circuit 30 may be configured to adjust a timing of a control signal of each column circuit 50 output from the timing generation circuit 20 with a timing at which the pixel 11 is driven and output the adjusted timing to the column circuit 50.

The horizontal scanning circuit 40 is a driving circuit configured to control each column circuit 50 in accordance with control from the timing generation circuit 20 and cause a pixel signal subjected to signal processing in each column circuit 50 to be output to the horizontal signal line 60. The horizontal scanning circuit 40 sequentially outputs a control signal for controlling the column circuit 50 for each column of the pixels 11 provided in the pixel array unit 10. Thereby, the pixel signal output from each pixel 11 in the pixel array unit 10 for each row and subjected to signal processing by the column circuit 50 is sequentially transferred to the amplification and selection circuit 70 via the horizontal signal line 60 for each column of the pixels 11.

In accordance with the control from the timing generation circuit 20, the amplification and selection circuit 70 further performs signal processing such as noise suppression or signal amplification on a pixel signal after signal processing output from each column circuit 50 via the horizontal signal line 60. The amplification and selection circuit 70 is, for example, a CDS circuit configured to perform a correlated double sampling process. The amplification and selection circuit 70 outputs the pixel signal on which the signal processing is further performed to the analog-to-digital conversion circuit 80.

In accordance with the control from the timing generation circuit 20, the analog-to-digital conversion circuit 80 performs analog-to-digital conversion on the pixel signal (analog signal) after the signal processing output from the amplification and selection circuit 70 and generates a digital signal according to a magnitude of the signal level of the pixel signal. The analog-to-digital conversion circuit 80 outputs the generated digital signal to the output circuit 90.

In accordance with the control from the timing generation circuit 20, the output circuit 90 converts the digital signal output from the analog-to-digital conversion circuit 80 into a signal form of a final output signal output from the solid-state imaging device 1 and externally outputs the converted digital signal. For example, the output circuit 90 converts each of the digital signals output from the analog-to-digital conversion circuit 80 into an output signal in the form of a signal suitable for high-speed signal transmission and outputs the converted signal to the outside of the solid-state imaging device 1.

Control of the operations of the amplification and selection circuit 70, the analog-to-digital conversion circuit 80, and the output circuit 90 may be configured to be performed according to a control signal output by the horizontal scanning circuit 40 in accordance with the control from the timing generation circuit 20 without being configured to be performed according to the control signal output from the timing generation circuit 20. For example, the horizontal scanning circuit 40 may be configured to adjust the timing of the control signal for controlling the correlated double sampling process in the amplification and selection circuit 70 output from the timing generation circuit 20 with a timing for driving the column circuit 50 and output the adjusted timing to the amplification and selection circuit 70.

Also, although the solid-state imaging device 1 shown in FIG. 1 is configured to include the analog-to-digital conversion circuit 80, the solid-state imaging device 1 may not include the analog-to-digital conversion circuit 80. In this case, the amplification and selection circuit 70 outputs a pixel signal subjected to signal processing to the output circuit 90, and the output circuit 90 outputs a final output signal according to the pixel signal after the signal processing output from the amplification and selection circuit 70 to the outside of the solid-state imaging device 1.

Figure 2:
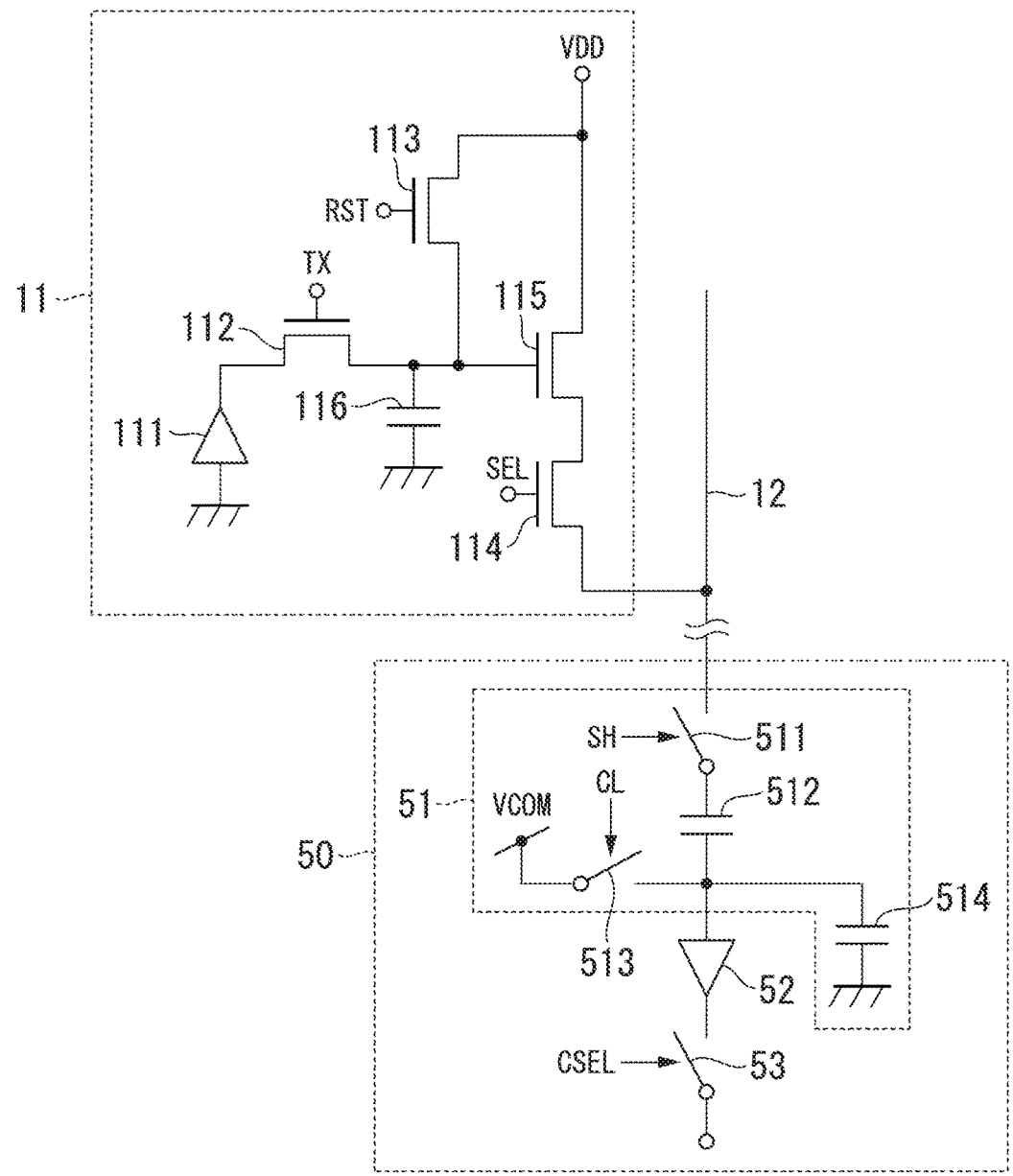
FIG. 2 is a circuit diagram showing an example of a configuration of a pixel and a column circuit included in the solid-state imaging device according to the first embodiment of the present invention.

Next, the configuration of the pixel 11 and the column circuit 50 arranged within the pixel array unit 10 provided in the solid-state imaging device 1 of the first embodiment will be described. FIG. 2 is a circuit diagram showing an example of the configuration of the pixel 11 and the column circuit 50 provided in the solid-state imaging device 1 according to the first embodiment of the present invention. In FIG. 2, an example of the configuration of one pixel 11 and one column circuit 50 corresponding to the pixel 11 is shown.

First, the configuration of the pixel 11 will be described. The pixel 11 includes a photoelectric conversion unit 111, a transfer transistor 112, a reset transistor 113, a selection transistor 114, an amplification transistor 115, and a floating diffusion node 116. In FIG. 2, the floating diffusion node 116 is indicated by a symbol of a capacitor as a circuit element of the pixel 11.

A first terminal of the photoelectric conversion unit 111 is grounded and a second terminal thereof is connected to a source terminal of the transfer transistor 112. A drain terminal of the transfer transistor 112 is connected to each of a first electrode of the floating diffusion node 116, a source terminal of the reset transistor 113, and a gate terminal of the amplification transistor 115. A transfer pulse TX output by the vertical scanning circuit 30 is supplied to a gate terminal of the transfer transistor 112.

The first electrode of the floating diffusion node 116 is connected to each of the drain terminal of the transfer transistor 112, the source terminal of the reset transistor 113, and the gate terminal of the amplification transistor 115. A second electrode of the floating diffusion node 116 is grounded.

A drain terminal of the reset transistor 113 is connected to a power supply voltage VDD. The source terminal of the reset transistor 113 is connected to each of the drain terminal of the transfer transistor 112, the first electrode of the floating diffusion node 116, and the gate terminal of the amplification transistor 115. A reset pulse RST output by the vertical scanning circuit 30 is supplied to a gate terminal of the reset transistor 113.

A drain terminal of the amplification transistor 115 is connected to the power supply voltage VDD. The gate terminal which is an input part of signal charges in the amplification transistor 115 is connected to each of the drain terminal of the transfer transistor 112, the first electrode of the floating diffusion node 116, and the source terminal of the reset transistor 113. The source terminal of the amplification transistor 115 is connected to a drain terminal of the selection transistor 114. A source terminal of the selection transistor 114 is connected to the vertical signal line 12. A selection pulse SEL output by the vertical scanning circuit 30 is supplied to a gate terminal of the selection transistor 114.

The photoelectric conversion unit 111 is, for example, a photoelectric conversion element such as a photodiode configured to generate a signal charge according to incident light (a light beam) and hold (store) the generated signal charge.

The transfer transistor 112 is a transistor configured to transfer signal charges generated and stored by the photoelectric conversion unit 111 to the gate terminal of the amplification transistor 115 in accordance with the transfer pulse TX output from the vertical scanning circuit 30. When the transfer transistor 112 is controlled in an ON state according to the transfer pulse TX, the transfer transistor 112 transfers the signal charges generated by the photoelectric conversion unit 111 connected to the source terminal to the gate terminal of the amplification transistor 115. Thereby, the signal charges transferred by the transfer transistor 112 are stored in the floating diffusion node 116.

The floating diffusion node 116 is a capacitor attached to a node connected to the gate terminal of the amplification transistor 115. The floating diffusion node 116 temporarily holds (stores) the signal charges transferred to the gate terminal of the amplification transistor 115 by the transfer transistor 112.

The reset transistor 113 is a transistor configured to reset a component within the pixel 11 in accordance with the reset pulse RST output from the vertical scanning circuit 30. When the reset transistor 113 is controlled in an ON state according to the reset pulse RST, each of the drain terminal of the transfer transistor 112, the first electrode of the floating diffusion node 116, and the gate terminal of the amplification transistor 115 connected to the source terminal of the reset transistor 113 is reset. Thereby, the signal charges stored in the floating diffusion node 116 are reset.

Also, the vertical scanning circuit 30 can control the transfer pulse TX and the reset pulse RST simultaneously and reset the photoelectric conversion unit 111 by setting the transfer transistor 112 and the reset transistor 113 to an ON state simultaneously. Here, the resetting of the floating diffusion node 116 or the photoelectric conversion unit 111 refers to controlling an amount of signal charge stored in the floating diffusion node 116 or the photoelectric conversion unit 111 to set the controlled amount of signal charge as a reference amount of charge. In other words, the resetting of the floating diffusion node 116 and the photoelectric conversion unit 111 indicates setting a state of a signal level (a potential) of the first electrode of the floating diffusion node 116 or the second terminal of the photoelectric conversion unit 111 to a state of a reference potential, i.e., a state of a potential level of the power supply voltage VDD (hereinafter referred to as a "reset level").

The amplification transistor 115 is a transistor configured to output an amplification signal of a signal level (a potential) according to the signal level (the potential) applied to the gate terminal to the selection transistor 114. That is, the amplification transistor 115 outputs an amplification signal according to the state of the signal level (the potential) of the first electrode of the floating diffusion node 116 to the selection transistor 114. In the pixel 11, the amplification transistor 115 and a load (not shown) provided in the column circuit 50 constitute a source follower circuit.

The selection transistor 114 is a transistor configured to output the amplified signal output from the amplification transistor 115 to the vertical signal line 12 as the pixel signal of the pixel 11 in accordance with the selection pulse SEL output from the vertical scanning circuit 30. When the selection transistor 114 is controlled in an ON state according to the selection pulse SEL, the selection transistor 114 outputs the amplified signal input to the drain terminal to the vertical signal line 12. Thereby, a pixel signal according to signal charges generated by the photoelectric conversion unit 111 provided in the pixel 11 is read to the vertical signal line 12.

According to such a configuration, in the pixel 11, each amplified signal corresponding to the signal level (the potential) of the signal charges obtained by performing photoelectric conversion on incident light in the photoelectric conversion unit 111 is read to the vertical signal line 12 as a pixel signal. That is, the pixel 11 reads the amplified signal according to the state of the signal level (the potential) of the first electrode of the floating diffusion node 116 as the pixel signal to the vertical signal line 12.

Also, the states of the signal level (the potential) of the first electrode of the floating diffusion node 116 are two states. One state is a state in which the signal charges generated by the photoelectric conversion unit 111 transferred to the amplification transistor 115 by the transfer transistor 112 are stored. The other state is a state in which the signal level is reset to the reset level by the reset transistor 113. Then, the amplification transistor 115 can output the amplified signal of each state of the first electrode of the floating diffusion node 116 to the selection transistor 114, and the selection transistor 114 can output the amplified signal of each state as a pixel signal to the vertical signal line 12.

In the following description, a pixel signal which is an amplified signal according to the state of the signal level (the potential) of the first electrode of the floating diffusion node 116 in a state in which a signal charge generated by the photoelectric conversion unit 111 to be output by the pixel 11 is stored is referred to as an "optical signal". On the other hand, in the following description, a pixel signal, which is an amplified signal according to the state of the signal level (the potential) of the first electrode of the floating diffusion node 116 reset to the reset level, output by the pixel 11 is referred to as a "reset signal". The optical signal and the reset signal output by the pixel 11 are used in a correlated double sampling (CDS) process in the column circuit 50. In the following description, when the optical signal and the reset signal are not distinguished, they are referred to as a "pixel signal".

Next, the configuration of the column circuit 50 will be described. The column circuit 50 includes a pixel output holding unit 51, a column output amplifier 52, and a column selection switch 53. An input terminal of the pixel output holding unit 51 is an input terminal of the column circuit 50 and is connected to the vertical signal line 12. An output terminal of the pixel output holding unit 51 is connected to an input terminal of the column output amplifier 52. An output terminal of the column output amplifier 52 is connected to a first terminal of the column selection switch 53. A second terminal of the column selection switch 53 is an output terminal of the column circuit 50.

The pixel output holding unit 51 generates and holds a difference signal obtained by taking a difference between the reset signal and the optical signal, output from the pixel 11 and transferred via the vertical signal line 12, i.e., a pixel signal (hereinafter referred to as a "noise-removed optical signal") obtained by removing noise according to the correlated double sampling process. The pixel output holding unit 51 outputs the held noise-removed optical signal to the column output amplifier 52.

The pixel output holding unit 51 includes a sampling switch 511, a clamp capacitor 512, a clamp switch 513, and a sampling capacitor 514. A first terminal of the sampling switch 511 is an input terminal of the pixel output holding unit 51, i.e., an input terminal of the column circuit 50, and is connected to the vertical signal line 12. A second terminal of the sampling switch 511 is connected to a first electrode of the clamp capacitor 512. A second electrode of the clamp capacitor 512 is connected to each of a first terminal of the clamp switch 513 and a first electrode of the sampling capacitor 514 and serves as the output terminal of the pixel output holding unit 51. A second terminal of the clamp switch 513 is connected to a reference voltage VCOM. A second electrode of the sampling capacitor 514 is grounded.

The sampling switch 511 is a switch configured to transfer the pixel signal transferred from the pixel 11 via the vertical signal line 12 to the clamp capacitor 512 in accordance with a sampling pulse SH output from the timing generation circuit 20. When the sampling switch 511 is controlled in a closed state according to the sampling pulse SH, the sampling switch 511 connects a first terminal and a second terminal thereof and supplies a pixel signal transferred from the pixel 11 via the vertical signal line 12 to the clamp capacitor 512. Thereby, the pixel signal is input to the first electrode of the clamp capacitor 512. That is, the signal level (the potential) of the pixel signal is applied to the first electrode of the clamp capacitor 512.

The clamp capacitor 512 is a capacitor configured to hold (store) charges corresponding to a signal level (a potential) of an input pixel signal. The clamp capacitor 512 stores charges according to a potential difference between a potential applied to the first electrode thereof and a potential applied to the second electrode thereof.

The clamp switch 513 is a switch for clamping the clamp capacitor 512 and the sampling capacitor 514 to a potential of the reference voltage VCOM according to a clamp pulse CL output from the horizontal scanning circuit 40. When the clamp switch 513 is controlled in a closed state according to the clamp pulse CL, the clamp switch 513 connects the first terminal and the second terminal thereof and causes the second electrode of the clamp capacitor 512, the first electrode of the sampling capacitor 514, and the output terminal of the pixel output holding unit 51 to be clamped to a potential level of the reference voltage VCOM (hereinafter referred to as a "clamp level VCOM"). Thereby, when the pixel signal is input to the first electrode of the clamp capacitor 512 while the clamp capacitor 512 is not clamped, the second electrode of the clamp capacitor 512 has a potential according to a potential difference between the signal level (the potential) of the input pixel signal and the clamp level VCOM.

The sampling capacitor 514 is a capacitor configured to hold (store) charges according to the potential of the second electrode of the clamp capacitor 512. A potential according to charges stored in the sampling capacitor 514 is a signal level (a potential) of the noise-removed optical signal held by the pixel output holding unit 51 and output to the column output amplifier 52.

The column output amplifier 52 outputs the noise-removed optical signal output from the pixel output holding unit 51 to the column selection switch 53. At this time, the column output amplifier 52 may amplify the noise-removed optical signal and output the amplified noise-removed optical signal to the column selection switch 53.

The column selection switch 53 is a switch configured to output the noise-removed optical signal output from the column output amplifier 52 to the horizontal signal line 60 in accordance with a column selection signal CSEL output from the horizontal scanning circuit 40. When the column selection switch 53 is controlled in a closed state according to the column selection signal CSEL, the column selection switch 53 connects the first terminal and the second terminal thereof, and outputs the noise-removed optical signal output from the column output amplifier 52 to the horizontal signal line 60.

According to such a configuration, in the column circuit 50, an optical signal (a noise-removed optical signal) obtained by removing a noise component is output to the horizontal signal line 60 in accordance with the column selection signal CSEL output from the horizontal scanning circuit 40 by performing the correlated double sampling process of taking a difference between an optical signal and a reset signal output from the pixel 11 of the corresponding column.

Figure 3:
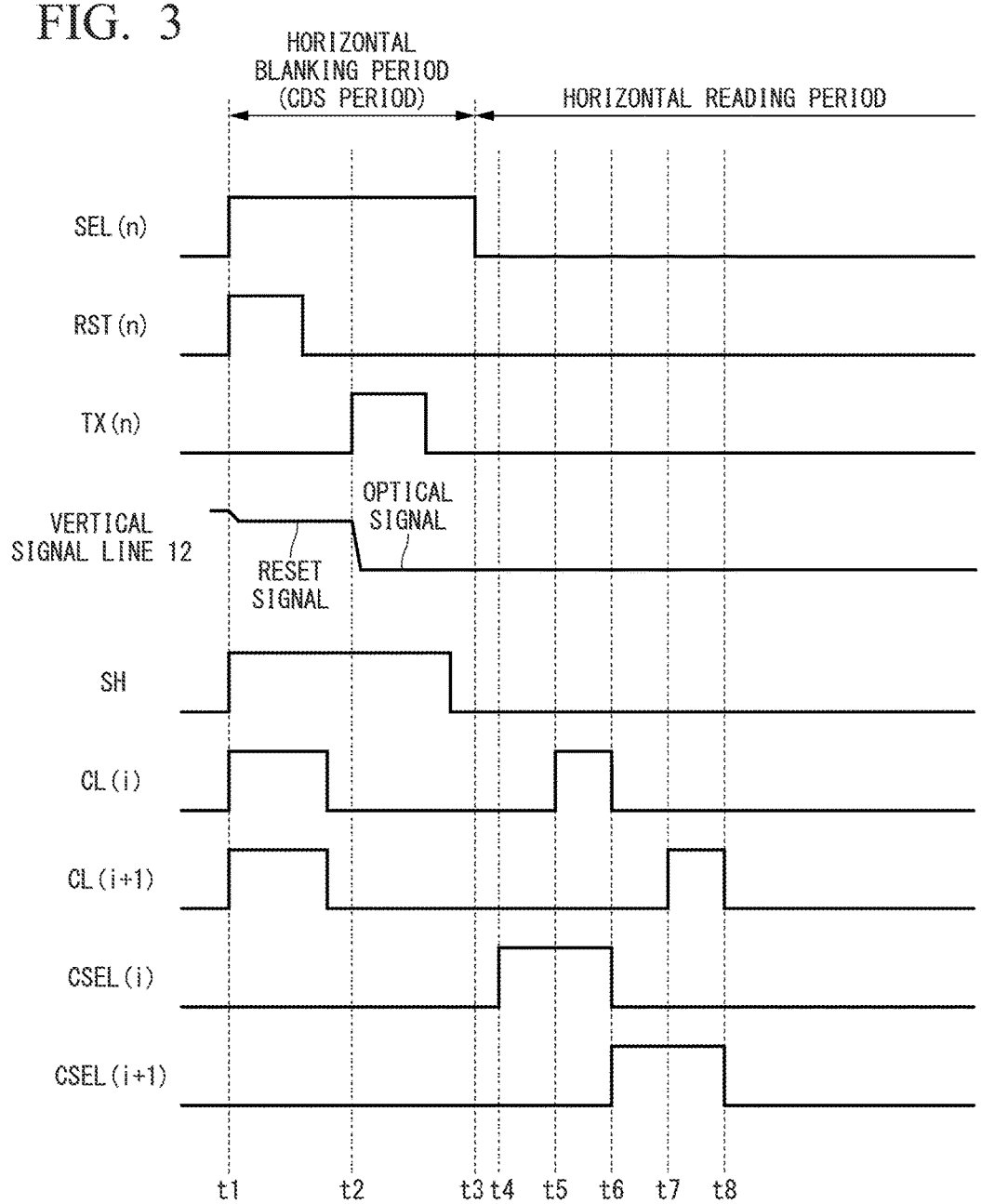
FIG. 3 is a timing chart showing an example of driving timings of the pixel and the column circuit included in the solid-state imaging device according to the first embodiment of the present invention.

Next, driving timings of the pixel 11 and the column circuit 50 arranged in the pixel array unit 10 in the solid-state imaging device 1 of the first embodiment will be described. FIG. 3 is a timing chart showing an example of driving timings of the pixel 11 and the column circuit 50 included in the solid-state imaging device 1 according to the first embodiment of the present invention. In FIG. 3, an example of a driving timing when a processed pixel signal is output to the horizontal signal line 60 by performing the correlated double sampling process on a pixel signal output from each of the pixels 11 arranged in two different columns in the pixel array unit 10 is shown. That is, an example of the driving timings in the two column circuits 50 corresponding to the columns of the pixels 11 is shown in FIG. 3. Also, an example of the driving timing shown in FIG. 3 is a driving timing after the exposure in the solid-state imaging device 1, i.e., generation and accumulation of signal charges according to light (a light beam) incident on the photoelectric conversion unit 111 provided in each pixel 11 provided in the pixel array unit 10, is completed.

In the solid-state imaging device 1, during a horizontal blanking period, the vertical scanning circuit 30 first drives pixels 11 for each row of the pixels 11 provided in the pixel array unit 10, so that a plurality of pixels 11 of different columns arranged in the same row simultaneously read out pixel signals to corresponding vertical signal lines 12. At this time, the column circuits 50 connected to the vertical signal lines 12 perform the correlated double sampling process on the pixel signals output from the pixels 11 of the corresponding columns. Accordingly, the horizontal blanking period for reading pixel signals from the pixels 11 provided in the pixel array unit 10 to the vertical signal lines 12 for each row may also be a CDS period in which the column circuit 50 performs the correlated double sampling process. Thereafter, in the solid-state imaging device 1, the timing generation circuit 20 and the horizontal scanning circuit 40 cause a noise-removed optical signal to be output to the horizontal signal line 60 by sequentially driving the column circuit 50 for each column of the pixels 11 provided in the pixel array unit 10 during a horizontal reading period.

In the following description, the corresponding transistor will be described as being in an ON state by the vertical scanning circuit 30 setting each control signal to a "High" level. Also, in the following description, the corresponding switch will be described as being in a closed state by the timing generation circuit 20 and the horizontal scanning circuit 40 setting each control signal to a "High" level.

In the horizontal blanking period (the CDS period), at a time t1, the vertical scanning circuit 30 sets the selection pulse SEL(n) of the same row (for example, an $n^{th}$ row) to a "High" level to set the selection transistor 114 provided in the pixel 11 of each column to an ON state. Thereby, each pixel 11 of the $n^{th}$ row is connected to the vertical signal line 12. More specifically, the source terminal of the amplification transistor 115 provided in each pixel 11 is connected to the vertical signal line 12 via the selection transistor 114. Also, simultaneously, the vertical scanning circuit 30 sets the reset pulse RST(n) of the same $n^{th}$ row to a "High" level to set the reset transistor 113 provided in the pixel 11 of each column to an ON state. Thereby, signal charges stored in the floating diffusion node 116 are reset and the gate terminal of the amplification transistor 115 is set to a potential of the first electrode of the reset floating diffusion node 116. Then, the amplification transistor 115 outputs an amplified signal of a signal level (a potential) corresponding to the potential of the gate terminal, i.e., a reset signal, to the vertical signal line 12 via the selection transistor 114.

Also, during the horizontal blanking period (the CDS period), the timing generation circuit 20 sets the sampling pulse SH to a "High" level at the time t1 to set the sampling switch 511 provided in the pixel output holding unit 51 within the column circuit 50 corresponding to each column is brought into a closed state. Thereby, the reset signal transferred from the pixel 11 via the vertical signal line 12 is transferred to the clamp capacitor 512 provided in the pixel output holding unit 51 within each column circuit 50 via the sampling switch 511, and the signal level (the potential) of the reset signal is applied to the first electrode of the clamp capacitor 512. Simultaneously, the horizontal scanning circuit 40 sets the clamp pulse CL(i) and the clamp pulse CL(i+1) corresponding to columns (for example, a column i and a column (i+1)) to a "High" level to set the clamp switch 513 provided in the pixel output holding unit 51 within the column circuit 50 corresponding to each column to a closed state. Thereby, the second electrode of each clamp capacitor 512 is clamped to the clamp level VCOM, i.e., the potential of the reference voltage VCOM is applied to the second electrode of the clamp capacitor 512. Thereby, the clamp capacitor 512 stores charges according to a potential difference between the potential of the reset signal and the clamp level VCOM. Charges similar to those of the clamp capacitor 512 are also stored in the sampling capacitor 514 provided in the pixel output holding unit 51 within the column circuit 50 corresponding to each column.

Thereafter, the vertical scanning circuit 30 sets the reset pulse RST(n) in the $n^{th}$ row to a "Low" level to set a reset transistors 113 to an OFF state, and stops an outputting of the reset signal to the vertical signal line 12. Also, the horizontal scanning circuit 40 sets the clamp pulse CL(i) and the clamp pulse CL(i+1) corresponding to each column to a "Low" level to set each clamp switch 513 to an open state, and releases the clamping of each clamp capacitor 512.

Subsequently, at a time t2, the vertical scanning circuit 30 sets the transfer pulse TX(n) of the same $n^{th}$ row to a "High" level to set the transfer transistor 112 provided in the pixel 11 of each column to an ON state. Thereby, signal charges generated by the photoelectric conversion unit 111 are transferred to the gate terminal of the amplification transistor 115 by the transfer transistor 112 and stored in the floating diffusion node 116. Then, the amplification transistor 115 outputs an amplified signal of a signal level (a potential) according to the potential of the gate terminal thereof, i.e., an optical signal, to the vertical signal line 12 via the selection transistor 114.

Also, because the sampling pulse SH is at a "High" level at the time t2, the sampling switch 511 connected to each vertical signal line 12 is in a closed state. Thus, an optical signal output from the pixel 11 is transferred to the clamp capacitor 512 within each column circuit 50 via the sampling switch 511, and a signal level (a potential) of the optical signal is applied to the first electrode of the clamp capacitor 512. Thereby, the clamp capacitor 512 stores charges according to a potential difference between a potential of the optical signal and a potential of the first electrode of the sampling capacitor 514 (that is, a potential of the potential difference between the reset signal stored in the sampling capacitor 514 and the clamp level VCOM). Then, the sampling capacitor 514 stores charges similar to those of the current clamp capacitor 512. Here, a potential according to charges stored in the sampling capacitor 514 is a signal level (a potential) of a noise-removed optical signal, i.e., an optical signal after noise removal obtained by removing a component of a reset signal included in the optical signal as a noise component through the correlated double sampling process.

Thereafter, the vertical scanning circuit 30 sets the transfer pulse TX(n) of the $n^{th}$ row to a "Low" level to set the transfer transistor 112 to an OFF state, and stops the transfer of signal charges generated by the photoelectric conversion unit 111 to the gate terminal of the amplification transistor 115. Also, the timing generation circuit 20 sets the sampling pulse SH to a "Low" level to set the sampling switch 511 within each column circuit 50 to an open state, and terminates the transfer of a pixel signal output by the pixel 11 to the clamp capacitor 512. That is, the timing generation circuit 20 terminates the sampling of the pixel signal output by the pixel 11 corresponding to each column circuit 50.

Subsequently, at a time t3, the vertical scanning circuit 30 sets the selection pulse SEL(n) in the $n^{th}$ row to a "Low" level to set the selection transistor 114 provided in the pixel 11 in each column to an OFF state, and disconnects a connection of the vertical signal line 12 of each pixel 11 of an $n^{th}$ row. Thereby, the horizontal blanking period (the CDS period) ends.

Subsequently, during the horizontal reading period, the horizontal scanning circuit 40 sets the column selection signal CSEL(i) of the $i^{th}$ column to a "High" level to set the column selection switch 53 provided in the column circuit 50 of the $i^{th}$ column to a closed state at a time t4. Thereby, a noise-removed optical signal having a signal level (a potential) according to charges stored in the sampling capacitor 514 provided in the pixel output holding unit 51 within the column circuit 50 of the $i^{th}$ column is output to the horizontal signal line 60 via the column output amplifier 52 and the column selection switch 53.

Subsequently, at a time t5, the horizontal scanning circuit 40 sets the clamp pulse CL(i) of the $i^{th}$ column to a "High" level to set the clamp switch 513 within the column circuit 50 of the $i^{th}$ column to a closed state. Thereby, the second electrode of each clamp capacitor 512 is clamped to the clamp level VCOM, and a signal of the clamp level VCOM (hereinafter referred to as "column reset signal") is output to the horizontal signal line 60 via the column output amplifier 52 and the column selection switch 53. The noise-removed optical signal and the column reset signal output by the column circuit 50 are used in the correlated double sampling process in the amplification and selection circuit 70. In the following description, if the noise-removed optical signal and the column reset signal are not distinguished, they are referred to as a "column pixel signal".

Subsequently, at a time t6, the horizontal scanning circuit 40 sets the column selection signal CSEL(i) and the clamp pulse CL(i) of the $i^{th}$ column to a "Low" level and terminates the reading out of the column pixel signal output by the column circuit 50 of the $i^{th}$ column to the horizontal signal line 60. Then, as in control at the time t4, the horizontal signal line 60 sets the column selection signal CSEL(i+1) of the $(i+1)^{th}$ column to the "High" level, sets the column selection switch 53 provided in the column circuit 50 of the $(i+1)^{th}$ column to a closed state, and causes a noise-removed optical signal of a signal level (a potential) according to charges stored in the sampling capacitor 514 within the column circuit 50 of the $(i+1)^{th}$ column to be output to the horizontal signal line 60 via the column output amplifier 52 and the column selection switch 53.

Subsequently, at a time t7, the horizontal scanning circuit 40 sets the clamp pulse CL(i+1) of the $(i+1)^{th}$ column to a "High" level as in control at the time t5 to set the clamp switch 513 within the column circuit 50 of the $(i+1)^{th}$ column to a closed state and causes a column reset signal of the column circuit 50 of the $(i+1)^{th}$ column to be output to the horizontal signal line 60 via the column output amplifier 52 and the column selection switch 53.

Subsequently, at a time t8, the horizontal scanning circuit 40 sets the column selection signal CSEL(i+1) and the clamp pulse CL(i+1) of the $(i+1)^{th}$ column to a "Low" level, and terminates the reading out of the column pixel signal output by the column circuit 50 of the $(i+1)^{th}$ column to the horizontal signal line 60.

Thereafter, likewise, the horizontal scanning circuit 40 sequentially drives the column circuits 50 corresponding to the pixels 11 of the $n^{th}$ row and causes column pixel signals according to pixel signals output by the corresponding pixels 11 to be sequentially output from the column circuits 50 to the horizontal signal line 60. In this manner, in the solid-state imaging device 1, the vertical scanning circuit 30, the timing generation circuit 20, and the horizontal scanning circuit 40 drive the pixel 11 and the column circuit 50, and causes a column pixel signal corresponding to the pixel 11 of the $n^{th}$ row to be output to the horizontal signal line 60.

Also, when a column pixel signal corresponding to a pixel 11 of another row (for example, the $(n+1)^{th}$ row) arranged within the pixel array unit 10 is output to the horizontal signal line 60, the vertical scanning circuit 30, the timing generation circuit 20, and the horizontal scanning circuit 40 drive the pixel 11 and the column circuit 50 as at the times t1 to t8. That is, each of the vertical scanning circuit 30, the timing generation circuit 20, and the horizontal scanning circuit 40 iterates driving in the horizontal blanking period (the CDS period) and the horizontal reading period at the driving timing shown in FIG. 3. Thereby, in the solid-state imaging device 1, the column pixel signals corresponding to all the pixels 11 arranged within the pixel array unit 10 are sequentially output to the horizontal signal line 60.

Figure 4:
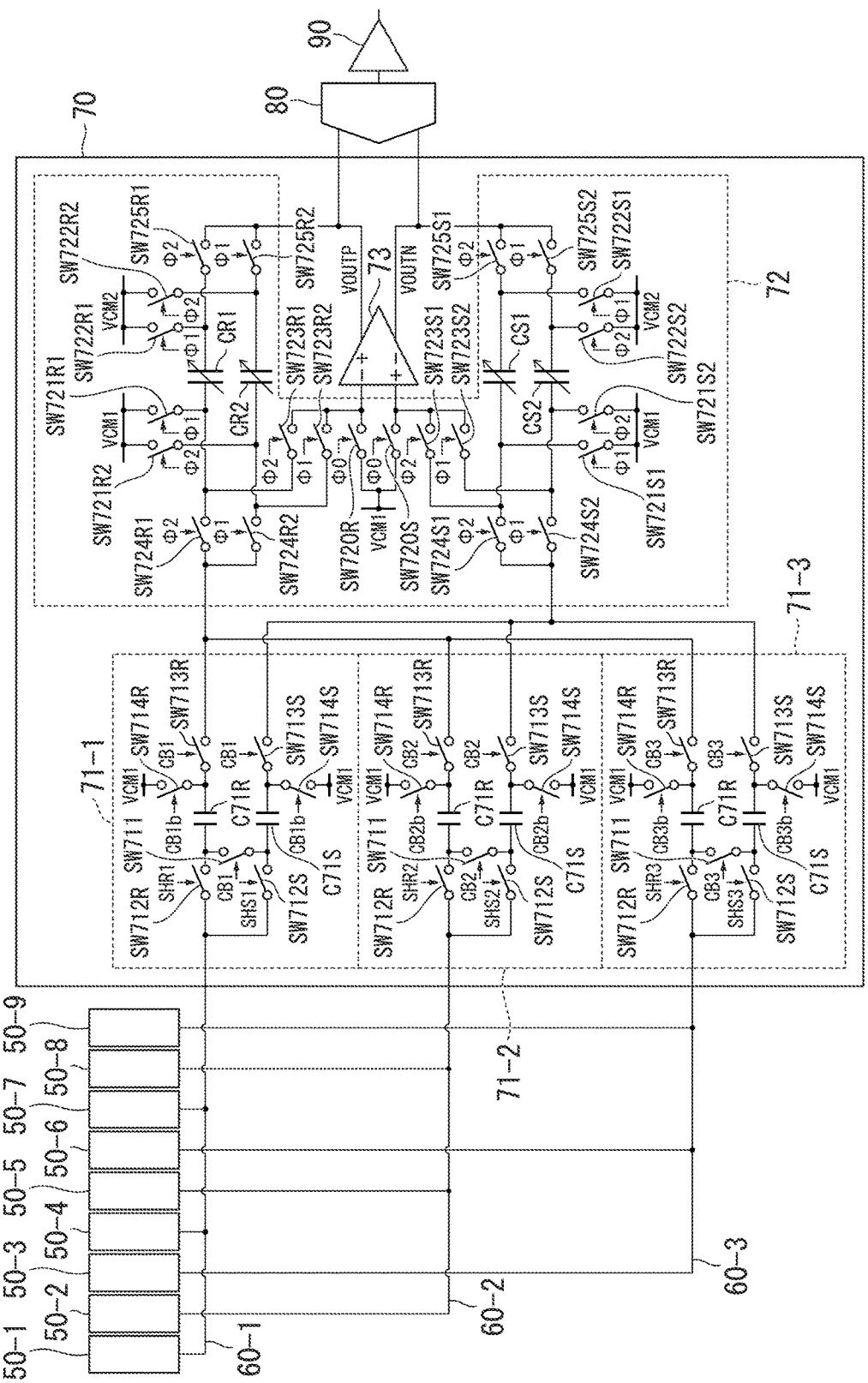
FIG. 4 is a circuit diagram showing an example of a configuration of an amplification and selection circuit provided in the solid-state imaging device according to the first embodiment of the present invention.

Next, a configuration of the amplification and selection circuit 70 provided in the solid-state imaging device 1 of the first embodiment will be described. FIG. 4 is a circuit diagram showing an example of the configuration of the amplification and selection circuit 70 provided in the solid-state imaging device 1 according to the first embodiment of the present invention. The amplification and selection circuit 70 includes a column output holding unit 71, a feedback unit 72, and a differential amplification circuit 73. The amplification and selection circuit 70 is configured as a so-called switched capacitor circuit, and discretely amplifies and outputs a difference signal between the noise-removed optical signal and the column reset signal output from the column circuit 50 and transferred via the horizontal signal line 60.

The column output holding unit 71 holds each of the noise-removed optical signal and the column reset signal output to the horizontal signal line 60 by the column circuit 50 and outputs a differential signal into which a difference signal between the held noise-removed optical signal and column reset signal is converted. The feedback unit 72 selects the differential signal output from the column output holding unit 71 and supplies the selected differential signal to the differential amplification circuit 73. The differential amplification circuit 73 amplifies and outputs the differential signal of the differential signal supplied from the feedback unit 72.

As described above, in the solid-state imaging device 1, a plurality of horizontal signal lines 60 are provided. In the solid-state imaging device 1, the column circuits 50 corresponding to the pixels 11 arranged in the adjacent columns within the pixel array unit 10, i.e., the column circuits 50 corresponding to the adjacent columns, are periodically connected to different horizontal signal lines 60 and output column pixel signals to the connected horizontal signal lines 60. In FIG. 4, an example of the configuration of the solid-state imaging device 1 in which three horizontal signal lines 60 (horizontal signal lines 60-1 to 60-3) are provided and three column circuits 50 (column circuits 50-1 to 50-9) correspond to each horizontal signal line 60, i.e., nine column circuits 50 are provided, is shown. As shown in FIG. 4, adjacent column circuits 50 are periodically connected to different horizontal signal lines 60.

More specifically, the column circuit 50-1 is connected to the horizontal signal line 60-1, the adjacent column circuit 50-2 is connected to the horizontal signal line 60-2, and the adjacent column circuit 50-3 is connected to the horizontal signal line 60-3. The column circuit 50-4 adjacent to the column circuit 50-3 is connected to the horizontal signal line 60-1 to which the column circuit 50-1 is connected, the adjacent column circuit 50-5 is connected to the horizontal signal line 60-2 to which the column circuit 50-2 is connected, and the adjacent column circuit 50-6 is connected to the horizontal signal line 60-3 to which the column circuit 50-3 is connected. Further, the column circuit 50-7 adjacent to the column circuit 50-6 is connected to the horizontal signal line 60-1 to which the column circuit 50-1 and the column circuit 50-4 are connected, the adjacent column circuit 50-8 is connected to the horizontal signal line 60-2 to which the column circuit 50-2 and the column circuit 50-5 are connected, and the adjacent column circuit 50-9 is connected to the horizontal signal line 60-3 to which the column circuit 50-3 and the column circuit 50-6 are connected.

Also, in the solid-state imaging device 1, the amplification and selection circuit 70 includes a plurality of column output holding units 71 corresponding to the respective horizontal signal lines 60. In the amplification and selection circuit 70, the feedback unit 72 selects a differential signal into which a difference signal between the noise-removed optical signal and the column reset signal output by any column output holding units 71 is converted and supplies the selected differential signal to the differential amplification circuit 73, and the differential amplification circuit 73 amplifies the difference signal of the supplied differential signal and outputs the amplified difference signal. In FIG. 4, the configuration of the amplification and selection circuit 70 having three column output holding units 71 (column output holding units 71-1 to 71-3) corresponding to the horizontal signal lines 60 is shown.

More specifically, in FIG. 4, a configuration of the amplification and selection circuit 70 in which the column output holding unit 71-1 corresponds to the horizontal signal line 60-1, the column output holding unit 71-2 corresponds to the horizontal signal line 60-2, and the column output holding unit 71-3 corresponds to the horizontal signal line 60-3 is shown. Also, in FIG. 4, the analog-to-digital conversion circuit 80 and the output circuit 90 provided in the solid-state imaging device 1 are shown.

The column output holding unit 71-1 holds each of the noise-removed optical signal and the column reset signal output to the corresponding horizontal signal line 60-1 by the column circuit 50-1, the column circuit 50-4, or the column circuit 50-7. The column output holding unit 71-1 includes a sampling capacitor C71R, a sampling capacitor C71S, a switch SW711, a switch SW712R, a switch SW712S, a switch SW713R, a switch SW713S, a switch SW714R, and a switch SW714S.

A first terminal of each of the switch SW712R and the switch SW712S is a pixel signal input terminal of the column output holding unit 71-1 and is connected to the horizontal signal line 60-1. A second terminal of the switch SW712R is connected to a first terminal of the switch SW711 and a first electrode of the sampling capacitor C71R. A second electrode of the sampling capacitor C71R is connected to a first terminal of each of the switch SW713R and the switch SW714R. A second terminal of the switch SW714R is connected to a reference voltage VCM1. A second terminal of the switch SW713R is a negative output terminal of the differential signal (hereinafter referred to as a "differential signal negative output terminal") in the column output holding unit 71-1. A second terminal of the switch SW712S is connected to each of the second terminal of the switch SW711 and the first electrode of the sampling capacitor C71S. A second electrode of the sampling capacitor C71S is connected to a first terminal of each of the switch SW713S and the switch SW714S. A second terminal of the switch SW714S is connected to the reference voltage VCM1. A second terminal of the switch SW713S is a positive output terminal of the differential signal (hereinafter referred to as a "differential signal positive output terminal") in the column output holding unit 71-1.

The switch SW712R is a switch configured to transfer the column reset signal transferred from the column circuit 50 to the sampling capacitor C71R via the horizontal signal line 60-1 in accordance with a control signal SHR1 output from the timing generation circuit 20. When the switch SW712R is controlled in the closed state according to the control signal SHR1, the switch SW712R connects the first terminal (the pixel signal input terminal of the column output holding unit 71-1) and the second terminal, and transfers the column reset signal transferred from the column circuit 50 via the horizontal signal line 60-1 to the sampling capacitor C71R. Thereby, the column reset signal is input to the first electrode of the sampling capacitor C71R. That is, the signal level (the potential) of the column reset signal is applied to the first electrode of the sampling capacitor C71R.

The sampling capacitor C71R is a capacitor configured to hold (store) charges corresponding to a signal level (a potential) of the transferred column reset signal. The sampling capacitor C71R stores charges according to a potential difference between a potential applied to the first electrode thereof and a potential applied to the second electrode thereof.

The switch SW711 is a switch for short-circuiting the first electrode of the sampling capacitor C71R and the first electrode of the sampling capacitor C71S in accordance with a control signal CB1 output from the timing generation circuit 20. When the switch SW711 is controlled in a closed state according to the control signal CB1, the switch SW711 connects a first terminal and a second terminal thereof and short-circuits the first electrode of the sampling capacitor C71R and the first electrode of the sampling capacitor C71S.

The switch SW714R is a switch for clamping the sampling capacitor C71R at the potential of the reference voltage VCM1 in accordance with a signal (the control signal CB1b) obtained by inverting the control signal CB1 output from the timing generation circuit 20. When the switch SW714R is controlled in a closed state according to the control signal CB1b, the switch SW714R connects the first terminal and the second terminal thereof and causes the second electrode of the sampling capacitor C71R to be clamped to the potential level of the reference voltage VCM1 (hereinafter referred to as a "clamp level VCM1"). Thereby, when the column reset signal is input to the first electrode of the sampling capacitor C71R while the sampling capacitor C71R is clamped, the second electrode of the sampling capacitor C71R becomes at the clamp level VCM1 and the sampling capacitor C71R is at a potential according to a potential difference between a signal level (a potential) of an input column reset signal and the clamp level VCM1.

The switch SW712S is a switch configured to transfer the noise-removed optical signal transferred from the column circuit 50 to the sampling capacitor C71S via the horizontal signal line 60-1 in accordance with a control signal SHS1 output from the timing generation circuit 20. When the switch SW712S is controlled in a closed state according to the control signal SHS1, the switch SW712S connects the first terminal (the pixel signal input terminal of the column output holding unit 71-1) and the second terminal thereof, and transfers the noise-removed optical signal transferred from the column circuit 50 to the sampling capacitor C71S via the horizontal signal line 60-1. Thereby, the noise-removed optical signal is input to the first electrode of the sampling capacitor C71S. That is, the signal level (the potential) of the noise-removed optical signal is applied to the first electrode of the sampling capacitor C71S.

The sampling capacitor C71S is a capacitor configured to hold (store) charges corresponding to a signal level (a potential) of the transferred noise-removed optical signal. The sampling capacitor C71S stores charges according to a potential difference between a potential applied to the first electrode thereof and a potential applied to the second electrode thereof.

The switch SW714S is a switch for clamping the sampling capacitor C71S to the clamp level VCM1 in accordance with the control signal CB1b output from the timing generation circuit 20. When the switch SW714S is controlled in a closed state according to the control signal CB1b, the switch SW714S connects the first terminal and the second terminal thereof and causes the second electrode of the sampling capacitor C71S to be clamped to the clamp level VCM1. Thereby, when the noise-removed optical signal is input to the first electrode of the sampling capacitor C71S while the sampling capacitor C71S is clamped, the second electrode thereof becomes at the clamp level VCM1, and the sampling capacitor C71S has a potential according to a potential difference between the signal level (the potential) of the input noise-removed optical signal and the clamp level VCM1.

The switch SW713R is a switch configured to control the outputting of a signal according to the potential of the second electrode of the sampling capacitor C71R to the feedback unit 72 in accordance with the control signal CB1 output from the timing generation circuit 20. When the switch SW713R is controlled in a closed state according to the control signal CB1, the switch SW713R connects the first terminal and the second terminal thereof and outputs a negative output of a differential signal (hereinafter referred to as a "differential negative signal") into which a difference signal between the noise-removed optical signal and the column reset signal is converted from the second terminal (a differential signal negative output terminal) thereof to the feedback unit 72.

The switch SW713S is a switch configured to control the outputting of a signal according to the potential of the second electrode of the sampling capacitor C71S to the feedback unit 72 in accordance with the control signal CB1 output from the timing generation circuit 20. When the switch SW713S is controlled in a closed state according to the control signal CB1, the switch SW713S connects the first terminal and the second terminal thereof and outputs a positive output of a differential signal (hereinafter referred to as a "differential positive signal") obtained from a difference signal between the noise-removed optical signal and the column reset signal from the second terminal (a differential signal positive output terminal) thereof to the feedback unit 72.

The column output holding unit 71-2 holds each of the noise-removed optical signal and the column reset signal output to the corresponding horizontal signal line 60-2 by the column circuit 50-2, the column circuit 50-5, or the column circuit 50-8. Also, the column output holding unit 71-3 holds each of the noise-removed optical signal and the column reset signal output to the corresponding horizontal signal line 60-3 by the column circuit 50-3, the column circuit 50-6, or the column circuit 50-9. The configurations of the column output holding unit 71-2 and the column output holding unit 71-3 are similar to the configuration of the column output holding unit 71-1, except that the control signal for controlling each switch is different from the column output holding unit 71-1. Accordingly, a detailed description of the configurations of the column output holding unit 71-2 and the column output holding unit 71-3 will be omitted.

In the column output holding unit 71-2, the control signal SHR1 for controlling the switch SW712R is replaced with a control signal SHR2, and the control signal SHS1 for controlling the switch SW712S is replaced with a control signal SHS2. Also, in the column output holding unit 71-2, the control signal CB1 for controlling the switch SW711, the switch SW713R, and the switch SW713S is replaced with a control signal CB2, and the control signal CB1*b* for controlling the switch SW714R and the switch SW714S is replaced with a signal (a control signal CB2*b*) obtained by inverting the control signal CB2. In the column output holding unit 71-3, the control signal SHR1 for controlling the switch SW712R is replaced with a control signal SHR3, and the control signal SHS1 for controlling the switch SW712S is replaced with a control signal SHS3. Also, in the column output holding unit 71-3, the control signal CB1 for controlling the switch SW711, the switch SW713R, and the switch SW713S is replaced with a control signal CB3, and the control signal CB1*b* for controlling the switch SW714R and the switch SW714S is replaced with a signal (a control signal CB3*b*) obtained by inverting the control signal CB3.

According to such a configuration, each of the column output holding units 71-1 to 71-3 holds the column reset signal and the noise-removed optical signal transferred from the column circuit 50 via the corresponding horizontal signal line 60 and outputs a differential signal into which the difference signal between the held noise-removed optical signal and column reset signal is converted.

The feedback unit 72 selects each of the differential negative signal and the differential positive signal output by any one of the column output holding units 71-1 to 71-3 and outputs the selected differential negative signal and differential positive signal to the differential amplification circuit 73. The feedback unit 72 operates as a feedback circuit when the differential amplification circuit 73 amplifies the difference signal. The feedback unit 72 includes a switch SW720R and a switch SW720S. Also, the feedback unit 72 includes a feedback capacitor CR1, a feedback capacitor CR2, a switch SW721R1, a switch SW721R2, a switch SW722R1, a switch SW722R2, a switch SW723R1, a switch SW723R2, a switch SW724R1, a switch SW724R2, a switch SW725R1, and a switch SW725R2. Also, the feedback unit 72 includes a feedback capacitor CS1, a feedback capacitor CS2, a switch SW721S1, a switch SW721S2, a switch SW722S1, a switch SW722S2, a switch SW723S1, a switch SW723S2, a switch SW724S1, a switch SW724S2, a switch SW725S1, and a switch SW725S2.

Each of the first terminal of the switch SW720R and the first terminal of the switch SW720S is connected to the reference voltage VCM1. The second terminal of the switch SW720R is a feedback unit negative output terminal of the feedback unit 72. The feedback unit negative output terminal is connected to an inverting input terminal of the differential amplification circuit 73. The second terminal of the switch SW720S is a feedback unit positive output terminal of the feedback unit 72. The feedback unit positive output terminal is connected to a non-inverting input terminal of the differential amplification circuit 73.

A first terminal of each of the switch SW724R1 and the switch SW724R2 is a negative input terminal of the differential signal (hereinafter referred to as a "differential signal negative input terminal") in the feedback unit 72 and is commonly connected to differential signal negative output terminals of the column output holding units 71 provided in the amplification and selection circuit 70, i.e., second terminals of the switches SW713R provided in the column output holding units 71-1 to 71-3. A second terminal of the switch SW724R1 is connected to each of a first terminal of the switch SW721R1, a first terminal of the switch SW723R1, and a first electrode of the feedback capacitor CR1. A second electrode of the feedback capacitor CR1 is connected to each of a first terminal of the switch SW722R1 and a first terminal of the switch SW725R1. A second terminal of the switch SW721R1 is connected to the reference voltage VCM1. A second terminal of the switch SW722R1 is connected to a reference voltage VCM2. A second terminal of the switch SW723R1 is connected to a second terminal of the switch SW720R (the feedback unit negative output terminal). A second terminal of the switch SW724R2 is connected to a first terminal of the switch SW721R2, a first terminal of the switch SW723R2, and a first electrode of the feedback capacitor CR2. A second electrode of the feedback capacitor CR2 is connected to each of a first terminal of the switch SW722R2 and a first terminal of the switch SW725R2. A second terminal of the switch SW721R2 is connected to the reference voltage VCM1. A second terminal of the switch SW722R2 is connected to the reference voltage VCM2. A second terminal of the switch SW723R2 is connected to a second terminal of the switch SW720R (the feedback unit negative output terminal). A second terminal of each of the switch SW725R1 and the switch SW725R2 is a feedback unit negative input terminal of the feedback unit 72. The feedback unit negative input terminal is connected to a non-inverting output terminal of the differential amplification circuit 73.

A first terminal of each of the switch SW724S1 and the switch SW724S2 is a positive input terminal of the differential signal (hereinafter referred to as a "differential signal positive input terminal") in the feedback unit 72 and is commonly connected to differential signal positive output terminals of the column output holding units 71 provided in the amplification and selection circuit 70, i.e., second terminals of the switches SW713S provided in the column output holding units 71-1 to 71-3. A second terminal of the switch SW724S1 is connected to each of a first terminal of the switch SW721S1, a first terminal of the switch SW723S1, and a first electrode of the feedback capacitor CS1. A second electrode of the feedback capacitor CS1 is connected to each of a first terminal of the switch SW722S1 and a first terminal of the switch SW725S1. A second terminal of the switch SW721S1 is connected to the reference voltage VCM1. A second terminal of the switch SW722S1 is connected to the reference voltage VCM2. A second terminal of the switch SW723S1 is connected to a second terminal (feedback unit positive output terminal) of the switch SW720S. A second terminal of the switch SW724S2 is connected to each of a first terminal of the switch SW721S2, a first terminal of the switch SW723S2, and a first electrode of the feedback capacitor CS2. A second electrode of the feedback capacitor CS2 is connected to a first terminal of the switch SW722S2 and a first terminal of the switch SW725S2. A second terminal of the switch SW721S2 is connected to the reference voltage VCM1. A second terminal of the switch SW722S2 is connected to the reference voltage VCM2. A second terminal of the switch SW723S2 is connected to a second terminal (a feedback unit positive output terminal) of the switch SW720S. A second terminal of each of the switch SW725S1 and the switch SW725S2 is a feedback unit positive input terminal of the feedback unit 72. The feedback unit positive input terminal is connected to an inverting output terminal of the differential amplification circuit 73.

The switch SW720R is a switch for outputting (supplying) a potential (the clamp level VCM1) of the reference voltage VCM1 from the feedback unit negative output terminal in accordance with a control signal Φ0 output from the timing generation circuit 20. The switch SW720S is a switch for outputting (supplying) a potential (the clamp level VCM1) of the reference voltage VCM1 from the feedback unit positive output terminal in accordance with the control signal Φ0 output from the timing generation circuit 20. When each of the switch SW720R and the switch SW720S is controlled in a closed state according to the control signal Φ0, each of the switch SW720R and the switch SW720S connects the first terminal and the second terminal thereof and outputs the clamp level VCM1 from each of the feedback unit negative output terminal and the feedback unit positive output terminal. Thereby, each of an inverting input terminal and a non-inverting input terminal of the differential amplification circuit 73 is at the clamp level VCM1 similar to that of the column output holding unit 71 and the differential amplification circuit 73 is reset.

The switch SW724R1 is a switch configured to transfer a differential negative signal output from any one of the column output holding units 71-1 to 71-3 to the feedback capacitor CR1 in accordance with a control signal Φ2 output from the timing generation circuit 20. When the switch SW724R1 is controlled in a closed state according to the control signal Φ2, the switch SW724R1 connects the first terminal (the differential signal negative input terminal of the feedback unit 72) and the second terminal thereof and transfers a differential negative signal output from any one of the column output holding units 71-1 to 71-3 to the feedback capacitor CR1. Thereby, the differential negative signal is input to the first electrode of the feedback capacitor CR1. That is, a signal level (a potential) of the differential negative signal is applied to the first electrode of the feedback capacitor CR1.

The feedback capacitor CR1 is a capacitor configured to amplify the signal level (the potential) of the transferred differential negative signal.

The switch SW721R1 is a switch for clamping the first electrode of the feedback capacitor CR1 to the potential (the clamp level VCM1) of the reference voltage VCM1 in accordance with a control signal Φ1 output from the timing generation circuit 20. When the switch SW721R1 is controlled in the closed state according to the control signal Φ1, the switch SW721R1 connects the first terminal and the second terminal thereof and causes the first electrode of the feedback capacitor CR1 to be clamped to the clamp level VCM1 similar to that of the column output holding unit 71. The switch SW722R1 is a switch for clamping the second electrode of the feedback capacitor CR1 to the potential of the reference voltage VCM2 (hereinafter referred to as a "clamp level VCM2") in accordance with the control signal Φ1 output from the timing generation circuit 20. When the switch SW722R1 is controlled in a closed state according to the control signal Φ1, the switch SW722R1 connects the first terminal and the second terminal thereof and causes the second electrode of the feedback capacitor CR1 to be clamped to the clamp level VCM2. The feedback capacitor CR1 has a potential according to a potential difference between the clamp level VCM1 and the clamp level VCM2 by clamping the first electrode thereof to the clamp level VCM1 by the switch SW721R1 and clamping the second electrode thereof to the clamp level VCM2 by the switch SW722R1. That is, in the feedback capacitor CR1, the stored charges are reset according to the control of the switch SW721R1 and the switch SW722R1 in a closed state by the control signal Φ1.

The switch SW723R1 is a switch configured to connect the first electrode of the feedback capacitor CR1 and the feedback unit negative output terminal in accordance with the control signal Φ2 output from the timing generation circuit 20. When the switch SW723R1 is controlled in a closed state according to the control signal Φ2, the switch SW723R1 connects the first terminal and the second terminal thereof and connects the first electrode of the feedback capacitor CR1 and the feedback unit negative output terminal, i.e., an inverting input terminal of the differential amplification circuit 73. The switch SW725R1 is a switch configured to connect the second electrode of the feedback capacitor CR1 and the feedback unit negative input terminal in accordance with the control signal Φ2 output from the timing generation circuit 20. When the switch SW725R1 is controlled in a closed state according to the control signal Φ2, the switch SW725R1 connects the first terminal and the second terminal thereof and connects the second electrode of the feedback capacitor CR1 and the feedback unit negative input terminal, i.e., a non-inverting output terminal of the differential amplification circuit 73. The feedback capacitor CR1 is connected between an inverting input terminal and a non-inverting output terminal of the differential amplification circuit 73 according to a connection of the first electrode thereof to the feedback unit negative output terminal by the switch SW723R1 and a connection of the second electrode thereof to the feedback unit negative input terminal by the switch SW725R1. In other words, the feedback capacitor CR1 serves as feedback capacitor of the differential amplification circuit 73 according to control of the switch SW723R1 and the switch SW725R1 in a closed state by the control signal ϕ2.

The switch SW724R2 is a switch configured to transfer a differential negative signal output from any one of the column output holding units 71-1 to 71-3 to the feedback capacitor CR2 in accordance with the control signal Φ1 output from the timing generation circuit 20. When the switch SW724R2 is controlled in a closed state according to the control signal Φ1, the switch SW724R2 connects the first terminal (the differential signal negative input terminal of the feedback unit 72) and the second terminal thereof, and transfers a differential negative signal output from any one of the column output holding units 71-1 to 71-3 to the feedback capacitor CR2. Thereby, the differential negative signal is input to the first electrode of the feedback capacitor CR2. That is, the signal level (the potential) of the differential negative signal is applied to the first electrode of the feedback capacitor CR2.

The feedback capacitor CR2 is a capacitor configured to hold (store) charges corresponding to the signal level (the potential) of the transferred differential negative signal. The feedback capacitor CR2 stores charges according to a potential difference between a potential applied to the first electrode thereof and a potential applied to the second electrode thereof.

The switch SW721R2 is a switch for clamping the first electrode of the feedback capacitor CR2 to the clamp level VCM1 in accordance with the control signal Φ2 output from the timing generation circuit 20. When the switch SW721R2 is controlled in a closed state according to the control signal Φ2, the switch SW721R2 connects the first terminal and the second terminal thereof, and causes the first electrode of the feedback capacitor CR2 to be clamped to the clamp level VCM1 similar to that of the column output holding unit 71. The switch SW722R2 is a switch for clamping the second electrode of the feedback capacitor CR2 to the clamp level VCM2 in accordance with the control signal Φ2 output from the timing generation circuit 20. When the switch SW722R2 is controlled in a closed state according to the control signal Φ2, the switch SW722R2 connects the first terminal and the second terminal thereof and causes the second electrode of the feedback capacitor CR2 to be clamped to the clamp level VCM2. The feedback capacitor CR2 has a potential according to a potential difference between the clamp level VCM1 and the clamp level VCM2 by clamping the first electrode to the clamp level VCM1 by the switch SW721R2 and clamping the second electrode to the clamp level VCM2 by the switch SW722R2. That is, in the feedback capacitor CR2, stored charges are reset, as in the feedback capacitor CR1, by controlling the switch SW721R2 and the switch SW722R2 in a closed state according to the control signal Φ2.

The switch SW723R2 is a switch configured to connect the first electrode of the feedback capacitor CR2 and the feedback unit negative output terminal in accordance with the control signal Φ1 output from the timing generation circuit 20. When the switch SW723R2 is controlled in a closed state according to the control signal Φ1, the switch SW723R2 connects the first terminal and the second terminal thereof and connects the first electrode of the feedback capacitor CR2 and the feedback unit negative output terminal, i.e., an inverting input terminal of the differential amplification circuit 73. The switch SW725R2 is a switch configured to connect the second electrode of the feedback capacitor CR2 and the feedback unit negative input terminal in accordance with the control signal Φ1 output from the timing generation circuit 20. When the switch SW725R2 is controlled in a closed state according to the control signal Φ1, the switch SW725R2 connects the first terminal and the second terminal and connects the second electrode of the feedback capacitor CR2 and the feedback unit negative input terminal of the feedback capacitor CR2, i.e., a non-inverting output terminal of the differential amplification circuit 73. The feedback capacitor CR2 is connected between an inverting input terminal and a non-inverting output terminal of the differential amplification circuit 73 according to a connection of the first electrode thereof to the feedback unit negative output terminal by the switch SW723R2 and a connection of the second electrode thereof to the feedback unit negative input terminal by the switch SW725R2. In other words, the feedback capacitor CR2 serves as a feedback capacitor of the differential amplification circuit 73, as in the feedback capacitor CR1, according to control of the switch SW723R2 and the switch SW725R2 in a closed state according to the control signal Φ1.

The switch SW724S1 is a switch configured to transfer a differential positive signal output from any one of the column output holding units 71-1 to 71-3 to the feedback capacitor CS1 in accordance with the control signal Φ2 output from the timing generation circuit 20. When the switch SW724S1 is controlled in a closed state according to the control signal Φ2, the switch SW724S1 connects the first terminal (the differential signal positive input terminal of the feedback unit 72) and the second terminal thereof, and transfers the differential positive signal output from any one of the column output holding units 71-1 to 71-3 to the feedback capacitor CS1. Thereby, the differential positive signal is input to the first electrode of the feedback capacitor CS1. That is, a signal level (a potential) of the differential positive signal is applied to the first electrode of the feedback capacitor CS1.

The feedback capacitor CS1 is a capacitor configured to amplify a signal level (a potential) of the transferred differential positive signal.

The switch SW721S1 is a switch for clamping the first electrode of the feedback capacitor CS1 to the clamp level VCM1 in accordance with the control signal Φ1 output from the timing generation circuit 20. When the switch SW72151 is controlled in a closed state according to the control signal Φ1, the switch SW72151 connects the first terminal and the second terminal thereof and causes the first electrode of the feedback capacitor CS1 to be clamped to the clamp level VCM1 as in the column output holding unit 71. The switch SW722S1 is a switch for clamping the second electrode of the feedback capacitor CS1 to the clamp level VCM2 in accordance with the control signal Φ1 output from the timing generation circuit 20. When the switch SW722S1 is controlled in a closed state according to the control signal Φ1, the switch SW722S1 connects the first terminal and the second terminal thereof and causes the second electrode of the feedback capacitor CS1 to be clamped to the clamp level VCM2. The feedback capacitor CS1 has a potential according to a potential difference between the clamp level VCM1 and the clamp level VCM2 by clamping the first electrode thereof to the clamp level VCM1 by the switch SW72151 and clamping the second electrode thereof to the clamp level VCM2 by the switch SW722S1. In other words, the feedback capacitor CS1 resets stored charges as in the feedback capacitor CR1 by controlling the switch SW72151 and the switch SW722S1 in a closed state according to the control signal Φ1.

The switch SW723S1 is a switch configured to connect the first electrode of the feedback capacitor CS1 and the feedback unit positive output terminal in accordance with the control signal Φ2 output from the timing generation circuit 20. When the switch SW723S1 is controlled in a closed state according to the control signal Φ2, the switch SW723S1 connects the first terminal and the second terminal thereof and connects the first electrode of the feedback capacitor CS1 and the feedback unit positive output terminal, i.e., a non-inverting input terminal of the differential amplification circuit 73. The switch SW725S1 is a switch configured to connect the second electrode of the feedback capacitor CS1 and the feedback unit positive input terminal in accordance with the control signal Φ2 output from the timing generation circuit 20. When the switch SW725S1 is controlled in a closed state according to the control signal Φ2, the switch SW725S1 connects the first terminal and the second terminal thereof and connects the second electrode of the feedback capacitor CS1 and the feedback unit positive input terminal, i.e., an inverting output terminal of the differential amplification circuit 73. The feedback capacitor CS1 is connected between an inverting input terminal and a non-inverting output terminal of the differential amplification circuit 73 according to a connection of the first electrode thereof to the feedback unit positive output terminal by the switch SW723S1 and a connection of the second electrode thereof to the feedback unit positive input terminal by the switch SW725S1. In other words, the feedback capacitor CS1 serves as a feedback capacitor of the differential amplification circuit 73 as in the feedback capacitor CR1 according to control of the switch SW723S1 and the switch SW725S1 in a closed state by the control signal Φ2.

The switch SW724S2 is a switch configured to transfer a differential positive signal output from any one of the column output holding units 71-1 to 71-3 to the feedback capacitor CS2 in accordance with the control signal Φ1 output from the timing generation circuit 20. When the switch SW724S2 is controlled in a closed state according to the control signal Φ1, the switch SW724S2 connects the first terminal (the differential signal positive input terminal of the feedback unit 72) and the second terminal thereof, and transfers a differential positive signal output from any one of the column output holding units 71-1 to 71-3 to the feedback capacitor CS2. Thereby, the differential positive signal is input to the first electrode of the feedback capacitor CS2. That is, the signal level (the potential) of the differential positive signal is applied to the first electrode of the feedback capacitor CS2.

The feedback capacitor CS2 is a capacitor configured to amplify a signal level (a potential) of the transferred differential positive signal.

The switch SW721S2 is a switch for clamping the first electrode of the feedback capacitor CS2 to the clamp level VCM1 in accordance with the control signal Φ2 output from the timing generation circuit 20. When the switch SW721S2 is controlled in a closed state according to the control signal Φ2, the switch SW721S2 connects the first terminal and the second terminal thereof and causes the first electrode of the feedback capacitor CS2 to be clamped to the clamp level VCM1 similar to that of the column output holding unit 71. The switch SW722S2 is a switch for clamping the second electrode of the feedback capacitor CS2 to the clamp level VCM2 in accordance with the control signal Φ2 output from the timing generation circuit 20. When the switch SW722S2 is controlled in a closed state according to the control signal Φ2, the switch SW722S2 connects the first terminal and the second terminal thereof and causes the second electrode of the feedback capacitor CS2 to be clamped to the clamp level VCM2. The feedback capacitor CS2 has a potential according to a potential difference between the clamp level VCM1 and the clamp level VCM2 by clamping the first electrode to the clamp level VCM1 by the switch SW721S2 and clamping the second electrode to the clamp level VCM2 by the switch SW722S2. That is, in the feedback capacitor CS2, stored charges are reset, as in the feedback capacitor CR1, by controlling the switch SW721S2 and the switch SW722S2 in a closed state according to the control signal Φ2.

The switch SW723S2 is a switch configured to connect the first electrode of the feedback capacitor CS2 and the feedback unit positive output terminal in accordance with the control signal Φ1 output from the timing generation circuit 20. When the switch SW723S2 is controlled in a closed state according to the control signal Φ1, the switch SW723S2 connects the first terminal and the second terminal thereof and connects the first electrode of the feedback capacitor CS2 and the feedback unit positive output terminal, i.e., a non-inverting input terminal of the differential amplification circuit 73. The switch SW725S2 is a switch configured to connect the second electrode of the feedback capacitor CS2 and the feedback unit positive input terminal in accordance with the control signal Φ1 output from the timing generation circuit 20. When the switch SW725S2 is controlled in a closed state according to the control signal Φ1, the switch SW725S2 connects the first terminal and the second terminal thereof, and connects the second electrode of the feedback capacitor CS2 and the feedback unit positive input terminal, i.e., an inverting output terminal of the differential amplification circuit 73. The feedback capacitor CS2 is connected between an inverting input terminal and a non-inverting output terminal of the differential amplification circuit 73 according to a connection of the first electrode thereof to the feedback unit positive output terminal by the switch SW723S2 and a connection of the second electrode thereof to the feedback unit positive input terminal by the switch SW725S2. In other words, the feedback capacitor CS2 serves as a feedback capacitor of the differential amplification circuit 73, as in the feedback capacitor CS1, according to control of the switch SW723S2 and the switch SW725S2 in a closed state according to the control signal Φ1.

According to such a configuration, the feedback unit 72 operates as a feedback circuit configured to select a differential positive signal and a differential negative signal output by any column output holding unit 71 and supply the selected differential positive signal and differential negative signal to the differential amplification circuit 73. More specifically, in the feedback unit 72, if the corresponding switch is controlled in a closed state according to the control signal Φ2 output from the timing generation circuit 20, a set of the feedback capacitor CR1 holding the signal level (the potential) of the differential negative signal and the feedback capacitor CS1 holding the signal level (the potential) of the differential positive signal operates as a feedback capacitor of the differential amplification circuit 73. Also, in the feedback unit 72, if the corresponding switch is controlled in a closed state according to the control signal Φ1 output from the timing generation circuit 20, a set of the feedback capacitor CR2 holding the signal level (the potential) of the differential negative signal and the feedback capacitor CS2 holding the signal level (the potential) of the differential positive signal operates as a feedback capacitor of the differential amplification circuit 73.

Also, if the corresponding switch is controlled in a closed state according to the control signal Φ1 output from the timing generation circuit 20, the feedback unit 72 resets charges stored in the feedback capacitor constituted of the set of the feedback capacitor CR1 and the feedback capacitor CS1. Also, if the corresponding switch is controlled in a closed state according to the control signal Φ2 output from the timing generation circuit 20, the feedback unit 72 resets charges stored in the feedback capacitor constituted of the set of the feedback capacitor CR2 and the feedback capacitor CS2.

The differential amplification circuit 73 amplifies signals input to the inverting input terminal and the non-inverting input terminal in accordance with the connected feedback capacitors, and outputs the amplified signals from the non-inverting output terminal and the inverting output terminal to the analog-to-digital conversion circuit 80. More specifically, an output signal VOUTP having a voltage according to the signal level (the potential) of the differential negative signal input to the inverting input terminal is output from the non-inverting output terminal, and an output signal VOUTN having a voltage according to the signal level (the potential) of the differential positive signal input to the non-inverting input terminal is output from the inverting output terminal.

Also, an amplification factor of the signal in the output signal VOUTP output from the non-inverting output terminal by the differential amplification circuit 73 is determined in accordance with a ratio between the sampling capacitor C71R provided in any column output holding unit 71 and the feedback capacitor CR1 or the feedback capacitor CR2 provided in the feedback unit 72. Also, an amplification factor of the signal in the output signal VOUTN output from the inverting output terminal by the differential amplification circuit 73 is determined in accordance with a ratio between the sampling capacitor C71S provided in any column output holding unit 71 and the feedback capacitor CS1 or the feedback capacitor CS2 provided in the feedback unit 72.

Each of the output signal VOUTP and the output signal VOUTN output by the differential amplification circuit 73 is analog-to-digital converted into a digital signal according to a difference between the output signal VOUTP and the output signal VOUTN by the analog-to-digital conversion circuit 80 and the digital signal is output to the output circuit 90. Then, the output circuit 90 converts the digital signal output from the analog-to-digital conversion circuit 80 and outputs the converted digital signal to the outside of the solid-state imaging device 1.

Figure 5:
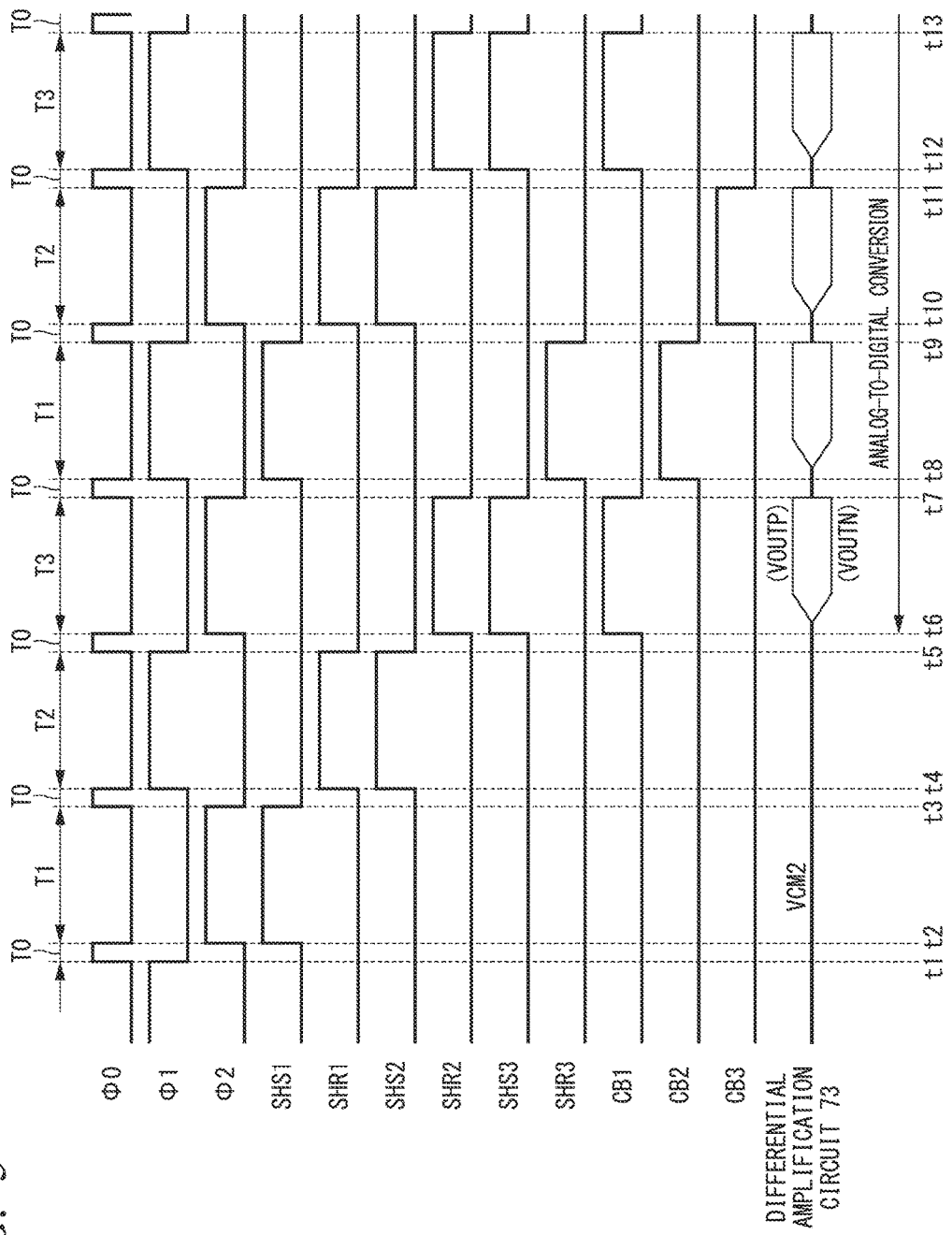
FIG. 5 is a timing chart showing an example of a driving timing of the amplification and selection circuit provided in the solid-state imaging device according to the first embodiment of the present invention.

Next, a driving timing of the amplification and selection circuit 70 provided in the solid-state imaging device 1 of the first embodiment will be described. FIG. 5 is a timing chart showing an example of a driving timing of the amplification and selection circuit 70 provided in the solid-state imaging device 1 according to the first embodiment of the present invention. In FIG. 5, an example of timings of control signals for driving components within each column output holding unit 71 provided in the amplification and selection circuit 70 and control signals for driving components within the feedback unit 72 is shown. Also, in FIG. 5, an example of output signals output from output terminals of the differential amplification circuit 73 is shown. An example of the driving timing shown in FIG. 5 is a driving timing after exposure in the solid-state imaging device 1 is completed and a pixel signal output from each pixel 11 provided in the pixel array unit 10 is read to the corresponding column circuit 50, i.e., after a horizontal blanking period (a CDS period) is completed at driving timings of the pixel 11 and the column circuit 50 shown in FIG. 3. Accordingly, each column circuit 50 is in a state in which the noise-removed optical signal is held.

The operation of the amplification and selection circuit 70 includes an operation in which the column output holding unit 71 holds the noise-removed optical signal (hereinafter referred to as an "optical signal holding operation"), an operation in which the column output holding unit 71 holds the column reset signal (hereinafter referred to as "reset signal holding operation"), and an operation of outputting each of a differential negative signal and a differential positive signal into which a difference signal between the noise-removed optical signal and the column reset signal held by the column output holding unit 71 is converted (hereinafter referred to as a "signal output operation"). In the solid-state imaging device 1, the different column output holding units 71 perform their operations in parallel, simultaneously. However, in the solid-state imaging device 1, different column output holding units 71 do not perform the same operation, i.e., control the optical signal holding operation, the reset signal holding operation, and the signal output operation so that they do not overlap in the same period. The signal output operation may be an operation in which the feedback unit 72 selects the differential positive signal and the differential negative signal output from any column output holding unit 71 and outputs the selected differential positive signal and differential negative signal to the differential amplification circuit 73, and the differential amplification circuit 73 amplifies a difference signal between the differential positive signal and the differential negative signal and outputs the amplified difference signal to the analog-to-digital conversion circuit 80.

In the following description, the timing generation circuit 20 sets the control signals to a "High" level, so that corresponding components, i.e., the switches provided in the column output holding unit 71 and the feedback unit 72, will be described as being in a closed state.

In an initial state before a time t1, the timing generation circuit 20 sets the control signal CB1, the control signal CB2, and the control signal CB3 to a "Low" level. Thus, the control signal CB1b, the control signal CB2b, and the control signal CB3b, which are signals obtained by inverting the control signal CB1, the control signal CB2, and the control signal CB3, are at a "High" level. Thereby, the switch SW714R and the switch SW714S provided in the column output holding units 71 are brought into a closed state, and the second electrodes of the sampling capacitors C71R and C71S are clamped to the clamp level VCM1.

Also, in the initial state, the timing generation circuit 20 sets the control signal Φ1 to a "High" level. Thereby, the switch SW721R1 and the switch SW721S1 provided in the feedback unit 72 are brought into a closed state, and the first electrodes of the feedback capacitor CR1 and the feedback capacitor CS1 are clamped to the clamp level VCM1. Also, the switch SW722R1 and the switch SW722S1 provided in the feedback unit 72 is brought into a closed state, and the second electrodes of the feedback capacitor CR1 and the feedback capacitor CS1 are clamped to the clamp level VCM2. That is, in the initial state, charges stored in each of the feedback capacitor CR1 and the feedback capacitor CS1 are reset.

From this initial state, the timing generation circuit 20 starts driving the amplification and selection circuit 70. When the timing generation circuit 20 starts driving the amplification and selection circuit 70, the control signal Φ1 is set to a "Low" level to set the switch SW721R1 and the switch SW 721S1 and the switch SW722R1 and the switch SW722S1 to an open state, and resetting of the feedback capacitor CR1 and the feedback capacitor CS1 is completed.

Then, the timing generation circuit 20 first initializes (resets) the differential amplification circuit 73 provided in the amplification and selection circuit 70 in a reset period T0. Thereafter, the timing generation circuit 20 sequentially performs the optical signal holding operation, the reset signal holding operation, and the signal output operation in each column output holding unit 71. In the following description, in terms of the column output holding unit 71-1, a period during which the column output holding unit 71-1 performs the optical signal holding operation is referred to as an optical signal holding period T1, a period during which the column output holding unit 71-1 performs the reset signal holding operation is referred to as a reset signal holding period T2, and a period during which the column output holding unit 71-1 performs the signal output operation is referred to as a signal output period T3.

In the reset period T0, at the time t1, the timing generation circuit 20 sets the control signal Φ0 to a "High" level to set the switch SW720R and the switch SW720S provided in the feedback unit 72 to a closed state. Thereby, the feedback unit 72 outputs the potential (the clamp level VCM1) of the reference voltage VCM1 from each of the feedback unit negative output terminal and the feedback unit positive output terminal. Thereby, the inverting input terminal and the non-inverting input terminal of the differential amplification circuit 73 are set to the clamp level VCM1 and reset. Thus, the differential amplification circuit 73 outputs the output signal VOUTP and the output signal VOUTN having voltages according to the potential of the reference voltage VCM1 from the non-inverting output terminal and the inverting output terminal.

Subsequently, at a time t2, the timing generation circuit 20 sets the control signal Φ0 to a "Low" level to set the switch SW720R and the switch SW720S to an open state, and releases the resetting of the differential amplification circuit 73. That is, the reset period T0 ends.

When the reset period T0 ends, the timing generation circuit 20 starts controlling the optical signal holding operation in the column output holding unit 71-1. In the optical signal holding period T1 during which the optical signal holding operation of the column output holding unit 71-1 is controlled, at the time t2, the timing generation circuit 20 sets the control signal SHS1 to a "High" level to set the switch SW712S provided in the column output holding unit 71-1 to a closed state. Thereby, a noise-removed optical signal transferred from the column circuit 50 via the horizontal signal line 60-1 to which the column output holding unit 71-1 corresponds is transferred to the sampling capacitor C71S via the switch SW712S and a signal level (a potential) of the noise-removed optical signal is applied to the first electrode of the sampling capacitor C71S. Thereby, the sampling capacitor C71S stores charges corresponding to a potential difference between the potential of the noise-removed optical signal and the clamp level VCM1 of the second electrode of the sampling capacitor C71S. In other words, the sampling capacitor C71S samples and holds the noise-removed optical signal on the basis of the clamp level VCM1.

Also, at the time t2, the timing generation circuit 20 sets the control signal Φ2 to a "High" level to set the switches SW721R2 and SW721S2 and the switches SW722R2 and SW722S2 provided in the feedback unit 72 to a closed state. Thereby, the first electrodes of the feedback capacitor CR2 and the feedback capacitor CS2 provided in the feedback unit 72 are clamped to the clamp level VCM1, the second electrodes thereof are clamped to the clamp level VCM2, and charges stored in the feedback capacitor CR2 and the feedback capacitor CS2 are reset.

At the time t2, the switches SW723R1 and SW725R1 and the switches SW723S1 and SW725S1 provided in the feedback unit 72 are brought into a closed state according to a "High" level of the control signal Φ2. Thereby, the inverting input terminal of the differential amplification circuit 73 is connected to the first electrode of the feedback capacitor CR1 via the switch SW723R1 and the non-inverting output terminal of the differential amplification circuit 73 is connected to the second electrode of the feedback capacitor CR1 via the switch SW725R1. Also, the non-inverting input terminal of the differential amplification circuit 73 is connected to the first electrode of the feedback capacitor CS1 via the switch SW723S1 and the inverting output terminal of the differential amplification circuit 73 is connected to the second electrode of the feedback capacitor CS1 via the switch SW725S1. Further, at this time, the switch SW724R1 and the switch SW724S1 is also brought into a closed state according to a "High" level of the control signal Φ2. However, at this time, because the control signal CB1 is at a "Low" level, the feedback unit 72 is not connected to any column output holding unit 71. That is, the set of the feedback capacitor CR1 and the feedback capacitor CS1 in the reset state is connected as a feedback capacitor to the differential amplification circuit 73. Accordingly, the differential amplification circuit 73 outputs the output signal VOUTP and the output signal VOUTN having voltages corresponding to the feedback capacitor CR1 and the feedback capacitor CS1 in the reset state from the non-inverting output terminal and the inverting output terminal. That is, the differential amplification circuit 73 outputs the output signal VOUTP and the output signal VOUTN in the reset state to the analog-to-digital conversion circuit 80. Also, at this time, the output signal VOUTP and the output signal VOUTN output from the differential amplification circuit 73 may be analog-to-digital converted into digital signals in the analog-to-digital conversion circuit 80, but are not used as image data.

Subsequently, at a time t3, the timing generation circuit 20 sets the control signal SHS1 to a "Low" level to set the switch SW712S to an open state, and ends the optical signal holding period T1 during which the noise-removed optical signal is held in the sampling capacitor C71S within the column output holding unit 71-1. Also, simultaneously, the timing generation circuit 20 sets the control signal Φ2 to a "Low" level to set each of the switches SW721R2 and SW721S2 and the switches SW722R2 and SW722S2 to an open state and ends the resetting of the feedback capacitor CR2 and the feedback capacitor CS2. According to the "Low" level of the control signal Φ2 at the time t3, the connection of the feedback capacitor (the set of the feedback capacitor CR1 and the feedback capacitor CS1) to the differential amplification circuit 73 is disconnected.

When the optical signal holding period T1 ends, the timing generation circuit 20 controls the control signal Φ0 as in the reset period T0 to initialize (reset) the differential amplification circuit 73. Thereafter, at a time t4, the resetting of the differential amplification circuit 73 is released. Also, in the example of the driving timing shown in FIG. 5, a period from the time t3 to the time t4 is also represented as the reset period T0.

When the reset period T0 ends at the time t4, the timing generation circuit 20 starts controlling the reset signal holding operation in the column output holding unit 71-1. For example, in the reset signal holding period T2 during which the reset signal holding operation of the column output holding unit 71-1 is controlled, the timing generation circuit 20 sets the control signal SHR1 to a "High" level to set the switch SW712R provided in the column output holding unit 71-1 to a closed state at the time t4. Thereby, the column reset signal transferred from the column circuit 50 via the horizontal signal line 60-1 to which the column output holding unit 71-1 corresponds is transferred to the sampling capacitor C71R via the switch SW712R, and a signal level (a potential) of the column reset signal is applied to the first electrode of the sampling capacitor C71R. Thereby, the sampling capacitor C71R stores charges corresponding to the potential difference between the potential of the column reset signal and the clamp level VCM1 of the second electrode of the sampling capacitor C71R. In other words, the sampling capacitor C71R samples and holds the column reset signal on the basis of the clamp level VCM1.

Also, at the time t4, the timing generation circuit 20 sets the control signal Φ1 to a "High" level to set the switches SW721R1 and SW721S1 and the switches SW722R1 and SW722S1 provided in the feedback unit 72 to a closed state and resets each of the feedback capacitor CR1 and the feedback capacitor CS1 provided in the feedback unit 72.

Also, at the time t4, the switches SW723R2 and SW725R2 and the switches SW723S2 and SW725S2 provided in the feedback unit 72 are brought into a closed state according to a "High" level of the control signal Φ1. Thereby, the inverting input terminal of the differential amplification circuit 73 is connected to the first electrode of the feedback capacitor CR2 via the switch SW 723R2 and the non-inverting output terminal of the differential amplification circuit 73 is connected to the second electrode of the feedback capacitor CR2 via the switch SW725R2. The non-inverting input terminal of the differential amplification circuit 73 is connected to the first electrode of the feedback capacitor CS2 via the switch SW723S2 and the inverting output terminal of the differential amplification circuit 73 is connected to the second electrode of the feedback capacitor CS2 via the switch SW725S2. Further, at this time, the switch SW724R2 and the switch SW724S2 are also in a closed state according to a "High" level of the control signal Φ1. However, at this time, because the control signal CB1 is at a "Low" level, the feedback unit 72 is not connected to any column output holding unit 71 as in the optical signal holding period T1 and is in state in which the set of the feedback capacitor CR2 and the feedback capacitor CS2 in the reset state is connected as a feedback capacitor. Accordingly, as in the optical signal holding period T1, the differential amplification circuit 73 outputs the output signal VOUTP and the output signal VOUTN in the reset state according to the feedback capacitor CR2 and the feedback capacitor CS2 in the reset state from each of the non-inverting output terminal and the inverting output terminal to the analog-to-digital conversion circuit 80. At this time, both the output signal VOUTP and the output signal VOUTN output from the differential amplification circuit 73 may be analog-to-digital converted to digital signals in the analog-to-digital conversion circuit 80 as in the optical signal holding period T1, but are not used as image data.

Subsequently, at a time t5, the timing generation circuit 20 sets the control signal SHR1 to a "Low" level to set the switch SW712R to the open state, and ends the reset signal holding period T2 in which the column reset signal is held in the sampling capacitor C71R within the column output holding unit 71-1. Also, simultaneously, the timing generation circuit 20 sets the control signal Φ1 to a "Low" level to set each of the switches SW721R1 and SW721S1 and the switches SW722R1 and SW722S1 to an open state, and ends the resetting of the feedback capacitor CR1 and the feedback capacitor CS1. According to the "Low" level of the control signal Φ1 at the time t5, the connection of the feedback capacitor (the set of the feedback capacitor CR2 and the feedback capacitor CS2) to the differential amplification circuit 73 is released.

Also, the timing generation circuit 20 controls the optical signal holding operation in the column output holding unit 71-2 simultaneously in the reset signal holding period T2 in the column output holding unit 71-1. In the control of the optical signal holding operation of the column output holding unit 71-2, the timing generation circuit 20 controls the control signal SHS2 in place of the optical signal holding operation in the column output holding unit 71-1, i.e., the control signal SHS1 controlled in the optical signal holding period T1. More specifically, the timing generation circuit 20 sets the control signal SHS2 to a "High" level at the time t4 and sets the control signal SHS2 to a "Low" level at the time t5. The operation of each component within the column output holding unit 71-2 at this time can be conceived to be similar to the operation of each component within the column output holding unit 71-1 in the optical signal holding operation of the column output holding unit 71-1. Accordingly, a detailed description of the operation of each component within the column output holding unit 71-2 in the optical signal holding operation of the column output holding unit 71-2 will be omitted.

When the reset signal holding period T2 ends, the timing generation circuit 20 controls the control signal Φ0 as in the previous reset period T0 to initialize (reset) the differential amplification circuit 73 and then releases the resetting of the differential amplification circuit 73 at a time t6. In the example of the driving timing shown in FIG. 5, a period from the time t5 to the time t6 is also represented as the reset period T0.

When the reset period T0 ends at the time t6, the timing generation circuit 20 starts controlling the signal output operation in the column output holding unit 71-1. That is, control for outputting the output signal based on the noise-removed optical signal and the column reset signal held in the column output holding unit 71-1 by the feedback unit 72 and the differential amplification circuit 73 is started. In the signal output period T3 for controlling the signal output operation of the column output holding unit 71-1, at the time t6, the timing generation circuit 20 sets the control signal CB1 to a "High" level to set the switch SW711, the switch SW713R, and the switch SW713S provided in the column output holding unit 71-1 to a closed state. Also, simultaneously, the timing generation circuit 20 sets the control signal Φ2 to a "High" level to set the switches SW724R1, SW723R1, and SW725R1 and the switches SW724S1, SW723S1, and SW725S1 provided in the feedback unit 72 to a closed state. Thereby, the inverting input terminal of the differential amplification circuit 73 is connected to the second electrode of the sampling capacitor C71R and the first electrode of the feedback capacitor CR1 via the switch SW713R, the switch SW724R1, and the switch SW723R1 and the non-inverting output terminal of the differential amplification circuit 73 is connected to the second electrode of the feedback capacitor CR1 via the switch SW725R1. The non-inverting input terminal of the differential amplification circuit 73 is connected to the second electrode of the sampling capacitor C71S and the first electrode of the feedback capacitor CS1 via the switch SW713S, the switch SW724S1, and the switch SW723S1 and the inverting output terminal of the differential amplification circuit 73 is connected to the second electrode of the feedback capacitor CS1 via the switch SW725S1. According to this connection, the set of the feedback capacitor CR1 and the feedback capacitor CS1 operates as a feedback capacitor of the differential amplification circuit 73. Thereby, the differential amplification circuit 73 outputs each of the output signal VOUTP and the output signal VOUTN amplified by an amplification factor according to a ratio between the sampling capacitors C71R and C71S and the feedback capacitors CR1 and CS1.

More specifically, the differential amplification circuit 73 outputs an output signal VOUTP having a potential according to the signal level (the potential) of the column reset signal held in the sampling capacitor C71R input to the inverting input terminal and the potential (the clamp level VCM1) of the first electrode of the reset feedback capacitor CR1 from the non-inverting output terminal thereof. Also, the differential amplification circuit 73 outputs an output signal VOUTN having a potential according to the signal level (the potential) of the noise-removed optical signal held in the sampling capacitor C71S input to the non-inverting input terminal and the potential (the clamp level VCM1) of the first electrode of the reset feedback capacitor CS1 from the inverting output terminal thereof.

At this time, the switch SW711 short-circuits the first electrode of the sampling capacitor C71R and the first electrode of the sampling capacitor C71S. In other words, the feedback capacitor CR1, the sampling capacitor C71R, the sampling capacitor C71S, and the feedback capacitor CS1 are connected in series between the non-inverting output terminal and the inverting output terminal of the differential amplification circuit 73. Thus, in the amplification in the differential amplification circuit 73, it is possible to have an effect of amplifying a differential negative signal and a differential positive signal into which a differential signal between the signal level (the potential) of the column reset signal held in the sampling capacitor C71R and the signal level (the potential) of the noise-removed optical signal held in the sampling capacitor C71S is converted. That is, the differential amplification circuit 73 outputs the output signal VOUTP and the output signal VOUTN obtained by performing the correlated double sampling process on the basis of the noise-removed optical signal and the column reset signal transferred from the column circuit 50 via the horizontal signal line 60-1 to which the column output holding unit 71-1 corresponds from the non-inverting output terminal and the inverting output terminal thereof. Then, the analog-to-digital conversion circuit 80 outputs a digital signal after analog-to-digital conversion is performed on the basis of the output signal VOUTP and the output signal VOUTN output by the differential amplification circuit 73 to the output circuit 90 and the output circuit 90 converts a signal form thereof to output a converted signal to the outside of the solid-state imaging device 1.

Also, at the time t6, the switches SW721R2 and SW721S2 and the switches SW722R2 and SW722S2 provided in the feedback unit 72 are brought into a closed state according to a "High" level of the control signal Φ2. Thereby, the feedback capacitor CR2 and the feedback capacitor CS2 provided in the feedback unit 72 are reset, respectively.

Subsequently, at a time t7, the timing generation circuit 20 sets the control signal CB1 to a "Low" level to set the switch SW711, the switch SW713R, and the switch SW713S to an open state and sets the control signal Φ2 to a "Low" level to set the switches SW724R1, SW723R1, and SW725R1, and the switches SW724S1, SW72351, and SW725S1 to an open state. Thereby, a connection of the sampling capacitor C71R, the sampling capacitor C71S, and the feedback capacitor (the set of the feedback capacitor CR1 and the feedback capacitor CS1) to the differential amplification circuit 73 is disconnected and the signal output period T3 in which an output signal based on the noise-removed optical signal and the column reset signal held in the column output holding unit 71-1 is output ends. Also, at the time t7, the switches SW721R2 and SW721S2 and the switches SW722R2 and SW722S2 are set to an open state according to a "Low" level of the control signal Φ2, and the resetting of the feedback capacitor CR2 and the feedback capacitor CS2 ends.

Also, the timing generation circuit 20 controls the reset signal holding operation in the column output holding unit 71-2 simultaneously in the signal output period T3 in the column output holding unit 71-1. In the control of the reset signal holding operation of the column output holding unit 71-2, the timing generation circuit 20 controls the control signal SHR2 in place of the reset signal holding operation in the column output holding unit 71-1, i.e., the control signal SHR1 controlled in the reset signal holding period T2. More specifically, the timing generation circuit 20 sets the control signal SHR2 to a "High" level at the time t6 and sets the control signal SHR2 to a "Low" level at the time t7. At this time, the operation of each component in the column output holding unit 71-2 can be conceived to be similar to the operation of each component within the column output holding unit 71-1 in the optical signal holding operation of the column output holding unit 71-1. Accordingly, a detailed description of the operation of each component within the column output holding unit 71-2 in the reset signal holding operation of the column output holding unit 71-2 will be omitted.

Also, the timing generation circuit 20 controls the optical signal holding operation in the column output holding unit 71-3 simultaneously during the signal output period T3 in the column output holding unit 71-1. In the control of the optical signal holding operation of the column output holding unit 71-3, the timing generation circuit 20 controls the control signal SHS3 in place of the control signal SHS1 controlled in the optical signal holding operation (the optical signal holding period T1) in the column output holding unit 71-1. More specifically, the timing generation circuit 20 sets the control signal SHS3 to a "High" level at the time t6 and sets the control signal SHS3 to a "Low" level at the time t7. At this time, because the operation of each component within the column output holding unit 71-3 can be conceived to be similar to the operation of each component within the column output holding unit 71-1 in the optical signal holding operation of the column output holding unit 71-1, a detailed description thereof will be omitted.

When the signal output period T3 ends, the timing generation circuit 20 controls the control signal Φ0 as in the previous reset period T0 to initialize (reset) the differential amplification circuit 73, and then releases the resetting of the differential amplification circuit 73 at a time t8. Also, in the example of the driving timing shown in FIG. 5, a period from the time t7 to the time t8 is also represented as the reset period T0.

When the reset period T0 ends at a time t8, the timing generation circuit 20 similarly sequentially controls the optical signal holding operation, the reset signal holding operation, and the signal output operation in the column output holding unit 71-1 thereafter. In the optical signal holding period T1, the reset signal holding period T2, and the signal output period T3 in the column output holding unit 71-1, simultaneously, the timing generation circuit 20 sequentially controls any operation of the optical signal holding operation, the reset signal holding operation, and the signal output operation in the column output holding unit 71-2 and the column output holding unit 71-3 so that the same operation does not overlap.

In the example of the driving timing shown in FIG. 5, in the optical signal holding period T1 in the column output holding unit 71-1 from the time t8 to the time t9, the timing generation circuit 20 controls the signal output operation in the column output holding unit 71-2. In the signal output operation in the column output holding unit 71-2, the timing generation circuit 20 sets the control signal CB2 and the control signal Φ1 to a "High" level. Thereby, the switch SW711, the switch SW713R, and the switch SW713S provided in the column output holding unit 71-2 and the switches SW724R2, SW723R2, and SW725R2 and the switches SW724S2, SW723S2, and SW725S2 provided in the feedback unit 72 are set to a closed state. Thereby, the sampling capacitor C71R, the sampling capacitor C71S, and the feedback capacitor (the set of the feedback capacitor CR2 and the feedback capacitor CS2) in the column output holding unit 71-2 are connected to the differential amplification circuit 73, and an output signal based on the noise-removed optical signal and the column reset signal held in the column output holding unit 71-2 is output thereto.

Also, in the example of the driving timing shown in FIG. 5, in the reset signal holding period T2 in the column output holding unit 71-1 from a time t10 to a time t11, the timing generation circuit 20 controls the optical signal holding operation in the column output holding unit 71-2. Also, in the example of the driving timing shown in FIG. 5, during the signal output period T3 in the column output holding unit 71-1 from a time t12 to a time t13, the timing generation circuit 20 controls the reset signal holding operation in the column output holding unit 71-2. Also, at this time, because the operation of each component in the column output holding unit 71-2 can be conceived to be similar to the operation of each component within the column output holding unit 71-1 in the optical signal holding period T1 and the reset signal holding period T2 of the column output holding unit 71-1, a detailed description thereof will be omitted.

Also, in an example of a driving timing shown in FIG. 5, in the optical signal holding period T1 in the column output holding unit 71-1 from the time t8 to the time t9, the timing generation circuit 20 controls the reset signal holding operation in the column output holding unit 71-3. At this time, because the operation of each component within the column output holding unit 71-3 can be conceived to be similar the operation of each component within the column output holding unit 71-1 in the reset signal holding operation of the column output holding unit 71-1, a detailed description thereof will be omitted.

Also, in the example of the driving timing shown in FIG. 5, in the reset signal holding period T2 in the column output holding unit 71-1 from the time t10 to the time t11, the timing generation circuit 20 controls the signal output operation in the column output holding unit 71-3. In the signal output operation in the column output holding unit 71-3, the timing generation circuit 20 sets the control signal CB3 and the control signal Φ2 to a "High" level. Thereby, the switch SW711, the switch SW713R, and the switch SW713S provided in the column output holding unit 71-3 and the switches SW724R1, SW723R1, and SW725R1 and the switches SW724S1, SW723S1, and SW725S1 provided in the feedback unit 72 are set to a closed state. Thereby, the sampling capacitor C71R, the sampling capacitor C71S, and the feedback capacitor (the set of the feedback capacitor CR1 and the feedback capacitor CS1) in the column output holding unit 71-3 are connected to the differential amplification circuit 73, and an output signal based on the noise-removed optical signal and the column reset signal held in the column output holding unit 71-3 is output thereto.

In the example of the driving timing shown in FIG. 5, in the signal output period T3 in the column output holding unit 71-1 from a time t12 to a time t13, the timing generation circuit 20 controls the optical signal holding operation in the column output holding unit 71-3. At this time, because the operation of each component in the column output holding unit 71-3 can be conceived to be similar to the operation of each component within the column output holding unit 71-1 in the optical signal holding operation of the column output holding unit 71-1, a detailed description thereof will be omitted.

As described above, the timing generation circuit 20 controls the optical signal holding operation, the reset signal holding operation, and the signal output operation in each column output holding unit 71 so that different column output holding units 71 do not perform the same operation (operations do not overlap). Thereby, the differential amplification circuit 73 sequentially outputs output signals based on the noise-removed optical signal and the column reset signal held in each column output holding unit 71. That is, the amplification and selection circuit 70 sequentially outputs output signals obtained by performing correlated double sampling processes on the basis of noise-removed optical signals and column reset signals transferred from the adjacent column circuits 50 via different horizontal signal lines 60 in the solid-state imaging device 1.

Figure 6:
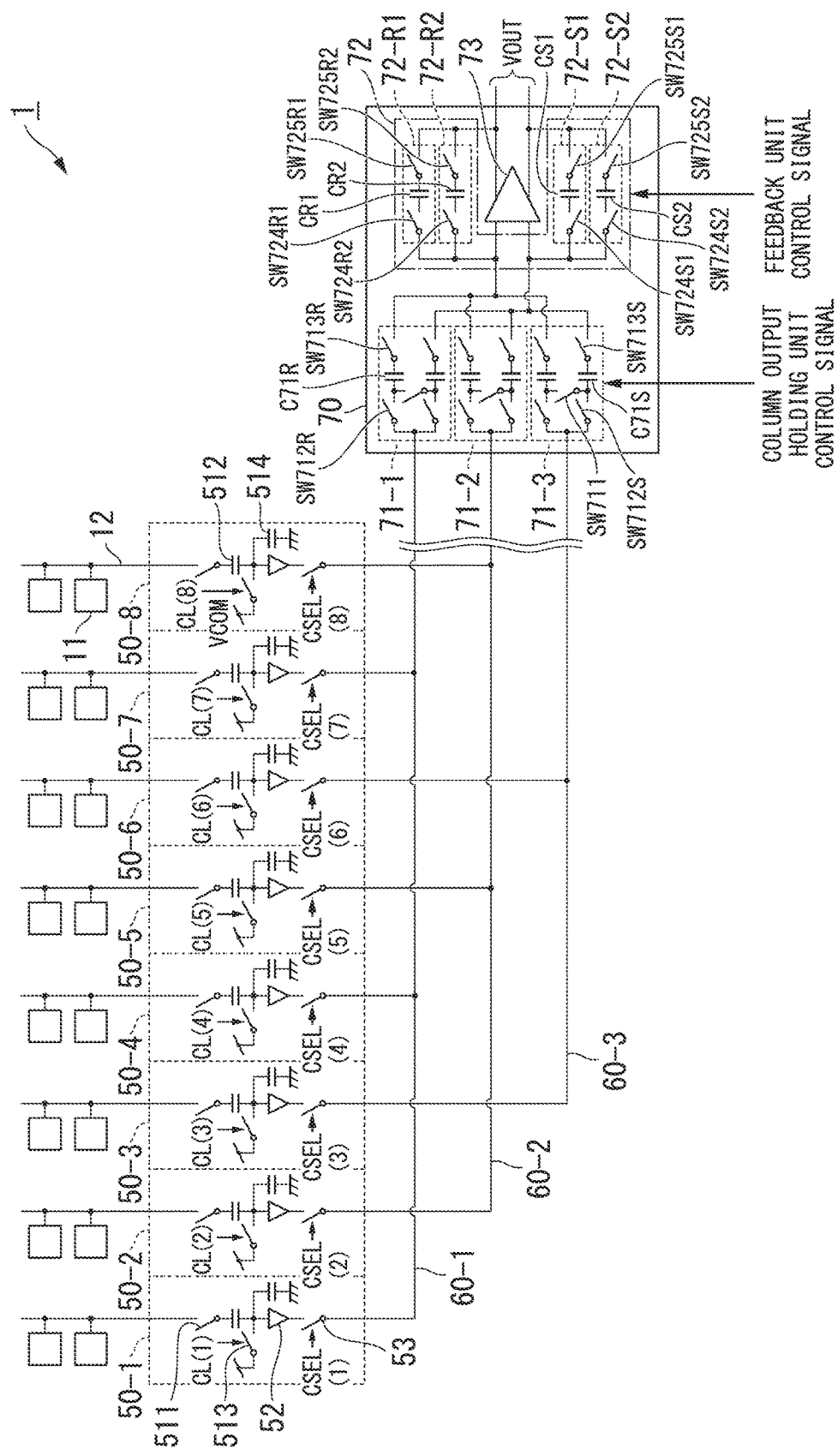
FIG. 6 is a circuit diagram showing an example of a schematic configuration of the pixel, the column circuit, and the amplification and selection circuit provided in the solid-state imaging device according to the first embodiment of the present invention.

Next, a series of operations of externally outputting output signals corresponding to pixel signals output from pixels 11 arranged in the pixel array unit 10 in the solid-state imaging device 1 of the first embodiment will be described. First, the configuration of the solid-state imaging device 1 showing components focused for describing a series of operations in the solid-state imaging device 1 will be described. FIG. 6 is a circuit diagram showing an example of a schematic configuration of the pixel 11, the column circuit 50, and the amplification and selection circuit 70 provided in the solid-state imaging device 1 according to the first embodiment of the present invention. In FIG. 6, an example of a configuration of the solid-state imaging device 1 in which the pixel array unit 10 in which the pixels 11 are two-dimensionally arranged in two rows and eight columns is provided and column circuits 50-1 to 50-8 corresponding to the pixels 11 of the columns are connected to any of the three horizontal signal lines 60 (the horizontal signal lines 60-1 to 60-3) so that the adjacent column circuits 50 output column pixel signals to different horizontal signal lines 60 is shown.

Also, in FIG. 6, for ease of description, in each of the three column output holding units 71 provided in the amplification and selection circuit 70, only the sampling capacitors C71R, the sampling capacitors C71S, the switch SW711, the switch SW712R, the switch SW712S, the switch SW713R, and the switch SW713S are shown. That is, the switch SW714R and the switch SW714S are omitted from each column output holding unit 71.

Also, in FIG. 6, for ease of description, only the switch SW724R1, the feedback capacitor CR1, the switch SW725R1, the switch SW724R2, the feedback capacitor CR2, the switch SW725R2, the switch SW724S1, the feedback capacitor CS1, the switch SW725S1, the switch SW724S2, the feedback capacitor CS2, and the switch SW725S2 are shown in the feedback unit 72 provided in the amplification and selection circuit 70.

That is, in the feedback unit 72, the switch SW720R, the switch SW720S, the switch SW721R1, the switch SW721R2, the switch SW722R1, the switch SW723R1, the switch SW723R2, the switch SW722R2, the switch SW721S1, the switch SW721S2, the switch SW722S1, the switch SW722S2, the switch SW723S1, and the switch SW723S2 are omitted. In FIG. 6, the switch SW724R1, the feedback capacitor CR1, and the switch SW725R1 are collectively shown as a feedback circuit 72-R1. Likewise, in FIG. 6, the switch SW724R2, the feedback capacitor CR2, and the switch SW725R2 are collectively shown as a feedback circuit 72-R2, the switch SW724S1, the feedback capacitor CS1, and the switch SW725S1 are collectively shown as a feedback circuit 72-S1, and the switch SW724S2, the feedback capacitor CS2, and the switch SW725S2 are collectively shown as a feedback circuit 72-S2.

In FIG. 6, because the switch SW723R1, the switch SW723R2, the switch SW723S1, and the switch SW723S2 provided in the feedback unit 72 are omitted, a configuration in which a connection of the inverting input terminal and the non-inverting input terminal of the differential amplification circuit 73 is changed is shown. More specifically, a configuration in which input terminals of the feedback circuit 72-R1 and the feedback circuit 72-R2 (first terminals of the switch SW724R1 and the switch SW724R2) are connected to the inverting input terminal of the differential amplification circuit 73 and the column reset signal is input from each column output holding unit 71 is shown. Also, a configuration in which input terminals of the feedback circuit 72-S1 and the feedback circuit 72-S2 (first terminals of the switch SW724S1 and the switch SW724S2) are connected to the non-inverting input terminal of the differential amplification circuit 73 and the noise-removed optical signal is input from each column output holding unit 71 is shown.

In the solid-state imaging device 1, the horizontal scanning circuit 40 sequentially outputs column selection signals CSEL(1) to CSEL(8), so that the column pixel signals in the column circuits 50-1 to 50-8 are sequentially output to the connected horizontal signal lines 60 and transferred to the amplification and selection circuit 70. In the solid-state imaging device 1, the timing generation circuit 20 outputs a column output holding unit control signal for controlling the operation of each column output holding unit 71 and a feedback unit control signal for controlling the operation of the feedback unit 72, so that an output signal obtained by performing the correlated double sampling process on the basis of a column pixel signal transferred via each horizontal signal line 60 is output. Here, column output holding unit control signals corresponding to the column output holding unit 71-1 are the control signal SHR1, the control signal SHS1, and the control signal CB1. Also, column output holding unit control signals corresponding to the column output holding unit 71-2 are the control signal SHR2, the control signal SHS2, and the control signal CB2. Also, column output holding unit control signals corresponding to the column output holding unit 71-3 are the control signal SHR3, the control signal SHS3, and the control signal CB3.

Figure 7:
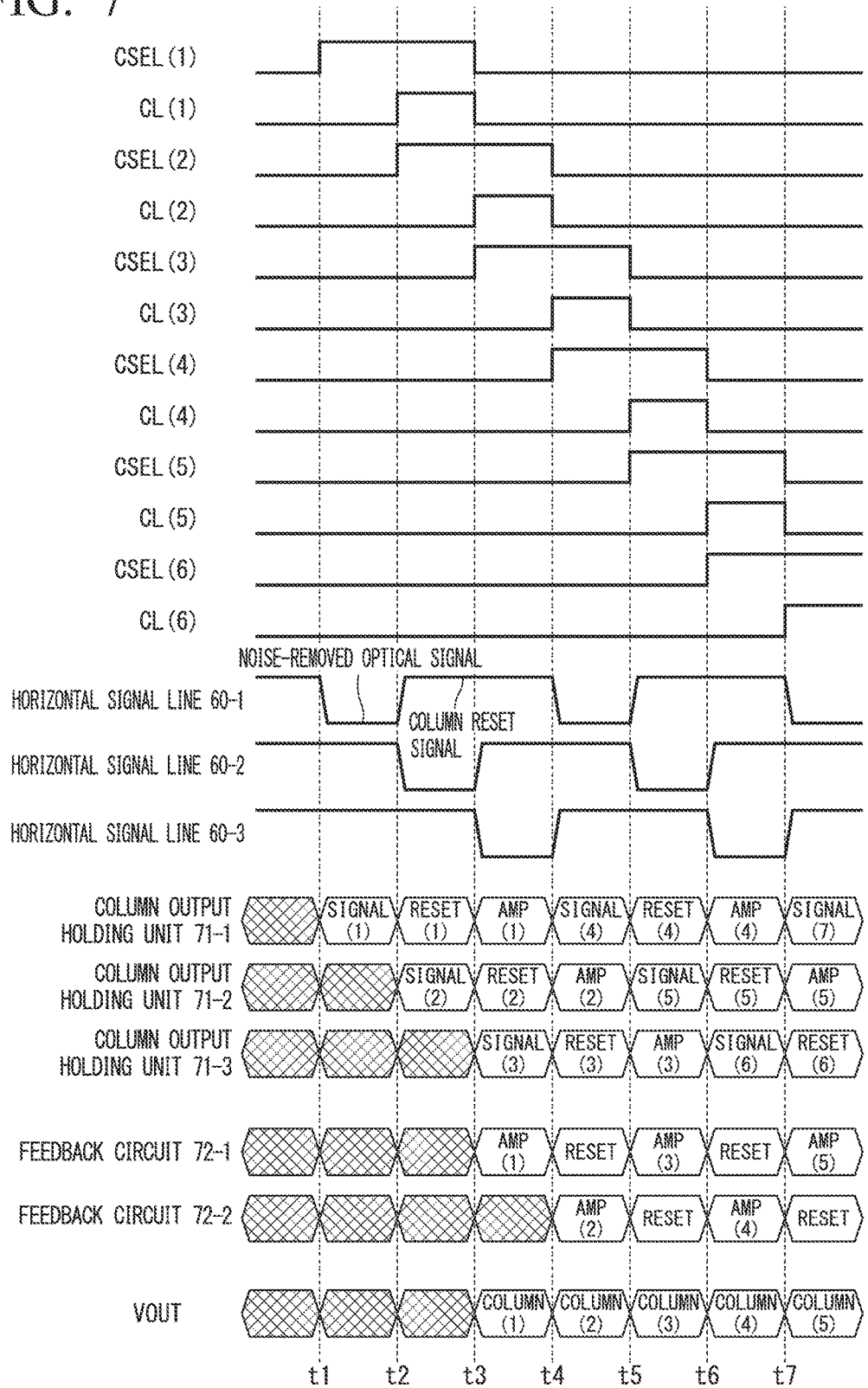
FIG. 7 is a timing chart showing an example of driving timings of the column circuit and the amplification and selection circuit provided in the solid-state imaging device according to the first embodiment of the present invention.

Subsequently, timings of a series of operations in the solid-state imaging device 1 having the configuration shown in FIG. 6 will be described. FIG. 7 is a timing chart showing an example of driving timings of the column circuit 50 and the amplification and selection circuit 70 provided in the solid-state imaging device 1 according to the first embodiment of the present invention. In FIG. 7, an example of driving timings when the column circuits 50 corresponding to pixels 11 of six different columns in the pixel array unit 10 are sequentially controlled and output signals obtained by performing correlated double sampling processes on the basis of column pixel signals output by the column circuits 50 are sequentially output is shown. Also, an example of a driving timing shown in FIG. 7 is a driving timing from a state in which noise-removed optical signals according to the pixel signals generated by the pixels 11 arranged in a first row of the pixel array unit 10 are held in the sampling capacitors 514 provided in the column circuits 50. That is, the driving timing is a driving timing of the horizontal reading period in an example of the driving timings of the pixel 11 and the column circuit 50 shown in FIG. 3.

In the example of the driving timing shown in FIG. 7, operations in each column output holding unit 71 provided in the amplification and selection circuit 70 are shown in words representing operations (the "optical signal holding operation is "SIGNAL," the reset signal holding operation is "RESET," and the signal output operation is "AMP"). Then, a number subsequent to "-" indicating a column of a pixel 11 to which the column circuit 50 corresponds is shown within "( ): parenthesis" subsequent to the word of each operation so as to identify the column of the pixel 11 serving as a processing target in each operation. Also, in the example of the driving timing shown in FIG. 7, a feedback circuit of the differential amplification circuit 73 including a set of the feedback circuit 72-R1 and the feedback circuit 72-S1 is shown as a feedback circuit 72-1, a feedback circuit of the differential amplification circuit 73 including a set of the feedback circuit 72-R2 and the feedback circuit 72-S2 is shown as a feedback circuit 72-2, and the operations in the feedback circuit 72-1 and the feedback circuit 72-2 are shown in the words representing the operations. More specifically, the operation of the feedback capacitor corresponding to the operation of amplifying the difference signal in the differential amplification circuit 73 is indicated by the word "AMP" and the reset operation is indicated by the word "RESET". Also, in the example of the driving timing shown in FIG. 7, the output signal VOUTP and the output signal VOUTN in the differential amplification circuit 73 are collectively shown as an "output signal VOUT". Then, in order to identify the column of the pixels 11 for an output in each period within "( ): parenthesis" following "COLUMN," a number subsequent to "-" representing the column of the pixel 11 to which the column circuit 50 corresponds is shown.

Also, in the example of the driving timing shown in FIG. 7, for ease of description, control for clamping the sampling capacitor C71R and the sampling capacitor C71S provided in each column output holding unit 71 and control for resetting the feedback capacitor CR1, the feedback capacitor CR2, the feedback capacitor CS1, and the feedback capacitor CS2 provided in the feedback unit 72 will be omitted. However, in the actual solid-state imaging device 1, the clamp control and the reset control are not omitted. That is, in the actual solid-state imaging device 1, the clamp control and the reset control are performed at the above-described timings (see FIGS. 3 and 5).

In the horizontal reading period, at a time t1, the horizontal scanning circuit 40 first selects the column circuit 50-1 of the first column according to the column selection signal CSEL(1) of the first column, and causes the noise-removed optical signal held in the sampling capacitor 514 provided in the column circuit 50-1 of the first column to be output to the horizontal signal line 60-1. Also, at the time t1, the timing generation circuit 20 causes the column output holding unit 71-1 to perform the optical signal holding operation (SIGNAL(1)) according to the control signal SHS1, and to hold (sample) a noise-removed optical signal transferred from the column circuit 50-1 via the horizontal signal line 60-1 in the sampling capacitor C71S within the column output holding unit 71-1.

Subsequently, at a time t2, the horizontal scanning circuit 40 causes the sampling capacitor 514 provided in the column circuit 50-1 of the first column to be clamped to the clamp level VCOM according to the clamp pulse CL(1) of the first column and causes the column reset signal to be output to the horizontal signal line 60-1. Also, at the time t2, the timing generation circuit 20 causes the column output holding unit 71-1 to perform the reset signal holding operation (RESET(1)) according to the control signal SHR1, and to hold (sample) the column reset signal transferred from the column circuit 50-1 via the horizontal signal line 60-1 in the sampling capacitor C71R within the column output holding unit 71-1.

Further, at the time t2, the horizontal scanning circuit 40 selects the column circuit 50-2 of the second column according to the column selection signal CSEL(2) of the second column, and causes the noise-removed optical signal held in the sampling capacitor 514 provided in the column circuit 50-2 of the second column to be output to the horizontal signal line 60-2. Also, at the time t2, the timing generation circuit 20 causes the column output holding unit 71-2 to perform the optical signal holding operation (SIGNAL(2)) according to the control signal SHS2, and to hold (sample) the noise-removed optical signal transferred from the column circuit 50-2 via the horizontal signal line 60-2 in the sampling capacitor C71S within the column output holding unit 71-2.

Subsequently, at a time t3, the horizontal scanning circuit 40 releases the selection of the column circuit 50-1 of the first column according to the column selection signal CSEL (1) of the first column and the clamping of the sampling capacitor 514 provided in the column circuit 50-1 of the first column according to the clamp pulse CL(1) of the first column.

Also, at the time t3, the timing generation circuit 20 selects the column output holding unit 71-1 according to the control signal CB1, and causes the differential amplification circuit 73 to perform the signal output operation (AMP(1)) by connecting the sampling capacitor C71R and the sampling capacitor C71S provided in the column output holding unit 71-1 and the feedback circuit 72-1 (the feedback circuit 72-R1 and the feedback circuit 72-S1) according to the control signal Φ2. Thereby, the differential amplification circuit 73 outputs an output signal VOUT obtained by performing the correlated double sampling process on the basis of a column pixel signal (a noise-removed optical signal and a column reset signal) transferred by the column circuit 50-1 of the first column via the horizontal signal line 60-1, that is, an output signal VOUT(COLUMN(1)) according to the pixel signal output by the pixel 11 of the first column.

Further, at the time t3, the horizontal scanning circuit 40 causes the sampling capacitor 514 provided in the column circuit 50-2 of the second column to be clamped to the clamp level VCOM according to the clamp pulse CL(2) of the second column and causes the column reset signal to be output to the horizontal signal line 60-2. Also, at the time t3, the timing generation circuit 20 causes the column output holding unit 71-2 to perform the reset signal holding operation (RESET (2)) according to the control signal SHR2, and to hold (sample) the column reset signal transferred from the column circuit 50-2 via the horizontal signal line 60-2 in the sampling capacitor C71R within the column output holding unit 71-2.

Further, at the time t3, the horizontal scanning circuit 40 selects the column circuit 50-3 of the third column according to the column selection signal CSEL(3) of the third column, and causes the noise-removed optical signal held in the sampling capacitor 514 provided in the column circuit 50-3 of the third column to be output to the horizontal signal line 60-3. Also, at the time t3, the timing generation circuit 20 causes the column output holding unit 71-3 to perform the optical signal holding operation (SIGNAL(3)) according to the control signal SHS3, and to hold (sample) the noise-removed optical signal transferred from the column circuit 50-3 via the horizontal signal line 60-3 in the sampling capacitor C71S within the column output holding unit 71-3.

Subsequently, at a time t4, the horizontal scanning circuit 40 selects the column circuit 50-4 of the fourth column according to the column selection signal CSEL(4) of the fourth column, and causes the noise-removed optical signal held in the sampling capacitor 514 provided in the column circuit 50-4 of the fourth column to be output to the horizontal signal line 60-1. Also, at the time t4, the timing generation circuit 20 causes the column output holding unit 71-1 to perform the optical signal holding operation (SIGNAL(4)) according to the control signal SHS1, and to hold (sample) the noise-removed optical signal transferred from the column circuit 50-1 via the horizontal signal line 60-1 in the sampling capacitor C71S within the column output holding unit 71-1.

Further, at the time t4, the horizontal scanning circuit 40 releases the selection of the column circuit 50-2 of the second column according to the column selection signal CSEL(2) of the second column and the clamping of the sampling capacitor 514 provided in the column circuit 50-2 of the second column according to the clamp pulse CL(2) of the second column. Also, at the time t4, the timing generation circuit 20 releases the selection of the column output holding unit 71-1 according to the control signal CB1 and the connection of each sampling capacitor within the column output holding unit 71-1 and the feedback circuit 72-1 to the differential amplification circuit 73 according to the control signal Φ2.

Then, at the time t4, the timing generation circuit 20 selects the column output holding unit 71-2 according to the control signal CB2, and causes the differential amplification circuit 73 to perform the signal output operation (AMP(2)) by connecting the sampling capacitor C71R and the sampling capacitor C71S provided in the column output holding unit 71-2 and the feedback circuit 72-2 (the feedback circuit 72-R2 and the feedback circuit 72-S2) according to the control signal Φ1. Thereby, the differential amplification circuit 73 outputs an output signal VOUT(COLUMN(2)) according to a pixel signal output by the pixel 11 of the second column obtained by performing the correlated double sampling process on the basis of the column pixel signal transferred by the column circuit 50-2 of the second column via the horizontal signal line 60-2. Also, at this time, the feedback capacitor CR1 and feedback capacitor CS1 within the feedback circuit 72-1 are reset according to the control signal Φ1.

Further, at the time t4, the horizontal scanning circuit 40 causes the sampling capacitor 514 provided in the column circuit 50-3 of the third column to be clamped to the clamp level VCOM according to the clamp pulse CL(3) of the third column and causes the column reset signal to be output to the horizontal signal line 60-3. Also, at the time t4, the timing generation circuit 20 causes the column output holding unit 71-3 to perform the reset signal holding operation (RESET(3)) according to the control signal SHR3, and to hold (sample) the column reset signal transferred from the column circuit 50-2 via the horizontal signal line 60-3 in the sampling capacitor C71R within the column output holding unit 71-3.

Subsequently, at a time t5, the horizontal scanning circuit 40 causes the sampling capacitor 514 provided in the column circuit 50-4 of the fourth column to be clamped to the clamp level VCOM according to the clamp pulse CL(4) of the fourth column and causes the column reset signal to be output to the horizontal signal line 60-1. Also, at the time t5, the timing generation circuit 20 causes the column output holding unit 71-1 to perform the reset signal holding operation (RESET(4)) according to the control signal SHR1, and to hold (sample) a column reset signal transferred from the column circuit 50-4 via the horizontal signal line 60-1 in the sampling capacitor C71R within the column output holding unit 71-1.

Further, at the time t5, the horizontal scanning circuit 40 selects the column circuit 50-5 of the fifth column according to the column selection signal CSEL(5) of the fifth column, and causes the noise-removed optical signal held in the sampling capacitor 514 provided in the column circuit 50-5 of the fifth column to be output to the horizontal signal line 60-2. Also, at the time t5, the timing generation circuit 20 causes the column output holding unit 71-2 to perform the optical signal holding operation (SIGNAL(5)) according to the control signal SHS2, and to hold (sample) the noise-removed optical signal transferred from the column circuit 50-5 via the horizontal signal line 60-2 in the sampling capacitor C71S within the column output holding unit 71-2.

Further, at the time t5, the horizontal scanning circuit 40 releases the selection of the column circuit 50-3 of the third column according to the column selection signal CSEL(3) of the third column and the clamping of the sampling capacitor 514 provided in the column circuit 50-3 of the third column according to the clamp pulse CL(3) of the third column. Also, at the time t5, the timing generation circuit 20 releases the selection of the column output holding unit 71-2 according to the control signal CB2 and the connection of each sampling capacitor within the column output holding unit 71-2 and the feedback circuit 72-2 to the differential amplification circuit 73 according to the control signal Φ1.

Then, at the time t5, the timing generation circuit 20 selects the column output holding unit 71-3 according to the control signal CB3, and causes the differential amplification circuit 73 to perform the signal output operation (AMP(3)) by connecting the sampling capacitor C71R and the sampling capacitor C71S provided in the column output holding unit 71-3 and the feedback circuit 72-1 according to the control signal Φ2. Thereby, the differential amplification circuit 73 outputs an output signal VOUT (COLUMN(3)) according to a pixel signal output by the pixel 11 of the third column obtained by performing the correlated double sampling process on the basis of the column pixel signal transferred by the column circuit 50-3 of the third column via the horizontal signal line 60-3. Also, at this time, the feedback capacitor CR2 and feedback capacitor CS2 within the feedback circuit 72-2 are reset according to the control signal Φ2.

Subsequently, at a time t6, the horizontal scanning circuit 40 releases the selection of the column circuit 50-4 of the fourth column according to the column selection signal CSEL(4) of the fourth column and the clamping of the sampling capacitor 514 provided in the column circuit 50-4 of the fourth column according to the clamp pulse CL(4) of the fourth column. Also, at the time t6, the timing generation circuit 20 releases the selection of the column output holding unit 71-1 according to the control signal CB1 and the connection of each sampling capacitor within the column output holding unit 71-3 and the feedback circuit 72-1 to the differential amplification circuit 73 according to the control signal Φ2.

Then, at the time t6, the timing generation circuit 20 selects the column output holding unit 71-1 according to the control signal CB1, and causes the differential amplification circuit 73 to perform the signal output operation (AMP(4)) by connecting the sampling capacitor C71R and the sampling capacitor C71S provided in the column output holding unit 71-1 and the feedback circuit 72-1 according to the control signal Φ1. Thereby, the differential amplification circuit 73 outputs an output signal VOUT (COLUMN(4)) according to the pixel signal output by the pixel 11 of the fourth column obtained by performing the correlated double sampling process on the basis of a column pixel signal transferred by the column circuit 50-4 of the fourth column via the horizontal signal line 60-1. Also, at this time, the feedback capacitor CR1 and the feedback capacitor CS1 within the feedback circuit 72-1 are reset according to the control signal Φ1.

Further, at the time t6, the horizontal scanning circuit 40 causes the sampling capacitor 514 provided in the column circuit 50-5 of the fifth column to be clamped to the clamp level VCOM according to the clamp pulse CL(5) of the fifth column and causes the column reset signal to be output to the horizontal signal line 60-2. Also, at the time t6, the timing generation circuit 20 causes the column output holding unit 71-2 to perform the reset signal holding operation (RESET (5)) according to the control signal SHR2 and causes the sampling capacitor C71R within the column output holding unit 71-2 to hold (sample) the column reset signal transferred from the column circuit 50-5 via the horizontal signal line 60-2.

Further, at the time t6, the horizontal scanning circuit 40 selects the column circuit 50-6 of the sixth column according to the column selection signal CSEL(6) of the sixth column and causes the noise-removed optical signal held in the sampling capacitor 514 provided in the column circuit 50-6 of the sixth column to be output to the horizontal signal line 60-3. Also, at the time t6, the timing generation circuit 20 causes the column output holding unit 71-3 to perform the optical signal holding operation (SIGNAL(6)) according to the control signal SHS3, and to hold (sample) the noise-removed optical signal transferred from the column circuit 50-6 via the horizontal signal line 60-3 in the sampling capacitor C71S within the column output holding unit 71-3.

After a time t7, similarly, the horizontal scanning circuit 40 sequentially selects the column circuits 50 to cause the corresponding horizontal signal lines 60 to output the column pixel signals. Also, the timing generation circuit 20 performs control so that the optical signal holding operation, the reset signal holding operation, and the signal output operation in each column output holding unit 71 do not overlap between different column output holding units 71 and causes the output signal VOUT corresponding to each column pixel signal to be output from the differential amplification circuit 73.

As described above, the solid-state imaging device 1 includes three horizontal signal lines 60 (the horizontal signal lines 60-1 to 60-3) and periodically connects the adjacent column circuits 50 to different horizontal signal lines 60. In the solid-state imaging device 1, the reading of the column reset signal from the column circuit 50 to the horizontal signal line 60 and the reading of noise-removed optical signals from adjacent column circuits 50 to different horizontal signal lines 60 are performed in parallel, simultaneously.

Also, in the solid-state imaging device 1, three column output holding units 71 (column output holding units 71-1 to 71-3) corresponding to the horizontal signal lines 60 are provided within the amplification and selection circuit 70, and each of the noise-removed optical signal and the column reset signal transferred via the corresponding horizontal signal line 60 is held therein. In the solid-state imaging device 1, two sets of feedback circuits (feedback circuits 72-1 and 72-2) configured to include feedback capacitors corresponding to the noise-removed optical signal and the column reset signal are provided within the feedback unit 72 within the amplification and selection circuit 70 and the column output holding units 71 which have completed holding of both the noise-removed optical signal and the column reset signal are sequentially selected. At this time, in the solid-state imaging device 1, two sets of feedback circuits are alternately switched as the feedback capacitor connected to the differential amplification circuit 73 for amplifying the difference signal (the correlated double sampling process) between the noise-removed optical signal and the column reset signal held by the selected column output holding unit 71.

Thereby, in the solid-state imaging device 1, it is possible to continuously and sequentially output column pixel signals output by the column circuits 50, i.e., output signals VOUT corresponding to the pixels 11 arranged in the columns, without causing the optical signal holding operation, the reset signal holding operation, and the signal output operation in the three column output holding units 71 provided in the amplification and selection circuit 70 to overlap between different column output holding units 71. Thus, in the solid-state imaging device 1, it is possible to output an output signal VOUT according to the signal output operation of any column output holding unit 71 without outputting a final output signal corresponding to each column circuit every time the holding (sampling) of an optical signal after noise removal and a reset signal is completed as in the conventional solid-state imaging device. This is because any column output holding unit 71 can perform the signal output operation even when there is a column output holding unit 71 which performs the optical signal holding operation and the reset signal holding operation after the first output signal VOUT is output in the solid-state imaging device 1. Thus, in the solid-state imaging device 1, the amplification and selection circuit 70 minimizes deterioration of image quality due to the column circuit 50, and it is possible to improve a speed at which the output signal VOUT is output without increasing the frequency of the clock signal as in the conventional solid-state imaging device, i.e., without increasing power consumption.

Here, the arrangement of each component included in the solid-state imaging device 1 will be described. The solid-state imaging device 1 can be a general monolithic structure (a structure manufactured in a single semiconductor substrate), but it is possible to reduce a size of the solid-state imaging device 1 by adopting a structure in which a plurality of semiconductor substrates are stacked. That is, it is possible to reduce a mounting area of the solid-state imaging device 1 by making the solid-state imaging device 1 have a stacked structure.

Figure 8:
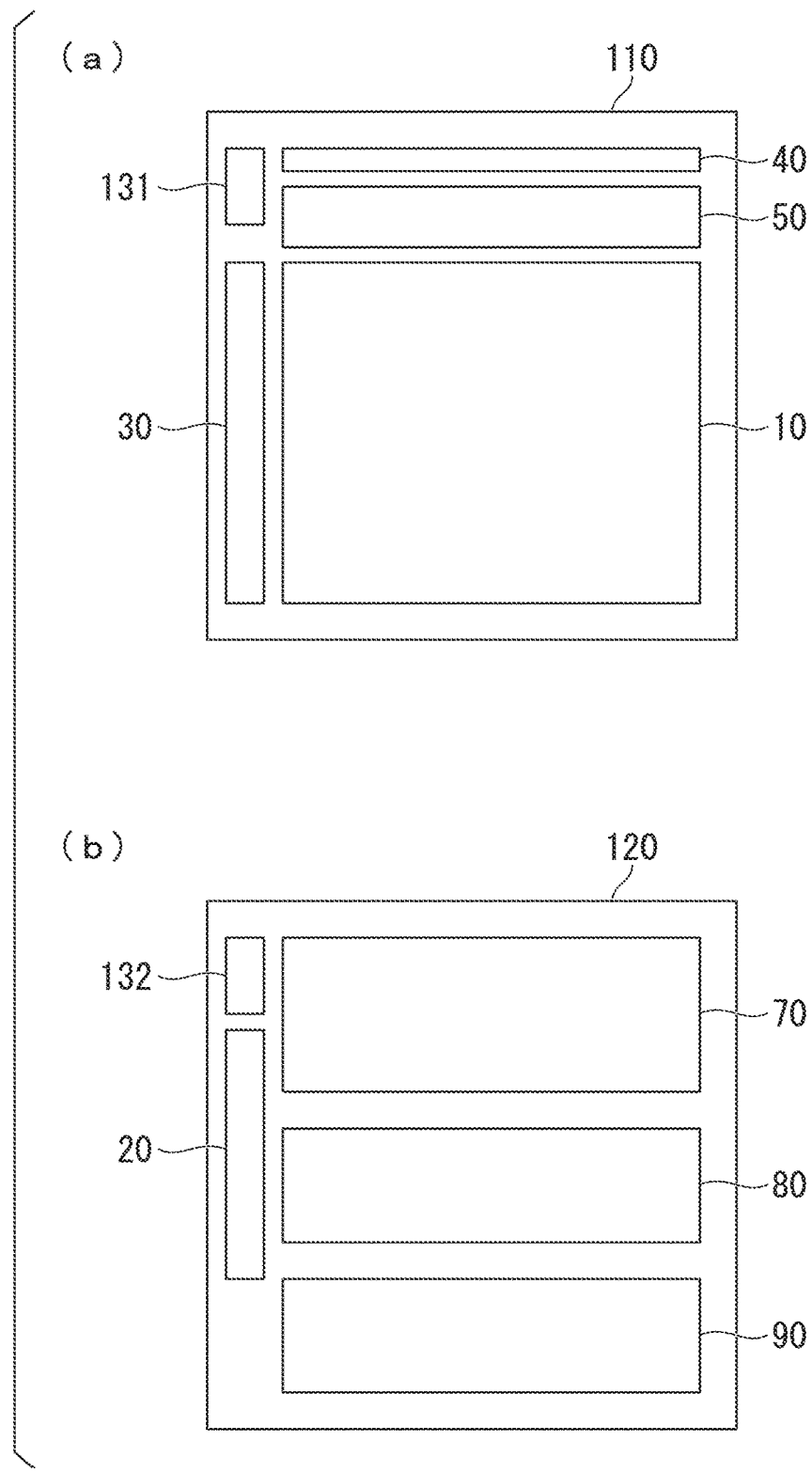
FIG. 8 is a layout diagram showing an example of an arrangement of components of a solid-state imaging device according to an embodiment of the present invention on semiconductor substrates.

FIG. 8 is a layout diagram showing an example of an arrangement of components of the solid-state imaging device 1 according to the embodiment of the present invention on semiconductor substrates. In FIG. 8, the arrangement of the components in the solid-state imaging device 1 having a structure in which two semiconductor substrates are stacked is shown. In FIG. 8(*a*), an arrangement of components in a first semiconductor substrate 110 on a side where object light is incident in the solid-state imaging device 1 is shown. In FIG. 8(*b*), an arrangement of the components in a second semiconductor substrate 120 stacked on a surface opposite to a surface (an incidence surface) of a side on which object light is incident in the first semiconductor substrate 110 is shown. Also, FIG. 8 shows an arrangement of components viewed from the incident surface side of the object light in the solid-state imaging device 1. Accordingly, if the solid-state imaging device 1 is formed, the first semiconductor substrate 110 shown in FIG. 8(*a*) is formed (stacked) to overlap an upper portion of the second semiconductor substrate 120 shown in FIG. 8(*b*).

As shown in FIG. 8(*a*), in the solid-state imaging device 1, the pixel array unit 10 in which the plurality of pixels 11 are arranged, the vertical scanning circuit 30, and the plurality of column circuits 50 and the plurality of horizontal scanning circuits 40 corresponding to columns of the pixels 11 are arranged on the first semiconductor substrate 110. In the solid-state imaging device 1, the timing generation circuit 20, the amplification and selection circuit 70, the analog-to-digital conversion circuit 80, and the output circuit 90 are arranged on the second semiconductor substrate 120. In an example of the arrangement of the components of the second semiconductor substrate 120 shown in FIG. 8(*b*), the column circuit 50 is arranged immediately above the amplification and selection circuit 70.

A signal line (for example, the horizontal signal line 60) between the first semiconductor substrate 110 and the second semiconductor substrate 120 is alternately connected between a junction region 131 arranged on the first semiconductor substrate 110 and a junction region 132 arranged on the second semiconductor substrate 120. Within the junction region 131 and the junction region 132, an inter-substrate connection portion for connecting each signal line is formed, components formed on each of the stacked semiconductor substrates are electrically connected by the inter-substrate connection portion, and signal transmission and reception are performed via the inter-substrate connection portion. For example, a micro bump produced by a vapor deposition method, a plating method, or the like is used as the inter-substrate connection portion. At this time, a space located between the semiconductor substrates may be filled with an insulating member such as an adhesive. Also, the structure of the inter-substrate connection portion is not limited to a scheme using the micro bumps, and for example, a through-silicon-via (TSV) scheme may be used.

In the second semiconductor substrate 120, the column output holding unit 71 provided in the amplification and selection circuit 70 and the feedback unit 72 and the differential amplification circuit 73 are arranged close to one another within the region of the amplification and selection circuit 70. More specifically, a wiring length between the differential amplification circuit 73 and the column output holding unit 71 arranged at a farthest position from the differential amplification circuit 73 is arranged shorter than a wiring length of the horizontal signal line 60 between the column output holding unit 71 and the column circuit 50 arranged at the farthest position on the corresponding horizontal signal line 60 to which the column output holding unit 71 corresponds. More specifically, components (the column output holding unit 71, the feedback unit 72, and the differential amplification circuit 73) within the amplification and selection circuit 70 are arranged close to one another so that a wiring length between the inverting input terminal or the non-inverting input terminal of the differential amplification circuit 73 and the sampling capacitor C71R or the sampling capacitor C71S provided in the column output holding unit 71 arranged at a farthest position from the differential amplification circuit 73 is shorter than a wiring length between the feedback capacitor CR1, the feedback capacitor CR2, the feedback capacitor CS1, or the feedback capacitor CS2 provided in the column output holding unit 71 and the output terminal of the column output amplifier 52 provided in the column circuit 50 arranged at a farthest position on the horizontal signal line 60 to which the column output holding unit 71 corresponds.

Thereby, it is possible to shorten a length (a wiring length) of a path of a signal line connecting the column output holding unit 71 and the differential amplification circuit 73, i.e., a signal line by which the noise-removed optical signal and the column reset signal held by the column output holding unit 71 are transferred to the differential amplification circuit 73 and to reduce parasitic capacitance or resistance of wiring which hinders a high-speed operation of the differential amplification circuit 73. Thereby, the differential amplification circuit 73 can be operated at a high speed.

According to the first embodiment, there is provided a method of driving a solid-state imaging device (the solid-state imaging device 1), the solid-state imaging device 1 comprising: a plurality of column circuits (column circuits 50) which are arranged for each column of a plurality of pixels (pixels 11) arranged in a matrix and configured to output a column pixel signal (a noise-removed optical signal) according to a pixel signal (an optical signal and a reset signal) output by a pixel 11 of a corresponding column, to which the plurality column circuits 50 are periodically classified and connected, the plurality of horizontal signal lines (horizontal signal lines 60) being configured to transfer the noise-removed optical signal output by any one of the connected column circuits 50 and a column reset signal when the column circuit 50 having output the noise-removed optical signal is reset, and an amplification and selection circuit (the amplification and selection circuit 70) configured to select and sequentially sample either of the noise-removed optical signal and the column reset signal transferred by each of the plurality of horizontal signal lines 60, and to amplify a differential signal based on the noise-removed optical signal and the column reset signal output from the same column circuit 50 and output the amplified differential signal, the method comprising: causing the amplification and selection circuit 70 to perform at least two operations among a first operation (an optical signal holding operation) of sampling the noise-removed optical signal, a second operation (a reset signal holding operation) of sampling the column reset signal, and a third operation (a signal output operation) of amplifying the differential signal and outputting the amplified differential signal in parallel in the same period; and causing components (the column circuit 50 and the amplification and selection circuit 70) connected to different horizontal signal lines 60 to perform operations corresponding to the optical signal holding operation, the reset signal holding operation, and the signal output operation in that order, and causing the components to perform different operations of the column circuit 50 and the amplification and selection circuit 70 in parallel in the same period with respect to optical signal holding operation, the reset signal holding operation, and the signal output operation.

Also, according to the first embodiment, the method of driving the solid-state imaging device 1 in which the amplification and selection circuit 70 includes: a plurality of column output holding units (column output holding units 71) corresponding to the plurality of horizontal signal lines 60, including a sampling capacitor (the sampling capacitor C71S and the sampling capacitor C71R) configured to hold the noise-removed optical signal transferred by the corresponding horizontal signal line 60 in the optical signal holding operation and to hold the column reset signal transferred by the corresponding horizontal signal line 60 in the reset signal holding operation, and configured to output a differential signal into which a signal of a difference between the noise-removed optical signal and the column reset signal held in the sampling capacitor C71S and the sampling capacitor C71R is converted in the signal output operation; a feedback unit (the feedback unit 72) corresponding to all the plurality of column output holding units 71, including a first feedback capacitor (the feedback capacitor CS1 and the feedback capacitor CR1) and a second feedback capacitor (the feedback capacitor CS2 and the feedback capacitor CR2) for amplifying a signal, and configured to alternately switch a feedback capacitor for amplifying the differential signal output from the column output holding unit 71 to either one of the feedback capacitor CS1 and the feedback capacitor CR1 or the feedback capacitor CS2 and the feedback capacitor CR2 for every signal output operation; and a differential amplification circuit (the differential amplification circuit 73) configured to amplify the output differential signal to output the amplified differential signal as the difference signal in accordance with a ratio between the sampling capacitor C71S and the sampling capacitor C71R provided in the column output holding unit 71 configured to output the differential signal and the feedback capacitor CS1 and the feedback capacitor CR1 or the feedback capacitor CS2 and the feedback capacitor CR2 to which the feedback capacitor is switched in the signal output operation, and wherein, during a period in which the differential amplification circuit 73 performs the signal output operation, the method includes, causing one column circuit 50 and another column circuit 50 among adjacent column circuits 50 connected to the horizontal signal lines 60 different from the horizontal signal line 60 corresponding to the column output holding unit 71 configured to output the differential signal in the signal output operation to output the noise-removed optical signal and the column reset signal, respectively, in parallel in the same period; causing the column output holding unit 71, which performs the optical signal holding operation corresponding to the horizontal signal line 60 by which the noise-removed optical signal is transferred, to hold the transferred noise-removed optical signal; causing the column output holding unit 71, which performs the reset signal holding operation corresponding to the horizontal signal line 60 by which the column reset signal is transferred, to hold the transferred column reset signal; and causing the differential amplification circuit 73 to be initialized during a period in which the optical signal holding operation, the reset signal holding operation, and the signal output operation are switched is configured.

Also, according to the first embodiment, the solid-state imaging device (the solid-state imaging device 1) includes: a plurality of column circuits 50 which are arranged for each column of a plurality of pixels 11 arranged in a matrix and configured to output the noise-removed optical signal according to an optical signal and a reset signal output by a pixel 11 of a corresponding column, to which the plurality column circuits 50 are periodically classified and connected, the plurality of horizontal signal lines 60 being configured to transfer the noise-removed optical signal output by any one of the connected column circuits 50 and a column reset signal when the column circuit 50 having output the noise-removed optical signal is reset, and the amplification and selection circuit 70 configured to select and sequentially sample either of the noise-removed optical signal and the column reset signal transferred by each of the plurality of horizontal signal lines 60, and to amplify a differential signal based on the noise-removed optical signal and the column reset signal output from the same column circuit 50 and output the amplified differential signal, the amplification and selection circuit 70 including: a plurality of the column output holding units 71 corresponding to the plurality of horizontal signal lines 60, including the sampling capacitor C71S and the sampling capacitor C71R configured to hold the noise-removed optical signal transferred by the corresponding horizontal signal line 60 in an optical signal holding operation of sampling the noise-removed optical signal and to hold the column reset signal transferred by the corresponding horizontal signal line 60 in a reset signal holding operation of sampling the column reset signal, and configured to output a differential signal into which a signal of a difference between the noise-removed optical signal and the column reset signal held in the sampling capacitor C71S and the sampling capacitor C71R is converted in a signal output operation of amplifying the differential signal to output the amplified differential signal; the feedback unit 72 corresponding to all the plurality of column output holding units 71, including the feedback capacitor CS1 and the feedback capacitor CR1 and the feedback capacitor CS2 and the feedback capacitor CR2 for amplifying a signal, and configured to alternately switch a feedback capacitor for amplifying the differential signal output from the column output holding unit 71 to either one of the feedback capacitor CS1 and the feedback capacitor CR1 or the feedback capacitor CS2 and the feedback capacitor CR2 for every signal output operation; and the differential amplification circuit 73 configured to amplify the output differential signal to output the amplified differential signal as the difference signal in accordance with a ratio between the sampling capacitor C71S and the sampling capacitor C71R provided in the column output holding unit 71 configured to output the differential signal and the feedback capacitor CS1 and the feedback capacitor CR1 or the feedback capacitor CS2 and the feedback capacitor CR2 to which the feedback capacitor is switched in the signal output operation, wherein components (the column output holding unit 71, the feedback unit 72, and the differential amplification circuit 73) provided in the amplification and selection circuit 70 are vicinity to each other so that a wiring length between the differential amplification circuit 73 and the sampling capacitor C71S or the sampling capacitor C71R provided in the column output holding unit 71 arranged at a position farthest from the differential amplification circuit 73 becomes shorter than a wiring length of the horizontal signal line 60 between the sampling capacitor C71S or the sampling capacitor C71R and the column circuit 50 arranged at a farthest position in the horizontal signal line 60.

Also, according to the first embodiment, the solid-state imaging device 1 in which, further include: a first semiconductor substrate (the first semiconductor substrate 110) on which light is incident, a second semiconductor substrate (the second semiconductor substrate 120) stacked on a surface of the first semiconductor substrate 110, the surface being opposite to a surface on which the light is incident, and an inter-substrate connection portion (for example, a micro bump) which electrically connects the first semiconductor substrate 110 to the second semiconductor substrate 120, at least the plurality of pixels 11 arranged in the matrix are formed on the first semiconductor substrate 110, and at least the amplification and selection circuit 70 is formed on the second semiconductor substrate 120 is configured.

As described above, in the solid-state imaging device 1 of the first embodiment, the column circuits 50 provided in the solid-state imaging device 1 are classified and connected to three horizontal signal lines 60 (the horizontal signal lines 60-1 to 60-3) and control is performed so that reading out of column pixel signals from two different adjacent column circuits 50 to different horizontal signal lines 60 is performed in parallel in the same period. Also, in the solid-state imaging device 1 of the first embodiment, control is performed so that the optical signal holding operation, the reset signal holding operation, and the signal output operation in the column output holding units 71 corresponding to the horizontal signal lines 60 do not overlap between the different column output holding units 71. When any column output holding unit 71 performs the signal output operation, two sets of feedback circuits corresponding to the noise-removed optical signal and the column reset signal are alternately switched and a difference signal between the noise-removed optical signal and the column reset signal is amplified. Thereby, in the solid-state imaging device 1 of the first embodiment, it is possible to improve a speed at which the output signal VOUT corresponding to the pixel 11 arranged in each column is output.

Also, in the solid-state imaging device 1 of the first embodiment, in FIGS. 4 and 6, an example of a configuration in which the solid-state imaging device 1 is provided with three horizontal signal lines 60 (the horizontal signal lines 60-1 to 60-3) and adjacent column circuits 50 are periodically connected to different horizontal signal lines 60 is shown. However, the number of the horizontal signal lines 60 provided in the solid-state imaging device 1 is not limited to the number shown in the first embodiment, and a configuration in which a larger number of horizontal signal lines 60 are provided and adjacent column circuits 50 are periodically connected to different horizontal signal lines 60 may be adopted. In this configuration, the amplification and selection circuit 70 is configured to include the column output holding unit 71 corresponding to each horizontal signal line 60. Also, in the solid-state imaging device 1, a plurality of configurations, each of which includes three horizontal signal lines 60 and the amplification and selection circuit 70 including three column output holding units 71 (the column output holding units 71-1 to 71-3) corresponding to the horizontal signal lines 60, may be configured.

Second Embodiment

Next, a second embodiment of the present invention will be described. In the solid-state imaging device (hereinafter referred to as a "solid-state imaging device 2") according to the second embodiment of the present invention, the number of horizontal signal lines 60 which is three in the solid-state imaging device 1 of the first embodiment is increased to four and hence the number of column output holding units 71 provided in the amplification and selection circuit 70 provided in the solid-state imaging device 1 of the first embodiment is configured to be four. Thus, a structure of the solid-state imaging device 2 and a configuration and operation of each component included in the solid-state imaging device 2 are similar to the structure of the solid-state imaging device 1 of the first embodiment and the configuration and operation of each component included in the solid-state imaging device 1 of the first embodiment. Accordingly, a detailed description of the structure of the solid-state imaging device 2 and the configuration and operation of each component included in the solid-state imaging device 2 will be omitted. In the following description, the same reference signs are used for components similar to those of the solid-state imaging device 1 of the first embodiment and a series of operations of externally outputting an output signal corresponding to a pixel signal output by the pixel 11 arranged within the pixel array unit 10 in the solid-state imaging device 2 of the second embodiment will be described.

Figure 9:
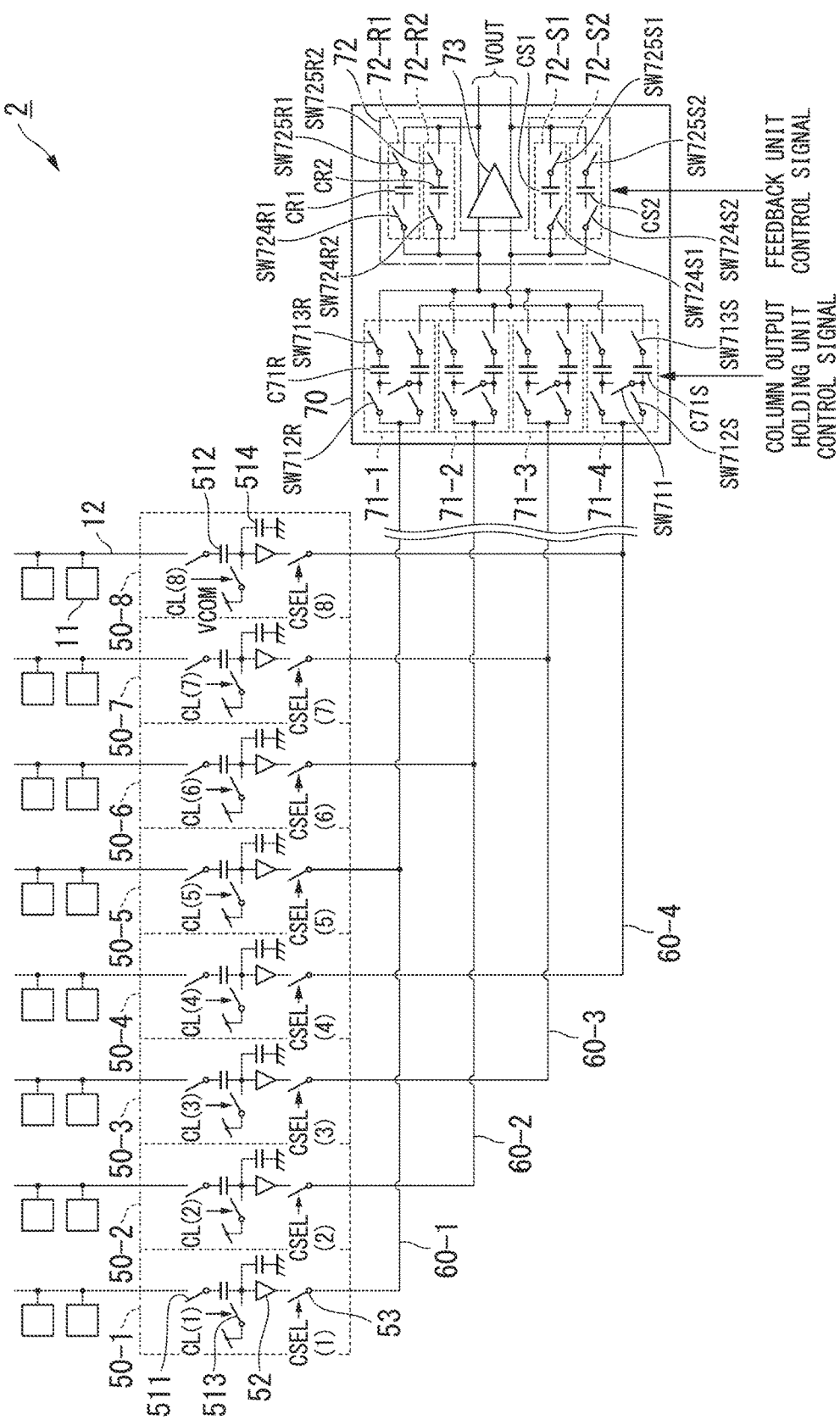
FIG. 9 is a circuit diagram showing an example of a schematic configuration of a pixel, a column circuit, and an amplification and selection circuit provided in a solid-state imaging device according to a second embodiment of the present invention.

First, the configuration of the solid-state imaging device 2 showing the components focused for describing the series of operations in the solid-state imaging device 2 will be described. FIG. 9 is a circuit diagram showing an example of a schematic configuration of a pixel 11, a column circuit 50, and the amplification and selection circuit 70 provided in the solid-state imaging device 2 according to the second embodiment of the present invention. In FIG. 9, an example of the configuration of the solid-state imaging device 2 with the configuration in which the pixel array unit 10 in which the pixels 11 are two-dimensionally arranged in two rows and eight columns is provided and each of column circuits 50-1 to 50-8 corresponding to the pixels 11 of the columns is connected to any one of four horizontal signal lines 60 (horizontal signal lines 60-1 to 60-4) so that the adjacent column circuits 50 output column pixel signals to different horizontal signal lines 60 is shown.

Also, in FIG. 9, as in the case of FIG. 6 described in the solid-state imaging device 1 of the first embodiment, for ease of description, in each of four column output holding units 71 provided in the amplification and selection circuit 70, only the sampling capacitor C71R, the sampling capacitor C71S, the switch SW711, the switch SW712R, the switch SW712S, the switch SW713R, and the switch SW713S are shown.

Also, in FIG. 9, as in FIG. 6 described in the solid-state imaging device 1 of the first embodiment, for ease of description, in the feedback unit 72 provided in the amplification and selection circuit 70, only the switch SW724R1, the feedback capacitor CR1, the switch SW725R1, the switch SW724R2, the feedback capacitor CR2, the switch SW725R2, the switch SW724S1, the feedback capacitor CS1, the switch SW725S1, the switch SW724S2, the feedback capacitor CS2, and the switch SW725S2 are shown. Also, in FIG. 9, as in FIG. 6 described in the solid-state imaging device 1 of the first embodiment, the components in the feedback unit 72 are shown to be integrated into any one of the feedback circuit 72-R1, the feedback circuit 72-R2, the feedback circuit 72-S1, or the feedback circuit 72-S2.

Also, in FIG. 9, as in FIG. 6 described in the solid-state imaging device 1 of the first embodiment, a configuration in which input terminals of the feedback circuit 72-R1 and the feedback circuit 72-R2 (first terminals of the switch SW724R1 and the switch SW724R2) are connected to an inverting input terminal of the differential amplification circuit 73 and column reset signals are input from each the column output holding units 71 is shown. Also, a configuration in which input terminals of the feedback circuit 72-S1 and the feedback circuit 72-S2 (first terminals of the switch SW724S1 and the switch SW724S2) are connected to a non-inverting input terminal of the differential amplification circuit 73 and a noise-removed optical signal is input from each column output holding unit 71 is shown.

Also, in the solid-state imaging device 2, as in the solid-state imaging device 1 of the first embodiment, the horizontal scanning circuit 40 sequentially outputs column selection signals CSEL(1) to CSEL(8) to cause the column circuits 50-1 to 50-8 to sequentially output the column pixel signals to the connected horizontal signal lines 60 and transfer the sequentially output column pixel signals to the amplification and selection circuit 70. Also, in the solid-state imaging device 2, as in the solid-state imaging device 1 of the first embodiment, the timing generation circuit 20 outputs a column output holding unit control signal for controlling the operation of each column output holding unit 71 and a feedback unit control signal for controlling the operation of the feedback unit 72, so that an output signal obtained by performing the correlated double sampling process on the basis of a column pixel signal transferred via each horizontal signal line 60 is output. Here, column output holding unit control signals corresponding to the column output holding unit 71-1 are the control signal SEIM, the control signal SHS1, and the control signal CB1. Also, column output holding unit control signals corresponding to the column output holding unit 71-2 are the control signal SHR2, the control signal SHS2, and the control signal CB2. Also, column output holding unit control signals corresponding to the column output holding unit 71-3 are the control signal SHR3, the control signal SHS3, and the control signal CB3. Also, column output holding unit control signals corresponding to the column output holding unit 71-4 are a control signal SHR4, a control signal SHS4, and a control signal CB4.

Figure 10:
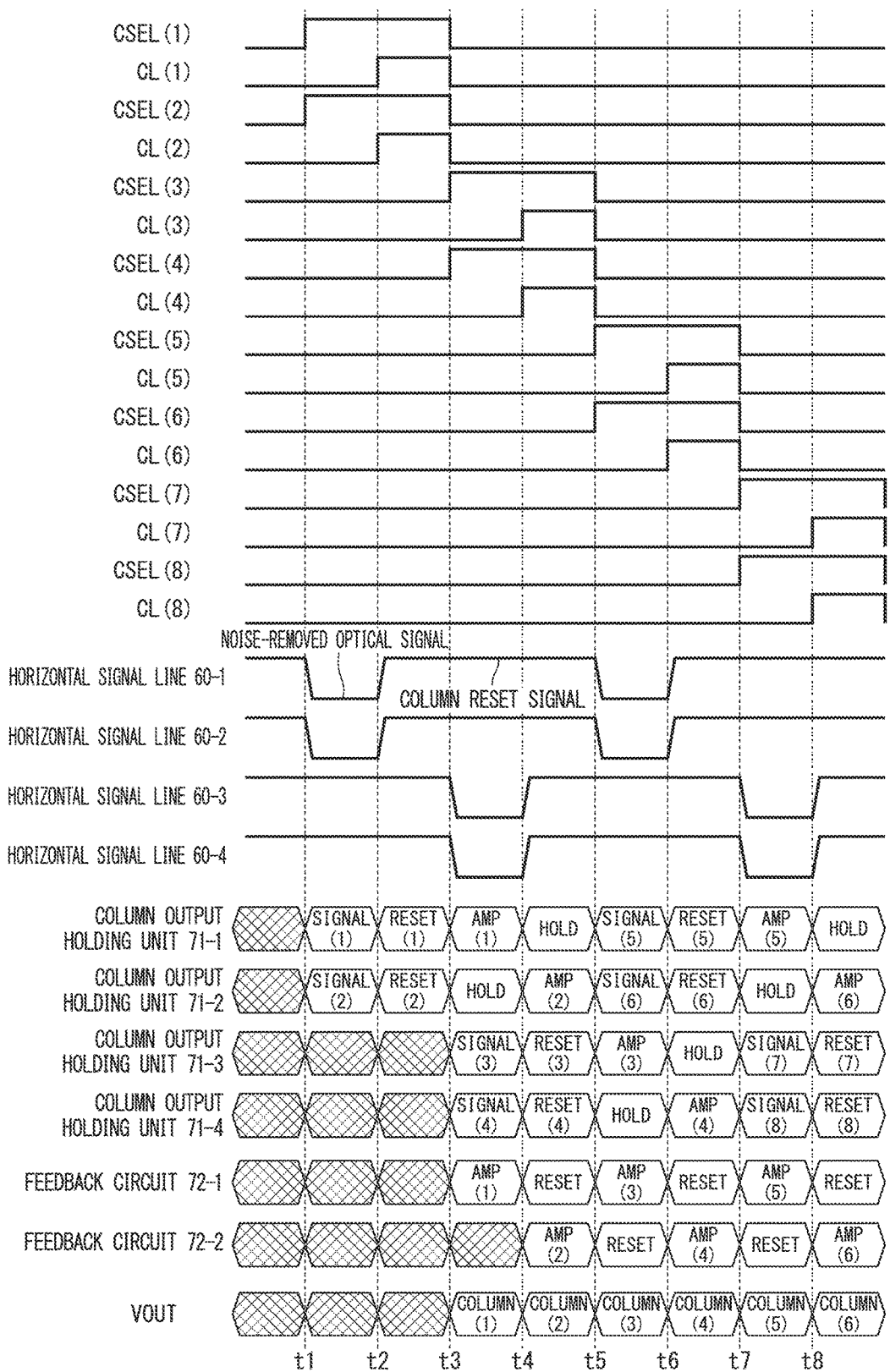
FIG. 10 is a timing chart showing an example of driving timings of the column circuit and the amplification and selection circuit provided in the solid-state imaging device according to the second embodiment of the present invention.

Subsequently, timings of a series of operations in the solid-state imaging device 2 having the configuration shown in FIG. 9 will be described. FIG. 10 is a timing chart showing an example of driving timings of the column circuit 50 and the amplification and selection circuit 70 provided in the solid-state imaging device 2 according to the second embodiment of the present invention. In FIG. 10, an example of driving timings when column circuits 50 corresponding to the pixels 11 of eight different columns in the pixel array unit 10 are set as one group for every two predetermined column circuits 50 and output signals obtained by performing correlated double sampling processes on the basis of column pixel signals output from the column circuits 50 are sequentially output by performing sequential control for every group is shown. Also, in FIG. 10, an example of driving timings when two adjacent column circuits 50 are set as one group is shown. Also, as in FIG. 7 described in the solid-state imaging device 1 of the first embodiment, the example of the driving timing shown in FIG. 10 is a driving timing of the horizontal reading period from a state in which noise-removed optical signals according to the pixel signals generated by the pixels 11 arranged in a first row of the pixel array unit 10 are held in the sampling capacitors 514 provided in the column circuits 50.

Also, words shown in the example of the driving timing shown in FIG. 10 are similar to those of FIG. 7 described in the solid-state imaging device 1 of the first embodiment. However, in the example of the driving timing shown in FIG. 10, when the number of horizontal signal lines 60 and the number of column output holding units 71 increase to four, a timing different from the driving timing in the solid-state imaging device 1 of the first embodiment shown in FIG. 7 is added. An operation at this timing is an operation in which the column output holding unit 71 holds the previous state (hereinafter referred to as a "state holding operation"). In FIG. 10, "HOLD" is shown as a word representing this "state holding operation".

Also, in the example of the driving timing shown in FIG. 10, as in FIG. 7 described in the solid-state imaging device 1 of the first embodiment, for ease of description, control for clamping the sampling capacitor C71R and the sampling capacitor C71S provided in each column output holding unit 71 and control for resetting the feedback capacitor CR1, the feedback capacitor CR2, the feedback capacitor CS1, and the feedback capacitor CS2 provided in the feedback unit 72 will be omitted. However, in the actual solid-state imaging device 2, as in the actual solid-state imaging device 1 of the first embodiment, the clamp control and the reset control are not omitted, and the clamp control and the reset control are performed at the above-described timings (see FIGS. 3 and 5).

In a horizontal reading period, at a time t1, the horizontal scanning circuit 40 first simultaneously selects the column circuit 50-1 of the first column and the column circuit 50-2 of the second column according to the column selection signal CSEL(1) of the first column and the column selection signal CSEL(2) of the second column. Thereby, the noise-removed optical signal held in the sampling capacitor 514 provided in the column circuit 50-1 of the first column is output to the horizontal signal line 60-1 and the noise-removed optical signal held in the sampling capacitor 514 provided in the column circuit 50-2 of the second column is output to the horizontal signal line 60-2, simultaneously. Also, at the time t1, the timing generation circuit 20 causes the column output holding unit 71-1 to perform the optical signal holding operation (SIGNAL(1)) according to the control signal SHS1, and to hold (sample) the noise-removed optical signal transmitted from the column circuit 50-1 via the horizontal signal line 60-1 in the sampling capacitor C71S within the column output holding unit 71-1. Also, at the time t1, the timing generation circuit 20 causes the column output holding unit 71-2 to perform the optical signal holding operation (SIGNAL(2)) according to the control signal SHS2, and to hold (sample) the noise-removed optical signal transmitted from the column circuit 50-2 via the horizontal signal line 60-2 in the sampling capacitor C71S within the column output holding unit 71-2.

Subsequently, at a time t2, the horizontal scanning circuit 40 causes the sampling capacitor 514 provided in the column circuit 50-1 of the first column and the sampling capacitor 514 provided in the column circuit 50-2 of the second column to be clamped to the clamp level VCOM according to a clamp pulse CL(1) of the first column and a clamp pulse CL(2) of the second column. Thereby, the column reset signal from the column circuit 50-1 of the first column is output to the horizontal signal line 60-1 and the column reset signal from the column circuit 50-2 of the second column is output to the horizontal signal line 60-2, simultaneously. Also, at the time t2, the timing generation circuit 20 causes the column output holding unit 71-1 to perform a reset signal holding operation (RESET(1)) according to the control signal SHR1, and to hold (sample) a column reset signal transferred from the column circuit 50-1 via the horizontal signal line 60-1 in the sampling capacitor C71R within the column output holding unit 71-1. At the time t2, the timing generation circuit 20 causes the column output holding unit 71-2 to perform a reset signal holding operation (RESET(2)) according to the control signal SHR2, and to hold (sample) a column reset signal transferred from the column circuit 50-2 via the horizontal signal line 60-2 in the sampling capacitor C71R within the column output holding unit 71-2.

Subsequently, at a time t3, the horizontal scanning circuit 40 releases the selection of the column circuit 50-1 of the first column according to the column selection signal CSEL(1) of the first column and the clamping of the sampling capacitor 514 provided in the column circuit 50-1 of the first column according to the clamp pulse CL(1) of the first column. Also, at the time t3, the horizontal scanning circuit 40 releases the selection of the column circuit 50-2 of the second column according to the column selection signal CSEL(2) of the second column and the clamping of the sampling capacitor 514 provided in the column circuit 50-2 of the second column according to the clamp pulse CL(2) of the second column.

Then, at the time t3, the timing generation circuit 20 selects the column output holding unit 71-1 according to the control signal CB1, and causes the differential amplification circuit 73 to perform a signal output operation (AMP(1)) by connecting the sampling capacitor C71R and the sampling capacitor C71S provided in the column output holding unit 71-1 and the feedback circuit 72-1 (the feedback circuit 72-R1 and the feedback circuit 72-S1) according to the control signal Φ2. Thereby, the differential amplification circuit 73 outputs an output signal VOUT obtained by performing the correlated double sampling process on the basis of the column pixel signal (the noise-removed optical signal and the column reset signal) transferred by the column circuit 50-1 of the first column via the horizontal signal line 60-1, i.e., an output signal VOUT(COLUMN(1)) according to a pixel signal output by the pixel 11 of the first column. Also, at the time t3, the timing generation circuit 20 does not select the column output holding unit 71-2 according to the control signal CB2. Accordingly, the column output holding unit 71-2 performs a state holding operation (HOLD) of holding the noise-removed optical signal in the sampling capacitor C71S and holding the column reset signal in the sampling capacitor C71R.

Further, at the time t3, the horizontal scanning circuit 40 simultaneously selects the column circuit 50-3 of the third column and the column circuit 50-4 of the fourth column according to the column selection signal CSEL(3) of the third column and the column selection signal CSEL(4) of the fourth column. Thereby, the noise-removed optical signal held in the sampling capacitor 514 provided in the column circuit 50-3 of the third column is output to the horizontal signal line 60-3 and the noise-removed optical signal held in the sampling capacitor 514 provided in the column circuit 50-4 of the fourth column is output to the horizontal signal line 60-4, simultaneously. At the time t3, the timing generation circuit 20 causes the column output holding unit 71-3 to perform an optical signal holding operation (SIGNAL(3)) according to the control signal SHS3, and to hold (sample) a noise-removed optical signal transferred from the column circuit 50-3 via the horizontal signal line 60-3 in the sampling capacitor C71S within the column output holding unit 71-3. Also, at the time t3, the timing generation circuit 20 causes the column output holding unit 71-4 to perform an optical signal holding operation (SIGNAL(4)) according to the control signal SHS4, and to hold (sample) a noise-removed optical signal transferred from the column circuit 50-4 via the horizontal signal line 60-4 in the sampling capacitor C71S within the column output holding unit 71-4.

Subsequently, at a time t4, the timing generation circuit 20 releases the selection of the column output holding unit 71-1 according to the control signal CB1 and the connection of each sampling capacitor within the column output holding unit 71-1 and the feedback circuit 72-1 to the differential amplification circuit 73 according to the control signal Φ2.

Then, at the time t4, the timing generation circuit 20 selects the column output holding unit 71-2 according to the control signal CB2, and causes the differential amplification circuit 73 to perform the signal output operation (AMP(2)) by connecting the sampling capacitor C71R and the sampling capacitor C71S provided in the column output holding unit 71-2 and the feedback circuit 72-2 (the feedback circuit 72-R2 and the feedback circuit 72-S2) according to the control signal Φ1. Thereby, the differential amplification circuit 73 outputs an output signal VOUT(COLUMN(2)) according to a pixel signal output by the pixel 11 of the second column obtained by performing the correlated double sampling process on the basis of the column pixel signal transferred by the column circuit 50-2 of the second column via the horizontal signal line 60-2. Also, at this time, the feedback capacitor CR1 and the feedback capacitor CS1 within the feedback circuit 72-1 are reset according to the control signal Φ1. Also, at the time t4, the timing generation circuit 20 sets the column output holding unit 71-1 to a state in which a state holding operation (HOLD) of holding a differential positive signal in the sampling capacitor C71S and holding a differential negative signal in the sampling capacitor C71R is performed without performing the selection of the column output holding unit 71-1 according to the control signal CB1.

Further, at the time t4, the horizontal scanning circuit 40 causes the sampling capacitor 514 provided in the column circuit 50-3 of the third column and the sampling capacitor 514 provided in the column circuit 50-4 of the fourth column to be clamped to the clamp level VCOM according to the clamp pulse CL(3) of the third column and the clamp pulse CL(4) of the fourth column. Thereby, the column reset signal from the column circuit 50-3 of the third column is output to the horizontal signal line 60-3 and the column reset signal from the column circuit 50-4 of the fourth column is output to the horizontal signal line 60-4, simultaneously. Also, at the time t4, the timing generation circuit 20 causes the column output holding unit 71-3 to perform the reset signal holding operation (RESET(3)) according to the control signal SHR3, and to hold (sample) the column reset signal transferred from the column circuit 50-3 via the horizontal signal line 60-3 in the sampling capacitor C71R within the column output holding unit 71-3. Also, at the time t4, the timing generation circuit 20 causes the column output holding unit 71-4 to perform the reset signal holding operation (RESET(4)) according to the control signal SHR4, and to hold (sample) the column reset signal transferred from the column circuit 50-2 via the horizontal signal line 60-4 in the sampling capacitor C71R within the column output holding unit 71-4.

Subsequently, at a time t5, the horizontal scanning circuit 40 releases the selection of the column circuit 50-3 of the third column according to the column selection signal CSEL(3) of the third column and the clamping of the sampling capacitor 514 provided in the column circuit 50-3 of the third column according to the clamp pulse CL(3) of the third column. Also, at the time t5, the horizontal scanning circuit 40 releases the selection of the column circuit 50-4 of the fourth column according to the column selection signal CSEL(4) of the fourth column and the clamping of the sampling capacitor 514 provided in the column circuit 50-4 of the fourth column according to the clamp pulse CL(4) of the fourth column. Also, at the time t5, the timing generation circuit 20 releases the selection of the column output holding unit 71-2 according to the control signal CB2, and the connection of each sampling capacitor within the column output holding unit 71-2 and the feedback circuit 72-2 to the differential amplification circuit 73 according to the control signal Φ1.

Then, at the time t5, the timing generation circuit 20 selects the column output holding unit 71-3 according to the control signal CB3, and causes the differential amplification circuit 73 to perform the signal output operation (AMP(3)) by connecting the sampling capacitor C71R and the sampling capacitor C71S provided in the column output holding unit 71-3 and the feedback circuit 72-1 according to the control signal Φ2.

Thereby, the differential amplification circuit 73 outputs an output signal VOUT (COLUMN(3)) according to a pixel signal output by the pixel 11 of the third column obtained by performing the correlated double sampling process on the basis of the column pixel signal transferred by the column circuit 50-3 of the third column via the horizontal signal line 60-3. Also, at this time, the feedback capacitor CR2 and the feedback capacitor CS2 within the feedback circuit 72-2 are reset according to the control signal Φ2. Also, at the time t5, the timing generation circuit 20 sets the column output holding unit 71-4 to a state in which a state holding operation (HOLD) of holding a noise-removed optical signal in the sampling capacitor C71S and holding a column reset signal in the sampling capacitor C71R is performed without performing the selection of the column output holding unit 71-4 according to the control signal CB4.

Further, at the time t5, the horizontal scanning circuit 40 simultaneously selects the column circuit 50-5 of the fifth column and the column circuit 50-6 of the sixth column according to the column selection signal CSEL(5) of the fifth column and the column selection signal CSEL(6) of the sixth column. Thereby, the noise-removed optical signal held in the sampling capacitor 514 provided in the column circuit 50-5 of the fifth column is output to the horizontal signal line 60-1 and the noise-removed optical signal held in the sampling capacitor 514 provided in the column circuit 50-6 of the sixth column is output to the horizontal signal line 60-2, simultaneously. Also, at the time t5, the timing generation circuit 20 causes the column output holding unit 71-1 to perform the optical signal holding operation (SIGNAL(5)) according to the control signal SHS1, and to hold (sample) the noise-removed optical signal transferred from the column circuit 50-5 via the horizontal signal line 60-1 in the sampling capacitor C71S within the column output holding unit 71-1. Also, at the time t5, the timing generation circuit 20 causes the column output holding unit 71-2 to perform the optical signal holding operation (SIGNAL(6)) according to the control signal SHS2, and to hold (sample) the noise-removed optical signal transferred from the column circuit 50-6 via the horizontal signal line 60-2 in the sampling capacitor C71S within the column output holding unit 71-2.

Subsequently, at a time t6, the timing generation circuit 20 releases the selection of the column output holding unit 71-3 according to the control signal CB3 and the connection of each sampling capacitor within the column output holding unit 71-1 and the feedback circuit 72-1 to the differential amplification circuit 73 according to the control signal Φ2.

Then, at the time t6, the timing generation circuit 20 selects the column output holding unit 71-4 according to the control signal CB4, and causes the differential amplification circuit 73 to perform the signal output operation (AMP(4)) by connecting the sampling capacitor C71R and the sampling capacitor C71S provided in the column output holding unit 71-4 and the feedback circuit 72-2 according to the control signal Φ1. Thereby, the differential amplification circuit 73 outputs an output signal VOUT (COLUMN(4)) according to a pixel signal output by the pixel 11 of the fourth column obtained by performing the correlated double sampling process on the basis of the column pixel signal transferred by the column circuit 50-4 of the fourth column via the horizontal signal line 60-4. Also, at this time, the feedback capacitor CR1 and the feedback capacitor CS1 within the feedback circuit 72-1 are reset according to the control signal Φ1. Also, at the time t6, the timing generation circuit 20 sets the column output holding unit 71-3 to a state in which a state holding operation (HOLD) of holding a differential positive signal in the sampling capacitor C71S and holding a differential negative signal in the sampling capacitor C71R is performed without performing the selection of the column output holding unit 71-3 according to the control signal CB3.

Further, at the time t6, the horizontal scanning circuit 40 causes the sampling capacitor 514 provided in the column circuit 50-5 of the fifth column and the sampling capacitor 514 provided in the column circuit 50-6 of the sixth column to be clamped to the clamp level VCOM according to the clamp pulse CL(5) of the fifth column and the clamp pulse CL(6) of the sixth column. Thereby, the column reset signal from the column circuit 50-5 of the fifth column is output to the horizontal signal line 60-1 and the column reset signal from the column circuit 50-6 of the sixth column is output to the horizontal signal line 60-2, simultaneously. Also, at the time t6, the timing generation circuit 20 causes the column output holding unit 71-1 to perform the reset signal holding operation (RESET(5)) according to the control signal SHR1, and to hold (sample) the column reset signal transferred from the column circuit 50-5 via the horizontal signal line 60-1 in the sampling capacitor C71R within the column output holding unit 71-1. Also, at the time t6, the timing generation circuit 20 causes the column output holding unit 71-2 to perform the reset signal holding operation (RESET(6)) according to the control signal SHR2, and to hold (sample) the column reset signal transferred from the column circuit 50-6 via the horizontal signal line 60-2 in the sampling capacitor C71R within the column output holding unit 71-2.

Subsequently, at a time t7, the horizontal scanning circuit 40 releases the selection of the column circuit 50-5 of the fifth column according to the column selection signal CSEL(5) of the first column and the clamping of the sampling capacitor 514 provided in the column circuit 50-5 of the fifth column according to the clamp pulse CL(5) of the fifth column. Also, at the time t7, the horizontal scanning circuit 40 releases the selection of the column circuit 50-6 of the sixth column according to the column selection signal CSEL(6) of the sixth column and the clamping of the sampling capacitor 514 provided in the column circuit 50-6 of the sixth column according to the clamp pulse CL(6) of the sixth column.

Then, at the time t7, the timing generation circuit 20 selects the column output holding unit 71-1 according to the control signal CB1, and causes the differential amplification circuit 73 to perform the signal output operation (AMP(5)) by connecting the sampling capacitor C71R and the sampling capacitor C71S provided in the column output holding unit 71-1 and the feedback circuit 72-1 according to the control signal Φ2. Thereby, the differential amplification circuit 73 outputs an output signal VOUT (COLUMN(5)) according to the pixel signal output by the pixel 11 of the fifth column obtained by performing the correlated double sampling process on the basis of a column pixel signal transferred by the column circuit 50-5 of the fifth column via the horizontal signal line 60-1. Also, at this time, the feedback capacitor CR2 and the feedback capacitor CS2 within the feedback circuit 72-2 are reset according to the control signal Φ2. Also, at the time t7, the timing generation circuit 20 sets the column output holding unit 71-2 to a state in which a state holding operation (HOLD) of holding a noise-removed optical signal in the sampling capacitor C71S and holding a column reset signal in the sampling capacitor C71R is performed without performing the selection of the column output holding unit 71-2 according to the control signal CB2.

Further, at a time t7, the horizontal scanning circuit 40 simultaneously selects the column circuit 50-7 of the seventh column and the column circuit 50-8 of the eighth column according to the column selection signal CSEL(7) of the seventh column and the column selection signal CSEL(8) of the eighth column. Thereby, the noise-removed optical signal held in the sampling capacitor 514 provided in the column circuit 50-7 of the seventh column is output to the horizontal signal line 60-3 and the noise-removed optical signal held in the sampling capacitor 514 provided in the column circuit 50-8 of the eighth column is output to the horizontal signal line 60-4, simultaneously. Also, at the time t7, the timing generation circuit 20 causes the column output holding unit 71-3 to perform the optical signal holding operation (SIGNAL(7)) according to the control signal SHS3, and to hold (sample) the noise-removed optical signal transferred from the column circuit 50-7 via the horizontal signal line 60-3 in the sampling capacitor C71S within the column output holding unit 71-3. Also, at the time t7, the timing generation circuit 20 causes the column output holding unit 71-4 to perform the optical signal holding operation (SIGNAL(8)) according to the control signal SHS4, and to hold (sample) the noise-removed optical signal transferred from the column circuit 50-8 via the horizontal signal line 60-4 in the sampling capacitor C71S within the column output holding unit 71-4.

After a time t8, likewise, the horizontal scanning circuit 40 sequentially selects the column circuits 50 two by two simultaneously and simultaneously outputs column pixel signals to the corresponding horizontal signal lines 60. Also, the timing generation circuit 20 performs control so that the optical signal holding operation and the reset signal holding operation in the two column output holding units 71 corresponding to column pixel signals transferred simultaneously through the horizontal signal lines 60 are simultaneously performed. The timing generation circuit 20 exclusively controls the signal output operation and the state holding operation in each column output holding unit 71 to cause output signals VOUT corresponding to the column pixel signals to be output from the differential amplification circuits 73. That is, the timing generation circuit 20 performs control so that the selection of the column output holding unit 71 for outputting the differential positive signal and the differential negative signal for causing the differential amplification circuit 73 to amplify the differential signal does not overlap between different column output holding units 71.

As described above, the solid-state imaging device 2 includes the four horizontal signal lines 60 (the horizontal signal lines 60-1 to 60-4) and periodically connects the adjacent column circuits 50 to different horizontal signal lines 60. Then, in the solid-state imaging device 2, the reading of the column pixel signal from the column circuit 50 to the horizontal signal line 60 and the reading of the column pixel signal from the adjacent column circuit 50 to a different horizontal signal line 60 are performed in parallel, simultaneously.

Also, in the solid-state imaging device 2, the four column output holding units 71 (the column output holding units 71-1 to 71-4) corresponding to the horizontal signal lines 60 are provided within the amplification and selection circuit 70, and the column pixel signals transferred via the corresponding horizontal signal lines 60 are simultaneously held in two column output holding units 71. In the solid-state imaging device 2, two sets of feedback circuits (the feedback circuit 72-1 and the feedback circuit 72-2) configured to include feedback capacitors corresponding to the noise-removed optical signal and the column reset signal are provided within the feedback unit 72 within the amplification and selection circuit 70, and two column output holding units 71 having completed holding of both the noise-removed optical signal and the column reset signal are exclusively selected. At this time, in the solid-state imaging device 2, the held state of the noise-removed optical signal and the column reset signal held in the column output holding unit 71 which is not selected is maintained. Then, in the solid-state imaging device 2, two sets of feedback circuits are alternately switched as the feedback capacitor connected to the differential amplification circuit 73 for amplifying the difference signal (the correlated double sampling process) between the noise-removed optical signal and the column reset signal held by the selected column output holding unit 71.

Thereby, in the solid-state imaging device 2, the optical signal holding operation and the reset signal holding operation in the two column output holding units 71 among the four column output holding units 71 provided in the amplification and selection circuit 70 are simultaneously performed. Thereafter, the signal output operations in the two column output holding units 71 do not overlap and the column pixel signals output by the column circuits 50, i.e., the output signals VOUT corresponding to the pixels 11 arranged in the columns, can be continuously and sequentially output. Thus, in the solid-state imaging device 2, as in the solid-state imaging device 1 of the first embodiment, it is possible to output the output signal VOUT according to the signal output operation of any column output holding unit 71. Accordingly, in the solid-state imaging device 2, as in the solid-state imaging device 1 of the first embodiment, the amplification and selection circuit 70 minimizes deterioration of image quality due to the column circuit 50, and it is possible to improve a speed at which the output signal VOUT is output without increasing power consumption.

Also, in the solid-state imaging device 2, the reading of column pixel signals from two adjacent column circuits 50 to the corresponding horizontal signal lines 60 is simultaneously performed in parallel. Thus, in the solid-state imaging device 2, it is possible to make a cycle of a timing for controlling the reading of the column pixel signal for the column circuit 50 longer than in the solid-state imaging device 1 of the first embodiment. Thus, in the solid-state imaging device 2, it is possible to lower the operation speed (for example, the frequency of the clock signal) of the components that control the column circuit 50. Thereby, in the solid-state imaging device 2, it is possible to reduce the power consumption as compared with the solid-state imaging device 1 of the first embodiment.

Also, in the example of the driving timing shown in FIG. 10, an example in which control is performed such that the noise-removed optical signal and the column reset signal from the column circuits 50 belonging to different groups are not output in the same period (do not overlap) is shown. However, for example, as in FIG. 7 described in the solid-state imaging device 1 of the first embodiment, control may be performed so that the noise-removed optical signal and the column reset signal in the column circuits 50 belonging to different groups are output in the same period.

Also, because the arrangement of the components included in the solid-state imaging device 2 can be conceived as being similar to the arrangement of the components provided in the solid-state imaging device 1 of the first embodiment, a detailed description thereof will be omitted.

According to the second embodiment, there is provided a method of driving a solid-state imaging device (the solid-state imaging device 2) in which the amplification and selection circuit (the amplification and selection circuit 70) includes: a plurality of column output holding units (column output holding units 71) corresponding to a plurality of horizontal signal lines (horizontal signal lines 60), including a sampling capacitor (the sampling capacitor C71S and the sampling capacitor C71R) configured to hold a column pixel signal (the noise-removed optical signal) transferred by the corresponding horizontal signal line 60 in a first operation (the optical signal holding operation) and to hold a column reset signal transferred by the corresponding horizontal signal line 60 in a second operation (the reset signal holding operation), and configured to output a differential signal into which a signal of a difference between the column pixel signal and the column reset signal held in the sampling capacitor C71S and the sampling capacitor C71R is converted in a third operation (the signal output operation); a feedback unit (the feedback unit 72) corresponding to all the plurality of column output holding units 71, including a first feedback capacitor (the feedback capacitor CS1 and the feedback capacitor CR1) and a second feedback capacitor (the feedback capacitor CS2 and the feedback capacitor CR2) for amplifying a signal, and configured to alternately switch a feedback capacitor for amplifying the differential signal output from the column output holding unit 71 to either one of the feedback capacitor CS1 and the feedback capacitor CR1 or the feedback capacitor CS2 and the feedback capacitor CR2 for every signal output operation; and a differential amplification circuit (the differential amplification circuit 73) configured to amplify the output differential signal to output the amplified differential signal as the difference signal in accordance with a ratio between the sampling capacitor C71S and the sampling capacitor C71R provided in the column output holding unit 71 configured to output the differential signal and the feedback capacitor CS1 and the feedback capacitor CR1 or the feedback capacitor CS2 and the feedback capacitor CR2 to which the feedback capacitor is switched in the signal output operation, and the method includes: setting a group for every predetermined number of different horizontal signal lines 60 and causing the noise-removed optical signal and the column reset signal to be sequentially output simultaneously from different column circuits (column circuits 50) connected to the horizontal signal lines 60 belonging to the same group to the connected horizontal signal lines 60; causing the column output holding units 71, each of which performs the optical signal holding operation corresponding to the horizontal signal line 60 by which the noise-removed optical signal is transferred, to simultaneously hold transferred noise-removed optical signals; causing the column output holding units 71, each of which performs the reset signal holding operation corresponding to the horizontal signal line 60 by which the column reset signal is transferred, to simultaneously hold transferred column reset signals; causing each column output holding unit 71, which outputs the differential signal in the signal output operation, to exclusively output the differential signal and causing the column output holding unit 71, which does not output the differential signal, to maintain hold states of the noise-removed optical signal and the column reset signal or a hold state of the differential signal; and causing the differential amplification circuit 73 to be initialized during a period in which the optical signal holding operation, the reset signal holding operation, and the signal output operation are switched.

As described above, in the solid-state imaging device 2 of the second embodiment, the column circuits 50 provided in the solid-state imaging device 2 are classified and connected to four horizontal signal lines 60 (the horizontal signal lines 60-1 to 60-4) and control is performed so that the reading out of the column pixel signals from the two different adjacent column circuits 50 to the different horizontal signal lines 60 is simultaneously performed in parallel. Also, in the solid-state imaging device 2 of the second embodiment, the optical signal holding operation and the reset signal holding operation in the column output holding unit 71 corresponding to each horizontal signal line 60 are performed simultaneously, and then control is performed so that signal output operations do not overlap in different column output holding units 71 by exclusively performing the signal output operation in each column output holding unit 71. When any column output holding unit 71 performs the signal output operation, two sets of feedback circuits corresponding to the noise-removed optical signal and the column reset signal are alternately switched and a difference signal between the noise-removed optical signal and the column reset signal is amplified. Thus, in the solid-state imaging device 2 of the second embodiment, as in the solid-state imaging device 1 of the first embodiment, it is also possible to improve a speed at which the output signal VOUT corresponding to the pixel 11 arranged in each column is output.

Also, as shown in FIG. 2, an example of a configuration in which the column circuit 50 provided in the solid-state imaging device 1 of the first embodiment and the solid-state imaging device 2 of the second embodiment hold a noise-removed optical signal according to the correlated double sampling process based on a pixel signal output by one pixel 11 connected to the same vertical signal line 12 as shown in FIG. 2 is shown. However, the configuration of the column circuit 50 provided in the solid-state imaging device 2 is not limited to the configurations shown in the first embodiment and the second embodiment, and may be a configuration in which noise-removed optical signals based on pixel signals output by more pixels 11 are held.

Third Embodiment

Next, a third embodiment of the present invention will be described. A configuration of a column circuit 50 of a solid-state imaging device (hereinafter referred to as a "solid-state imaging device 3") according to the third embodiment of the present invention is different from the configurations of the column circuits 50 of the solid-state imaging device 1 of the first embodiment and the solid-state imaging device 2 of the second embodiment. Thus, the structure of the solid-state imaging device 3 and the configuration and operation of each component other than the column circuit provided in the solid-state imaging device 3 are similar to those of the solid-state imaging device 1 of the first embodiment and the solid-state imaging device 2 of the second embodiment. Accordingly, a detailed description of the structure of the solid-state imaging device 3 and the configuration and operation of each component other than the column circuit provided in the solid-state imaging device 3 will be omitted.

Figure 11:
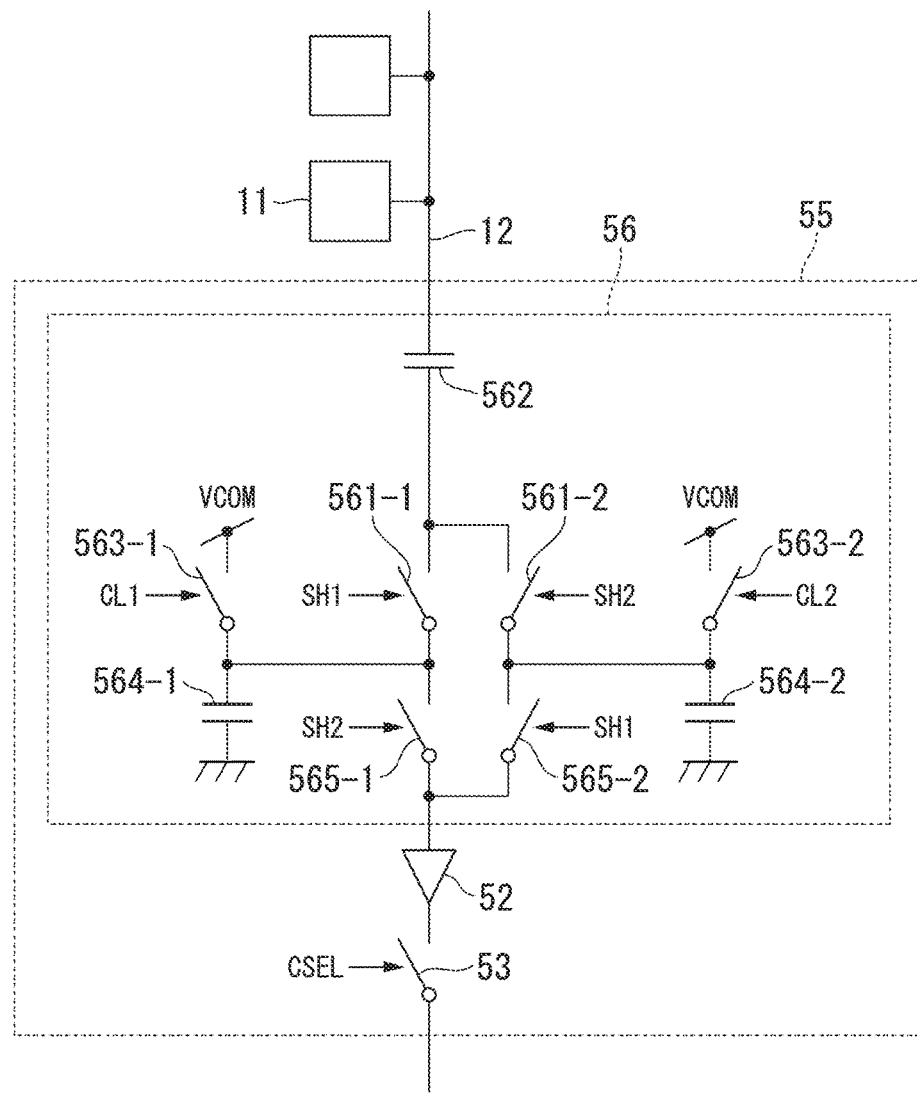
FIG. 11 is a circuit diagram showing an example of a configuration of a column circuit included in a solid-state imaging device according to a third embodiment of the present invention.

FIG. 11 is a circuit diagram showing an example of a configuration of a column circuit included in the solid-state imaging device 3 according to the third embodiment of the present invention. In FIG. 11, an example of the configuration of two pixels 11 connected to the same vertical signal line 12 and one column circuit 55 corresponding to these pixels 11 is shown. The column circuit 55 shown in FIG. 11 also include circuit elements similar to those of the column circuit 50 provided in the solid-state imaging device 1 of the first embodiment and the solid-state imaging device 2 of the second embodiment. Accordingly, in the following description, circuit elements similar to the circuit elements of the column circuit 50 shown in FIG. 2 among circuit elements of the column circuit 55 are denoted by the same reference signs and detailed descriptions thereof will be omitted.

The column circuit 55 includes a pixel output holding unit 56, the column output amplifier 52, and the column selection switch 53. The column circuit 55 is a configuration including the pixel output holding unit 56 instead of the pixel output holding unit 51 provided in the column circuit 50. An input terminal of the pixel output holding unit 56 is an input terminal of the column circuit 55 and is connected to the vertical signal line 12. An output terminal of the pixel output holding unit 56 is connected to an input terminal of the column output amplifier 52 as in the column circuit 50. As in the column circuit 50, an output terminal of the column output amplifier 52 is connected to a first terminal of the column selection switch 53, and a second terminal of the column selection switch 53 is an output terminal of the column circuit 55.

Similar to the pixel output holding unit 51 provided in the column circuit 50, the pixel output holding unit 56 generates and holds a noise-removed optical signal corresponding to the pixel signal output from the pixel 11 and transferred via the vertical signal line 12. The pixel output holding unit 56 generates and holds each of noise-removed optical signals corresponding to the two pixels 11 connected to the same vertical signal line 12, i.e., the pixels 11 on different rows. The pixel output holding unit 56 outputs the noise-removed optical signal corresponding to the selected pixel 11 to the column output amplifier 52.

The pixel output holding unit 56 includes a clamp capacitor 562, a first sampling switch 561-1, a first clamp switch 563-1, a first sampling capacitor 564-1, a first sampling capacitor selection switch 565-1, a second sampling switch 561-2, a second clamp switch 563-2, a second sampling capacitor 564-2, and a second sampling capacitor selection switch 565-2.

A first electrode of the clamp capacitor 562 is the input terminal of the pixel output holding unit 56, i.e., the input terminal of the column circuit 55, and is connected to the vertical signal line 12. A second electrode of the clamp capacitor 562 is connected to a first terminal of each of the first sampling switch 561-1 and the second sampling switch 561-2. The second terminal of the first sampling switch 561-1 is connected to a first terminal of the first clamp switch 563-1, a first electrode of the first sampling capacitor 564-1, and a first terminal of the first sampling capacitor selection switch 565-1. A second terminal of the second sampling switch 561-2 is connected to a first terminal of the second clamp switch 563-2, a first electrode of the second sampling capacitor 564-2, and a first terminal of the second sampling capacitor selection switch 565-2. A second terminal of the first sampling capacitor selection switch 565-1 is connected to a second terminal of the second sampling capacitor selection switch 565-2 and serves as an output terminal of the pixel output holding unit 56. A second terminal of the first clamp switch 563-1 is connected to the reference voltage VCOM. A second electrode of the first sampling capacitor 564-1 is grounded. A second terminal of the second clamp switch 563-2 is connected to the reference voltage VCOM. A second electrode of the second sampling capacitor 564-2 is grounded.

Similar to the clamp capacitor 512 provided in the pixel output holding unit 51 within the column circuit 50, the clamp capacitor 562 is a capacitor configured to hold (store) charges corresponding to a signal level (a potential) of an input pixel signal. The clamp capacitor 512 stores charges according to a potential difference between a potential applied to the first electrode thereof and a potential applied to the second electrode thereof. In the pixel output holding unit 56, the signal level (the potential) of the pixel signal transferred from the pixel 11 via the vertical signal line 12 is directly applied to the first electrode of the clamp capacitor 562.

Similar to the sampling switch 511 provided in the pixel output holding unit 51 within the column circuit 50, the first sampling switch 561-1 is a switch configured to transfer charges corresponding to a signal level (a potential) of a pixel signal held in the clamp capacitor 562 to the first sampling capacitor 564-1 in accordance with a sampling pulse SH1 output from the timing generation circuit 20. When the first sampling switch 561-1 is controlled in a closed state according to the sampling pulse SH1, the first sampling switch 561-1 connects the first terminal and the second terminal thereof and transfers charges corresponding to the signal level (the potential) of the pixel signal held in the clamp capacitor 562 to the first sampling capacitor 564-1. Thereby, the signal level (the potential) of the pixel signal is applied to the first electrode of the first sampling capacitor 564-1.

Similar to the clamp switch 513 provided in the pixel output holding unit 51 within the column circuit 50, the first clamp switch 563-1 is a switch for causing the first sampling capacitor 564-1 to be clamped to the potential of the reference voltage VCOM (the clamp level VCOM) in accordance with a clamp pulse CL1 output from the horizontal scanning circuit 40. When the first clamp switch 563-1 is controlled in a closed state according to the clamp pulse CL1, the first clamp switch 563-1 connects the first terminal and the second terminal thereof and causes the first electrode of the first sampling capacitor 564-1 to be clamped to the clamp level VCOM. Thereby, when a pixel signal is input to the first electrode of the first sampling capacitor 564-1 in a non-clamped state, the first sampling capacitor 564-1 stores charges according to a potential difference (a potential) between a signal level (a potential) of the input pixel signal and the clamp level VCOM.

Similar to the sampling capacitor 514 provided in the pixel output holding unit 51 within the column circuit 50, the first sampling capacitor 564-1 is a capacitor configured to hold (store) charges corresponding to the signal level (the potential) of the pixel signal. A potential corresponding to the charges stored by the first sampling capacitor 564-1 is held by the pixel output holding unit 56 and is a signal level (a potential) of a noise-removed optical signal corresponding to any pixel 11 output to the column output amplifier 52.

In accordance with a sampling pulse SH2 output from the timing generation circuit 20, the first sampling capacitor selection switch 565-1 is a switch for selecting an output of the signal level (the potential) of the noise-removed optical signal stored by the first sampling capacitor 564-1 to the outside of the pixel output holding unit 56. When the first sampling capacitor selection switch 565-1 is controlled in a closed state according to the sampling pulse SH2, the first sampling capacitor selection switch 565-1 connects the first terminal and the second terminal thereof, and outputs the signal level (the potential) of the noise-removed optical signal stored by the first sampling capacitor 564-1 to the outside of the pixel output holding unit 56, i.e., to the column output amplifier 52.

Similar to the sampling switch 511 provided in the pixel output holding unit 51 within the column circuit 50, the second sampling switch 561-2 is a switch configured to transfer charges corresponding to the signal level (the potential) of the pixel signal held in the clamp capacitor 562 to the second sampling capacitor 564-2 in accordance with the sampling pulse SH2 output from the timing generation circuit 20. When the second sampling switch 561-2 is controlled in a closed state according to the sampling pulse SH2, the second sampling switch 561-2 connects the first terminal and the second terminal thereof and transfers charges corresponding to the signal level (the potential) of the pixel signal held in the clamp capacitor 562 to the second sampling capacitor 564-2. Thereby, the signal level (the potential) of the pixel signal is applied to the first electrode of the second sampling capacitor 564-2.

Similar to the clamp switch 513 provided in the pixel output holding unit 51 within the column circuit 50, the second clamp switch 563-2 is a switch for causing the second sampling capacitor 564-2 to be clamped to the clamp level VCOM in accordance with a clamp pulse CL2 output from the horizontal scanning circuit 40. When the second clamp switch 563-2 is controlled in a closed state according to the clamp pulse CL2, the second clamp switch 563-2 connects the first terminal and the second terminal thereof, and causes the first electrode of the second sampling capacitor 564-2 to be clamped to the clamp level VCOM. Thereby, when a pixel signal is input to the first electrode of the second sampling capacitor 564-2 in a non-clamped state, the second sampling capacitor 564-2 stores charges according to a potential difference (the potential) between the signal level (the potential) of the input pixel signal and the clamp level VCOM.

Similar to the sampling capacitor 514 provided in the pixel output holding unit 51 within the column circuit 50, the second sampling capacitor 564-2 is a capacitor configured to hold (store) charges corresponding to the signal level (the potential) of the pixel signal. The potential corresponding to the charges stored in the second sampling capacitor 564-2 is a signal level (a potential) of a noise-removed optical signal corresponding to any pixel 11 different from the pixel 11 to which the first sampling capacitor 564-1 corresponds to be held in the pixel output holding unit 51 and output to the column output amplifier 52.

In accordance with the sampling pulse SH1 output from the timing generation circuit 20, the second sampling capacitor selection switch 565-2 is a switch for selecting an output of the signal level (the potential) of the noise-removed optical signal stored by the second sampling capacitor 564-2 to the outside of the pixel output holding unit 56. When the second sampling capacitor selection switch 565-2 is controlled in a closed state according to the sampling pulse SH1, the second sampling capacitor selection switch 565-2 connects the first terminal and the second terminal thereof, and outputs the signal level (the potential) of the noise-removed optical signal stored by the second sampling capacitor 564-2 (to the column output amplifier 52) to the outside of the pixel output holding unit 56.

According to such a configuration, the column circuit 55 generates noise-removed optical signals corresponding to two pixels 11 in different rows in the corresponding column, and holds the noise-removed optical signals in the corresponding first sampling capacitor 564-1 or second sampling capacitor 564-2 in accordance with the sampling pulse SH1 and the sampling pulse SH2 output from the timing generation circuit 20. Then, the column circuit 55 outputs the noise-removed optical signal to the horizontal signal line 60 in accordance with the column selection signal CSEL output from the horizontal scanning circuit 40. At this time, the column circuit 55 outputs the noise-removed optical signal selected according to the sampling pulse SH1 and the sampling pulse SH2 to the horizontal signal line 60. In the column circuit 55, in the same period as a period during which a noise-removed optical signal is held in either one of the first sampling capacitor 564-1 and the second sampling capacitor 564-2 by performing the correlated double sampling process based on the pixel signal output from the pixel 11, a previously held noise-removed optical signal can be output from the other of the first sampling capacitor 564-1 and the second sampling capacitor 564-2.

Also, although a column circuit 55 having a configuration corresponding to pixels 11 for two different rows in a corresponding column is shown in FIG. 11, a configuration of a column circuit corresponding to pixels 11 of different rows is not limited to the configuration shown in FIG. 11 and a configuration corresponding to pixels 11 arranged in more rows may be adopted.

Figure 12:
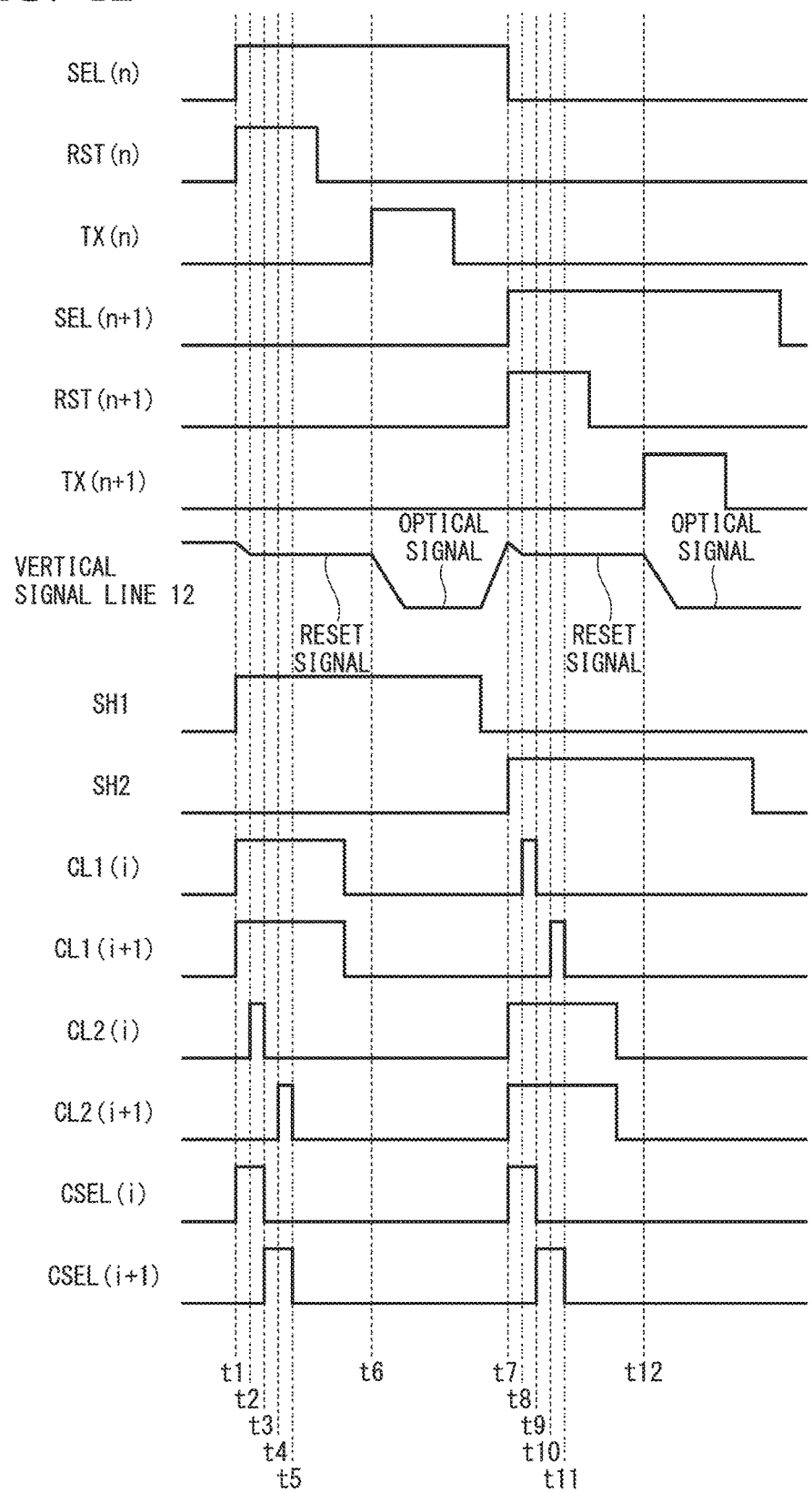
FIG. 12 is a timing chart showing an example of driving timings of a pixel and a column circuit included in the solid-state imaging device according to the third embodiment of the present invention.

Next, driving timings with the column circuit 55 provided in the solid-state imaging device 3 of the third embodiment will be described. FIG. 12 is a timing chart showing an example of driving timings of the pixel 11 and the column circuit 55 included in the solid-state imaging device 3 according to the third embodiment of the present invention. In FIG. 12, an example of the driving timing when an operation of holding a noise-removed optical signal obtained by performing the correlated double sampling process on a pixel signal output from each of the pixels 11 arranged in two different columns in the pixel array unit 10 and an operation of outputting a previously held noise-removed optical signal to the horizontal signal line 60 are performed simultaneously is shown. Also, an example of the driving timing shown in FIG. 12 is a driving timing after the exposure in the solid-state imaging device 3 is completed and the noise removing optical signal is already held in the second sampling capacitor 564-2.

In the following description, each transistor provided in each pixel 11 will be described as being in an ON state by the vertical scanning circuit 30 setting each control signal to a "High" level. Also, in the following description, a corresponding switch will be described as being in a closed state by the timing generation circuit 20 and the horizontal scanning circuit 40 setting each control signal to a "High" level. Also, because the operation in each pixel 11 is similar to that in FIG. 3 described with respect to the solid-state imaging device 1 of the first embodiment, the operation of each pixel 11 will be briefly described.

At a time t1, the vertical scanning circuit 30 sets the selection pulse SEL(n) of the same row (for example, the $n^{th}$ row) to a "High" level and causes each pixel 11 of an $n^{th}$ row to be connected to the vertical signal line 12. Also, simultaneously, the vertical scanning circuit 30 sets the reset pulse RST(n) of the same $n^{th}$ row to a "High" level and causes a reset signal of the pixel 11 of the $n^{th}$ row of each column to be output to the vertical signal line 12. Thereby, a signal level (a potential) of the reset signal transferred from the pixel 11 of the $n^{th}$ row via the vertical signal line 12 is applied to the first electrode of the clamp capacitor 562 provided in the pixel output holding unit 56 within the column circuit 55 corresponding to each column and charges corresponding to the signal level (the potential) of the applied reset signal are stored in the clamp capacitor 562.

Also, at the time t1, the timing generation circuit 20 sets the sampling pulse SH1 to a "High" level to set the first sampling switch 561-1 provided in the pixel output holding unit 56 within the column circuit 55 corresponding to each column is brought into a closed state. Thereby, a signal level (a potential) of a reset signal held in the clamp capacitor 562 is transferred via the first sampling switch 561-1 and applied to the first electrode of the first sampling capacitor 564-1 provided in the pixel output holding unit 56 within the column circuit 55 corresponding to each column. Simultaneously, the horizontal scanning circuit 40 sets a clamp pulse CL1(i) and a clamp pulse CL1(i+1) corresponding to columns (for example, a column i and a column (i+1)) to a "High" level to set the first clamp switch 563-1 provided in the pixel output holding unit 56 within the column circuit 55 corresponding to each column to a closed state. Thereby, the first electrode of each first sampling capacitor 564-1 is clamped to the clamp level VCOM, i.e., the potential of the reference voltage VCOM is applied to the first electrode of the first sampling capacitor 564-1. Thereby, the first sampling capacitor 564-1 stores charges according to a potential difference between the potential of the reset signal and the clamp level VCOM.

Also, at the time t1, the horizontal scanning circuit 40 sets the column selection signal CSEL(i) of an $i^{th}$ column to a "High" level to set the column selection switch 53 provided in the column circuit 55 of the $i^{th}$ column to a closed state. At this time, because the sampling pulse SH1 is at a "High" level, the second sampling capacitor selection switch 565-2 provided in the pixel output holding unit 56 within the column circuit 55 corresponding to each column is in a closed state. Thereby, a noise-removed optical signal of a signal level (a potential) corresponding to charges stored in the second sampling capacitor 564-2 provided in the pixel output holding unit 56 within the column circuit 55 of the $i^{th}$ column (a noise-removed optical signal corresponding to a pixel 11 of an $(n-1)^{th}$ row) is output to the horizontal signal line 60 via the second sampling capacitor selection switch 565-2, the column output amplifier 52, and the column selection switch 53.

Subsequently, at a time t2, the horizontal scanning circuit 40 sets the clamp pulse CL2(i) of the $i^{th}$ column to a "High" level to set the second clamp switch 563-2 provided in the column circuit 55 of the $i^{th}$ column to a closed state. Thereby, the first electrode of each second sampling capacitor 564-2 are clamped to the clamp level VCOM, the column reset signal of the clamp level VCOM is output to the horizontal signal line 60 via the second sampling capacitor selection switch 565-2, the column output amplifier 52, and the column selection switch 53. Here, the noise-removed optical signal corresponding to the pixel 11 of the $(n-1)^{th}$ row output by the column circuit 55 to the horizontal signal line 60 at the time t1 and the column reset signal output to the horizontal signal line 60 at the time t2 are used in the correlated double sampling process in the amplification and selection circuit 70.

Subsequently, at a time t3, the horizontal scanning circuit 40 sets the column selection signal CSEL(i) and the clamp pulse CL2(i) of the $i^{th}$ column to a "Low" level, and the reading out of a column pixel signal output by the column circuit 55 of the $i^{th}$ column to the horizontal signal line 60 is terminated. Then, as in the control at the time t1, the horizontal signal line 60 sets the column selection signal CSEL(i+1) of the (i+1)$^{th}$ column to a "High" level to set the column selection switch 53 provided in the column circuit 55 of the (i+1)$^{th}$ column to a closed state, and causes a noise-removed optical signal of a signal level (a potential) according to charges stored in the second sampling capacitor 564-2 within the column circuit 55 of the (i+1)$^{th}$ column to be output to the horizontal signal line 60 via the second sampling capacitor selection switch 565-2, the column output amplifier 52, and the column selection switch 53.

Subsequently, at a time t4, as in the control at the time t2, the horizontal scanning circuit 40 sets the clamp pulse CL2(i+1) of the (i+1)$^{th}$ column to a "High" level to set the second clamp switch 563-2 provided in the column circuit 55 of the (i+1)$^{th}$ column to a closed state, and causes the column reset signal of the column circuit 55 of the (i+1)$^{th}$ column to be output to the horizontal signal line 60 via the second sampling capacitor selection switch 565-2, the column output amplifier 52, and the column selection switch 53.

Subsequently, at a time t5, the horizontal scanning circuit 40 sets the column selection signal CSEL(i+1) and the clamp pulse CL2(i+1) of the (i+1)$^{th}$ column to a "Low" level, and terminates the reading out of a column pixel signal output by the column circuit 55 of the (i+1)$^{th}$ column to the horizontal signal line 60.

Thereafter, the vertical scanning circuit 30 sets the reset pulse RST(n) of the n$^{th}$ row to a "Low" level to stop the outputting of the reset signal of the pixel 11 of the n$^{th}$ row of each column to the vertical signal line 12. Also, the horizontal scanning circuit 40 sets the clamp pulse CL1(i) and the clamp pulse CL1(i+1) corresponding to each column to a "Low" level to set each first clamp switch 563-1 to an open state, and release the clamping of each first sampling capacitor 564-1.

Subsequently, at a time t6, the vertical scanning circuit 30 sets the transfer pulse TX(n) of the same n$^{th}$ row to a "High" level and causes the optical signal of the pixel 11 of the n$^{th}$ row of each column to be output to the vertical signal line 12. Thereby, the signal level (the potential) of the optical signal transferred from the pixel 11 of the n$^{th}$ row via the vertical signal line 12 is applied to the first electrode of the clamp capacitor 562 within the column circuit 55 corresponding to each column and charges corresponding to the signal level (the potential) of the applied optical signal are stored in the clamp capacitor 562.

Also, because the sampling pulse SH1 is at a "High" level at the time t6, the first sampling switch 561-1 within each column circuit 55 is in a closed state. Thus, the signal level (the potential) of the optical signal held in the clamp capacitor 562 is transferred via the first sampling switch 561-1 and applied to the first electrode of the first sampling capacitor 564-1. Thereby, the first sampling capacitor 564-1 stores charges according to the potential difference between the potential of the optical signal and the stored potential (that is, the potential of the potential difference between the reset signal of the pixel 11 of the n$^{th}$ row and the clamp level VCOM). Here, the potential corresponding to the charges stored in the first sampling capacitor 564-1 is a signal level (a potential) of the noise-removed optical signal, i.e., a noise-removed optical signal corresponding to the pixel 11 of the n$^{th}$ row obtained by removing a component of the reset signal included in the optical signal as a noise component according to the correlated double sampling process.

Thereafter, the vertical scanning circuit 30 sets the transfer pulse TX(n) of the n$^{th}$ row to a "Low" level to stop the outputting of the optical signal of the pixel 11 of the n$^{th}$ row of each column to the vertical signal line 12. Also, the timing generation circuit 20 sets the sampling pulse SH1 to a "Low" level to set the first sampling switch 561-1 within each column circuit 55 to an open state, and terminates the transfer of the signal level (the potential) of the optical signal held in the clamp capacitor 562 to the first sampling capacitor 564-1. That is, the timing generation circuit 20 terminates the sampling of the pixel signal output by the pixel 11 of the n$^{th}$ row corresponding to each column circuit 55.

Subsequently, at a time t7, the vertical scanning circuit 30 sets the selection pulse SEL(n) of the n$^{th}$ row to a "Low" level and disconnects the connection with the vertical signal line 12 of each pixel 11 of the n$^{th}$ row.

Also, at the time t7, as in the control at the time t1, the vertical scanning circuit 30 sets the selection pulse SEL(n+1) of the (n+1)$^{th}$ row to a "High" level and connects the pixels 11 of the (n+1)$^{th}$ row to the vertical signal line 12. Also, simultaneously, the vertical scanning circuit 30 sets the reset pulse RST(n+1) of the same (n+1)$^{th}$ row to a "High" level and outputs the reset signal of the pixel 11 of each column to the vertical signal line 12. Thereby, the signal level (the potential) of the reset signal transferred from the pixel 11 of the (n+1)$^{th}$ row via the vertical signal line 12 is applied to the first electrode of the clamp capacitor 562 within the column circuit 55 corresponding to each column and charges corresponding to the signal level (the potential) of the applied reset signal are stored in the clamp capacitor 562.

Also, at the time t7, the timing generation circuit 20 sets the sampling pulse SH2 to a "High" level to set the second sampling switch 561-2 provided in the pixel output holding unit 56 within the column circuit 55 corresponding to each column to the closed state. Thereby, the signal level (the potential) of the reset signal held in the clamp capacitor 562 is transferred via the second sampling switch 561-2 and is applied to the first electrode of the second sampling capacitor 564-2 within the column circuit 55 corresponding to each column. Also, simultaneously, the horizontal scanning circuit 40 sets the clamp pulse CL2(i) and the clamp pulse CL2(i+1) corresponding to the i$^{th}$ column and the (i+1)$^{th}$ column to a "High" level to set the second clamp switch 563-2 within the column circuit 55 corresponding to each column to a closed state. Thereby, the first electrode of each second sampling capacitor 564-2 is clamped to the clamp level VCOM. Thereby, the second sampling capacitor 564-2 stores charges according to a potential difference between the potential of the reset signal and the clamp level VCOM.

Also, at the time t7, as in the control at the time t1, the horizontal scanning circuit 40 sets the column selection signal CSEL(i) of the i$^{th}$ column to a "High" level to set the column selection switch 53 provided in the column circuit 55 of the i$^{th}$ column to a closed state. At this time, because the sampling pulse SH2 is at a "High" level, the first sampling capacitor selection switch 565-1 provided in the pixel output holding unit 56 within the column circuit 55 corresponding to each column is in a closed state. Thereby, a noise-removed optical signal having a signal level (a potential) according to charges stored in the first sampling capacitor 564-1 within the column circuit 55 of the i$^{th}$ column (a noise-removed optical signal corresponding to the pixel 11 of the n$^{th}$ row) is output to the horizontal signal line 60 via the first sampling capacitor selection switch 565-1, the column output amplifier 52, and the column selection switch 53.

Subsequently, at a time t8, as in control at the time t2, the horizontal scanning circuit 40 sets the clamp pulse CL1(i) of the i$^{th}$ column to a "High" level to set the first clamp switch 563-1 provided in the column circuit 55 of the i$^{th}$ column to a closed state. Thereby, the first electrode of each first sampling capacitor 564-1 is clamped and the column reset signal of the clamp level VCOM is output to the horizontal signal line 60 via the first sampling capacitor selection switch 565-1, the column output amplifier 52, and the column selection switch 53. Here, the noise-removed optical signal corresponding to the pixel 11 of the $n^{th}$ row output by the column circuit 55 to the horizontal signal line 60 at the time t7 and the column reset signal output to the horizontal signal line 60 at a time t8 are used in the correlated double sampling process in the amplification and selection circuit 70.

Subsequently, at a time t9, the horizontal scanning circuit 40 sets the $i^{th}$ column selection signal CSEL(i) and the clamp pulse CL1($i$) to a "Low" level to terminate the reading out of the column pixel signal output by the column circuit 55 of the $i^{th}$ column to the horizontal signal line 60. Then, as in the control at the time t7, the horizontal signal line 60 sets the column selection signal CSEL(i+1) of the $(i+1)^{th}$ column to a "High" level to set the column selection switch 53 provided in the column circuit 55 of the $(i+1)^{th}$ column to a closed state, and causes the noise-removed optical signal of the signal level (the potential) according to charges stored in the first sampling capacitor 564-1 within the column circuit 55 of the $(i+1)^{th}$ column to be output to the horizontal signal line 60 via the first sampling capacitor selection switch 565-1, the column output amplifier 52, and the column selection switch 53.

Subsequently, at a time t10, as in the control at the time t8, the horizontal scanning circuit 40 sets the clamp pulse CL1($i$+1) of the $(i+1)^{th}$ column to a "High" level to set the first clamp switch 563-1 within the column circuit 55 of the $(i+1)^{th}$ column to a closed state, and causes the column reset signal of the column circuit 55 of the $(i+1)^{th}$ column to be output to the horizontal signal line 60 via the first sampling capacitor selection switch 565-1, the column output amplifier 52, and the column selection switch 53.

Subsequently, at a time t11, the horizontal scanning circuit 40 sets the column selection signal CSEL(i+1) and the clamp pulse CL1($i$+1) of the $(i+1)^{th}$ column to a "Low" level, and terminates the reading out of the column pixel signal output by the column circuit 55 of the $(i+1)^{th}$ column to the horizontal signal line 60.

Thereafter, the vertical scanning circuit 30 sets the reset pulse RST(n+1) of the $(n+1)^{th}$ row to a "Low" level to stop the outputting of the reset signal of the pixel 11 of the $(n+1)^{th}$ row of each column to the vertical signal line 12. Also, the horizontal scanning circuit 40 sets the clamp pulse CL2($i$) and the clamp pulse CL2($i$+1) corresponding to each column to a "Low" level to set each second clamp switch 563-2 to an open state, and releases the clamping of each second sampling capacitor 564-2.

Subsequently, at a time t12, the vertical scanning circuit 30 sets the transfer pulse TX(n+1) of the same $(n+1)^{th}$ row to a "High" level and causes the optical signal of the pixel 11 of the $(n+1)^{th}$ row of each column to be output to the vertical signal line 12. Thereby, a signal level (a potential) of the optical signal transferred from the pixel 11 of the $(n+1)^{th}$ row via the vertical signal line 12 is applied to the first electrode of the clamp capacitor 562 within the column circuit 55 corresponding to each column and charges corresponding to the signal level (the potential) of the applied optical signal are stored in the clamp capacitor 562.

Because the sampling pulse SH2 is at a "High" level at the time t12, the second sampling switch 561-2 in each column circuit 55 is in the closed state. Therefore, the signal level (the potential) of the optical signal held in the clamp capacitor 562 is transferred via the second sampling switch 561-2 and applied to the first electrode of the second sampling capacitor 564-2. Thereby, the second sampling capacitor 564-2 stores charges according to the potential difference between the potential of the optical signal and the stored potential (that is, the potential of the potential difference between the reset signal of the pixel 11 of the $(n+1)^{th}$ row and the clamp level VCOM). Here, a potential corresponding to the charges stored in the second sampling capacitor 564-2 is a noise-removed optical signal corresponding to the pixel 11 of the $(n+1)^{th}$ row.

Thereafter, the vertical scanning circuit 30 sets the transfer pulse TX(n+1) of the $(n+1)^{th}$ row to a "Low" level to stop the outputting of the optical signal of the pixel 11 of the $(n+1)^{th}$ row of each column to the vertical signal line 12. Also, the timing generation circuit 20 sets the sampling pulse SH2 to a "Low" level to set the second sampling switch 561-2 within each column circuit 55 to an open state, terminates the transfer of the signal level (the potential) of the optical signal held in the clamp capacitor 562 to the second sampling capacitor 564-2, and terminates the sampling of the pixel signal output by the pixel 11 of the $(n+1)^{th}$ row to which the column circuit 55 corresponds. Thereafter, the vertical scanning circuit 30 sets the selection pulse SEL(n+1) of the $(n+1)^{th}$ row to a "Low" level and disconnects the connection with the vertical signal line 12 of each pixel 11 of the $(n+1)^{th}$ row.

Thereafter, likewise, the timing generation circuit 20 and the horizontal scanning circuit 40 alternately select the first sampling capacitor 564-1 or the second sampling capacitor 564-2 to cause the correlated double sampling process based on the pixel signal output by the pixel 11 and the holding of the noise-removed optical signal to be performed. Also, likewise, the timing generation circuit 20 and the horizontal scanning circuit 40 alternately select the second sampling capacitor 564-2 or the first sampling capacitor 564-1 to cause the noise-removed optical signal and the column reset signal to be output to the horizontal signal line 60.

As described above, the column circuit 55 can perform the holding of the noise-removed optical signal corresponding to the pixel 11 and the outputting of the noise-removed optical signal to the horizontal signal line 60 in the same period for each row of the pixels 11. Thereby, in the solid-state imaging device 3 including the column circuit 55, it is possible to expect the improvement of a speed at which the output signal VOUT is output more than in the solid-state imaging device 1 of the first embodiment without increasing an operation speed of a component for controlling the column circuit 55 (for example, a frequency of a clock signal).

Also, in the example of the driving timing shown in FIG. 12, an example in which control is performed so that the previously held noise-removed optical signal is output to the horizontal signal line 60 during the period when the reset signal is output from the pixel 11 to the vertical signal line 12 is shown. However, if a timing at which the previously held noise-removed optical signal is output to the horizontal signal line 60 is a period during which the optical signal or the reset signal output from the pixel 11 is sampled (that is, a period during which the noise-removed optical signal is not held and the sampling capacitor is selected), the previously held noise-removed optical signal may be output to the horizontal signal line 60 at any timing.

Figure 13:
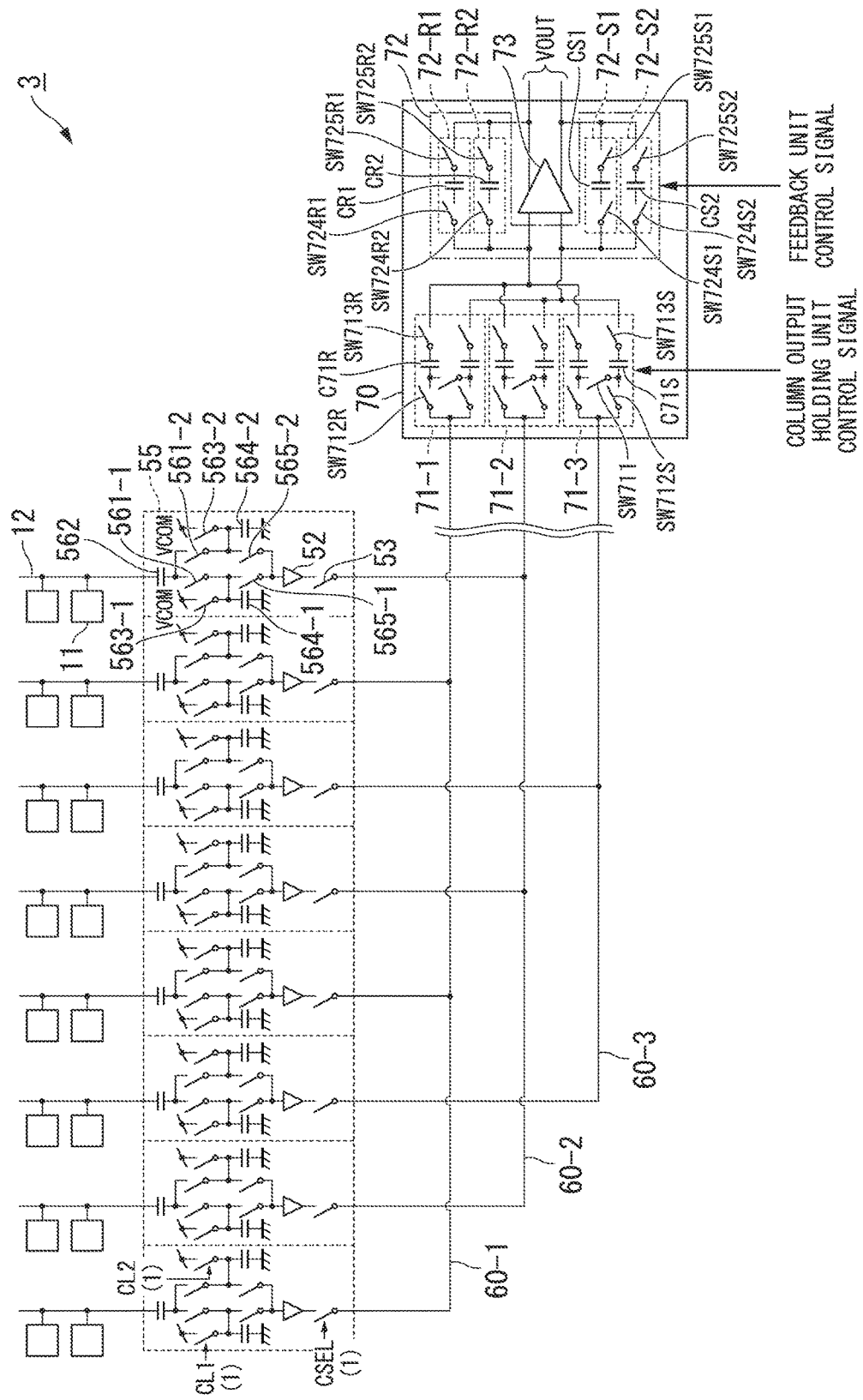
FIG. 13 is a circuit diagram showing an example of a schematic configuration of a pixel, a column circuit, and an amplification and selection circuit provided in the solid-state imaging device according to the third embodiment of the present invention.
Figure 14:
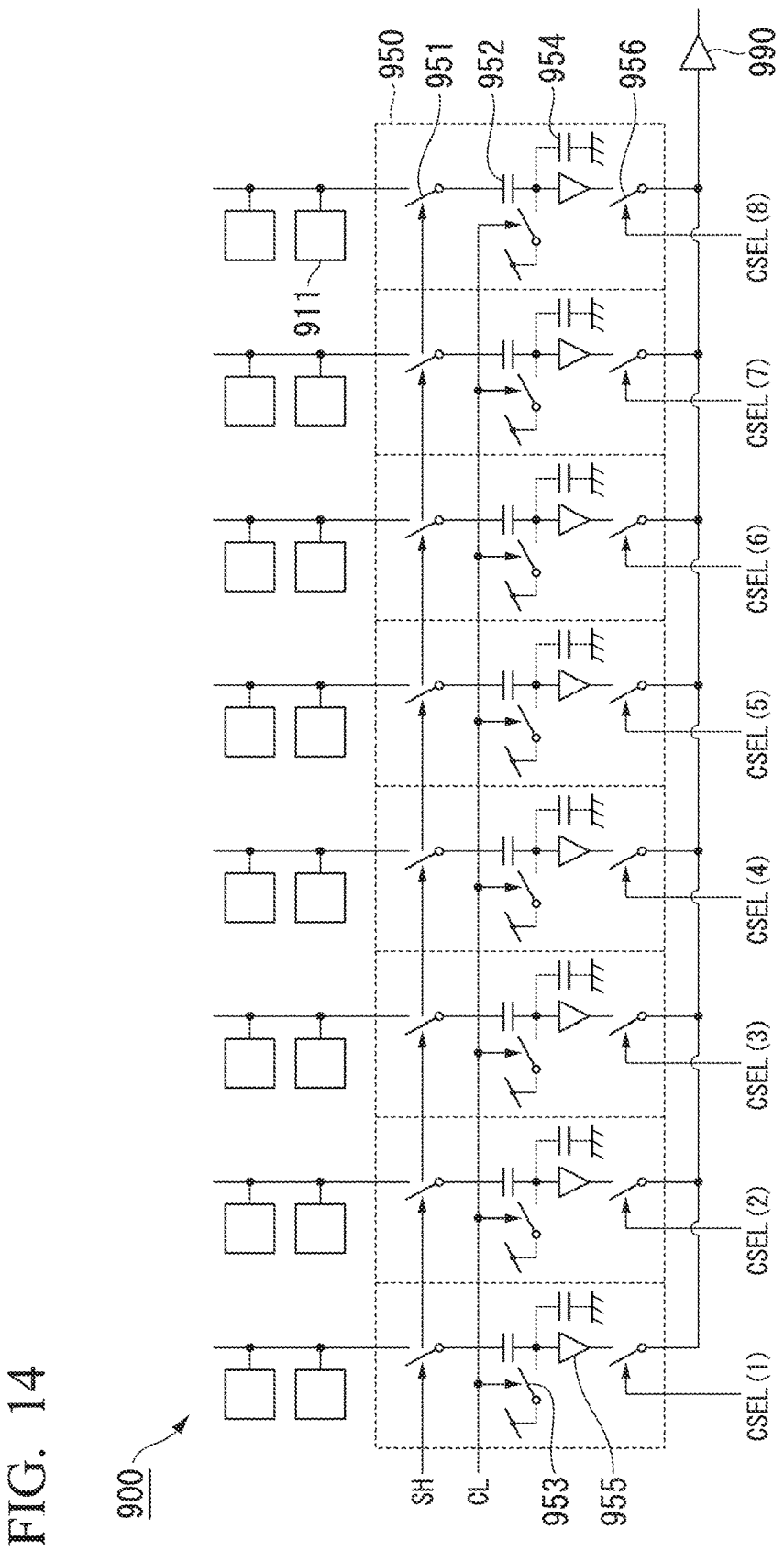
FIG. 14 is a circuit diagram showing a schematic configuration of a conventional solid-state imaging device including a column circuit.
Figure 15:
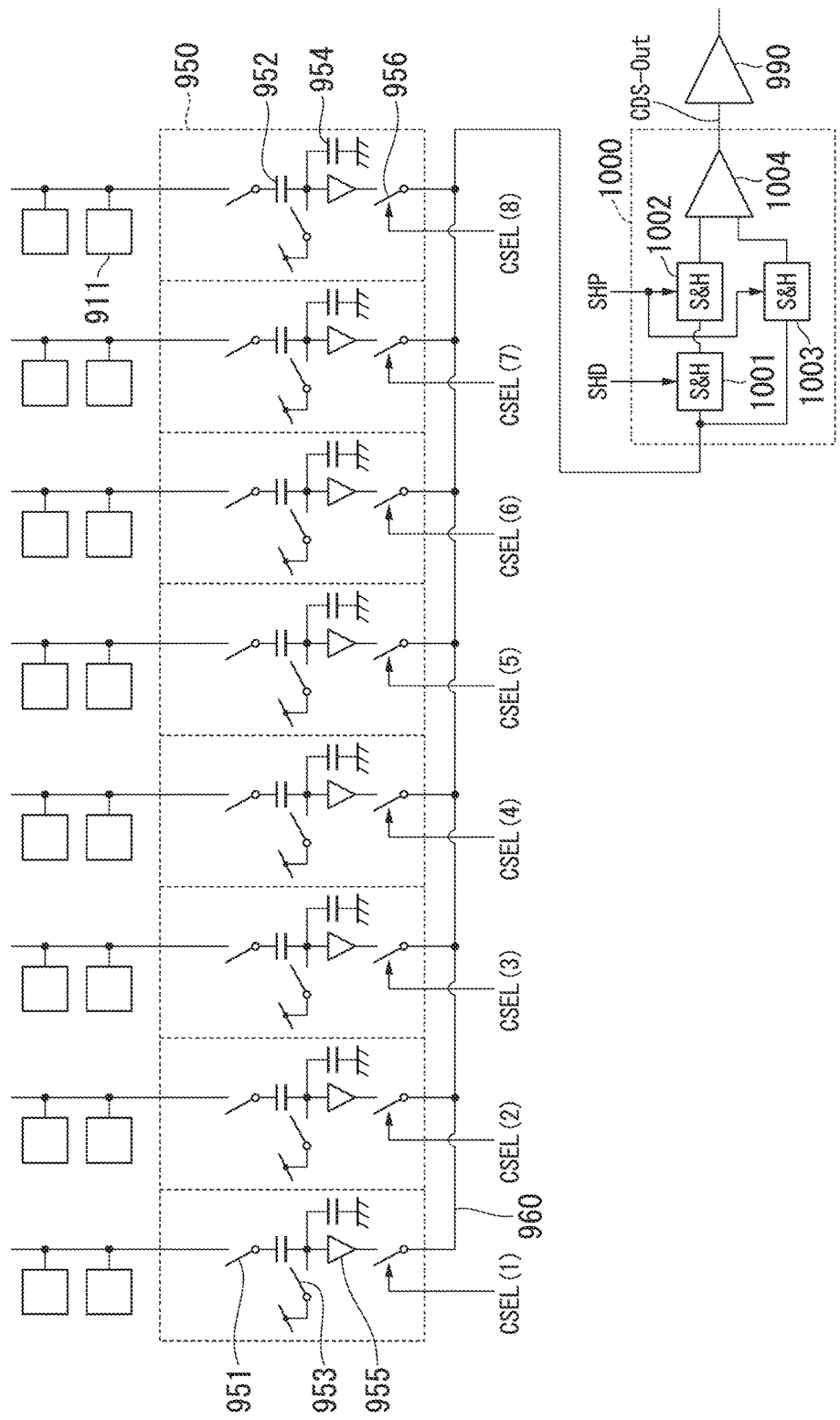
FIG. 15 is a circuit diagram showing a schematic configuration of a conventional solid-state imaging device including a correlated double sampling circuit in a stage previous to an output amplifier.
Figure 16:
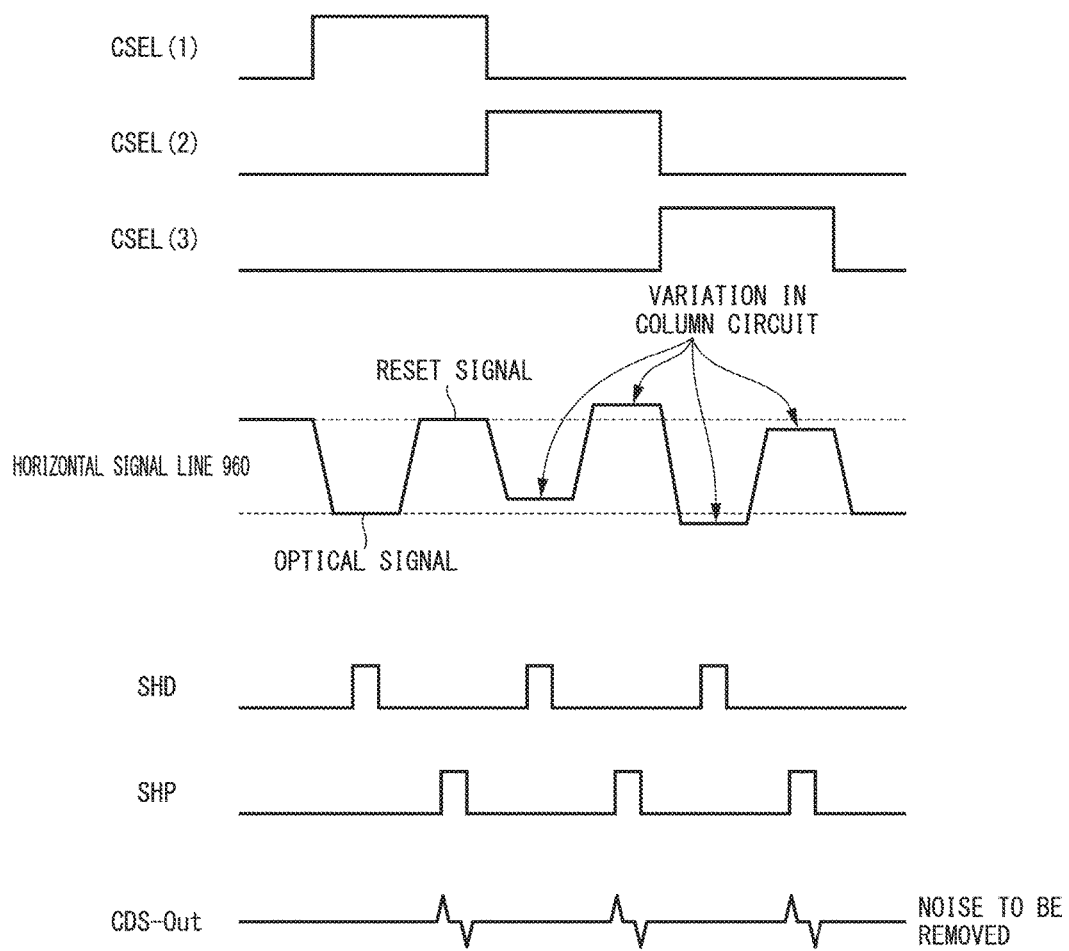
FIG. 16 is a timing chart showing an example of a driving timing in a conventional solid-state imaging device including a correlated double sampling circuit in a stage previous to an output amplifier.

Next, the configuration of the solid-state imaging device 3 of the third embodiment will be described. FIG. 13 is a circuit diagram showing an example of a schematic configuration of the pixel 11, the column circuit 55, and the amplification and selection circuit 70 provided in the solid-state imaging device 3 according to the third embodiment of the present invention. In FIG. 13, an example of a configuration including the column circuit 55 instead of the column circuit 50 provided in the solid-state imaging device 1 of the first embodiment is shown. More specifically, in FIG. 13, an example of a configuration of the solid-state imaging device 3 in which the pixel array unit 10 in which the pixels 11 two-dimensionally arranged in two rows and eight columns is provided and eight column circuits 55 corresponding to the pixels 11 of the columns are arranged and each of adjacent column circuits 55 outputs a column pixel signal to any one of three different horizontal signal lines 60 (horizontal signal lines 60-1 to 60-3) is shown.

Also, in FIG. 13, as in the case of FIG. 6 described in the solid-state imaging device 1 of the first embodiment, in each of three column output holding units 71 provided in the amplification and selection circuit 70, only the sampling capacitor C71R, the sampling capacitor C71S, the switch SW711, the switch SW712R, the switch SW712S, the switch SW713R, and the switch SW713S are shown.

Also, in FIG. 13, as in FIG. 6 described in the solid-state imaging device 1 of the first embodiment, in the feedback unit 72 provided in the amplification and selection circuit 70, only the switch SW724R1, the feedback capacitor CR1, the switch SW725R1, the switch SW724R2, the feedback capacitor CR2, the switch SW725R2, the switch SW724S1, the feedback capacitor CS1, the switch SW725S1, the switch SW724S2, the feedback capacitor CS2, and the switch SW725S2 are shown. Also, in FIG. 13, as in FIG. 6 described in the solid-state imaging device 1 of the first embodiment, the components in the feedback unit 72 are shown to be integrated into any one of the feedback circuit 72-R1, the feedback circuit 72-R2, the feedback circuit 72-S1, or the feedback circuit 72-S2.

Also in FIG. 13, as in FIG. 6 described in the solid-state imaging device 1 of the first embodiment, a configuration in which input terminals of the feedback circuit 72-R1 and the feedback circuit 72-R2 (first terminals of the switch SW724R1 and the switch SW724R2) are connected to an inverting input terminal of the differential amplification circuit 73 and a column reset signal are input from each the column output holding unit 71 is shown. Also, a configuration in which input terminals of the feedback circuit 72-S1 and the feedback circuit 72-S2 (first terminal of the switch SW724S1 and the switch SW724S2) are connected to a non-inverting input terminal of the differential amplification circuit 73 and the noise-removed optical signal is input from each column output holding unit 71 is shown.

In the solid-state imaging device 3, as in the solid-state imaging device 1 of the first embodiment, the horizontal scanning circuit 40 sequentially selects the column circuits 55 to cause the column pixel signals to be sequentially output from the column circuits 55 to the connected horizontal signal lines 60, and transfers the column pixel signals to the amplification and selection circuit 70. Also, in the solid-state imaging device 3, as in the solid-state imaging device 1 of the first embodiment, the timing generation circuit 20 outputs a column output holding unit control signal for controlling the operation of each column output holding unit 71 and a feedback unit control signal for controlling the operation of the feedback unit 72, so that an output signal obtained by performing the correlated double sampling process on the basis of the column pixel signal transferred via each horizontal signal line 60 is output. Here, column output holding unit control signals corresponding to the column output holding unit 71-1 are the control signal SHR1, the control signal SHS1, and the control signal CB1. Also, column output holding unit control signals corresponding to the column output holding unit 71-2 are the control signal SHR2, the control signal SHS2, and the control signal CB2. Also, column output holding unit control signals corresponding to the column output holding unit 71-3 are the control signal SHR3, the control signal SHS3, and the control signal CB3.

Also, timings of the series of operations in the solid-state imaging device 3 having the configuration shown in FIG. 13 can be conceived to be similar to those of FIG. 7 described in the solid-state imaging device 1 of the first embodiment, except that a driving timing for holding a noise-removed optical signal in the column circuit 55 and outputting a column pixel signal from the column circuit 55 to the horizontal signal line 60 is different, as shown in FIG. 12. Accordingly, a detailed description of the timings of the series of operations in the solid-state imaging device 3 will be omitted.

As described above, in the solid-state imaging device 3, as in the solid-state imaging device 1 of the first embodiment, the amplification and selection circuit 70 minimizes deterioration of image quality due to the column circuit 50, and it is possible to improve a speed at which the output signal VOUT is output without increasing power consumption.

Also, in the solid-state imaging device 3, because it is possible to cause the column circuit 55 to perform the holding of the noise-removed optical signal and the outputting of the noise-removed optical signal to the horizontal signal line 60 in the same period for each row of the pixels 11, it is possible to expect the improvement of a speed at which the output signal VOUT is output more than in the solid-state imaging device 1 of the first embodiment.

Since the arrangement of the components provided in the solid-state imaging device 3 can be conceived as being similar to the arrangement of the components provided in the solid-state imaging device 1 of the first embodiment, a detailed description thereof will be omitted.

According to the third embodiment, there is provided a method of driving a solid-state imaging device (the solid-state imaging device 3) in which a column circuit (the column circuit 55) includes a signal storage unit (the first sampling capacitor 564-1 and the second sampling capacitor 564-2) configured to hold column pixel signals (noise-removed optical signals) according to pixel signals (an optical signal and a reset signal) output by pixels (the pixels 11) arranged in a plurality of rows in a corresponding column and in which the column circuit 55 causes holding of the noise-removed optical signal according to the optical signal and the reset signal output by the pixel 11 arranged in any row for the first sampling capacitor 564-1 or the second sampling capacitor 564-2 and outputting of the held noise-removed optical signal according to the optical signal and the reset signal output by the pixel 11 arranged in another row to be performed in parallel in the same period.

As described above, the solid-state imaging device 3 of the third embodiment can also obtain advantageous effects similar to those of the solid-state imaging device 1 of the first embodiment. Further, in the solid-state imaging device 3 according to the third embodiment, because the column circuit 55 is provided to perform the holding of the noise-removed optical signal and the outputting of the noise-removed optical signal to the horizontal signal line 60 in the same period for each row of the pixels 11, it is possible to expect the improvement of a speed at which the output signal VOUT is output more than in the solid-state imaging device 1 of the first embodiment.

Also, although an example of a configuration when the column circuit 55 is applied to the configuration of the solid-state imaging device 1 according to the first embodiment is shown in FIG. 13, the configuration of the solid-state imaging device to which the column circuit 55 is not limited to the configuration shown in FIG. 13. For example, a configuration including the column circuit 55 may be adopted instead of the column circuit 50 provided in the solid-state imaging device 2 of the second embodiment.

As described above, according to the embodiments of the present invention, at least three horizontal signal lines are provided in the solid-state imaging device, and the column circuits corresponding to the pixel columns are classified and periodically connected to the three horizontal signal lines such that two adjacent column circuits are connected to different horizontal signal lines periodically. Then, control is performed so that the outputting of the optical signal (the noise-removed optical signal) after noise removal from one column circuit of the two adjacent column circuits connected to different horizontal signal lines to the connected horizontal signal line and the outputting of the reset signal (the column reset signal) in the column circuit from the other column circuit to the connected horizontal signal line are performed in parallel in the same period. Also, according to the embodiments of the present invention, column output holding units corresponding to horizontal signal lines and configured to hold each of the noise-removed optical signal and the column reset signal transferred via the corresponding horizontal signal line are provided to be equal in number to horizontal signal lines, and a CDS circuit (an amplification and selection circuit) having two sets of feedback circuits corresponding to the noise-removed optical signal and the column reset signal output from the column output holding unit is provided. Then, control is performed so that the optical signal holding operation, the reset signal holding operation, and the signal output operation in the column output holding unit do not overlap between different column output holding units and control is performed so that a difference signal between a noise-removed optical signal and a column reset signal output by each column output holding unit is amplified by alternately switching sets of feedback circuits for use in amplification when any column output holding unit performs the signal output operation. Thereby, in each embodiment of the present invention, it is possible to minimize deterioration of image quality caused by the column circuit, such as a difference (variation) in characteristics of the column output amplifiers provided in the column circuits and improve a speed at which an output signal obtained by amplifying a differential signal is output.

Also, in the embodiments of the present invention, the case in which the amplification and selection circuit 70 operates in the order of the optical signal holding operation, the reset signal holding operation, and the signal output operation, so that a difference signal between a differential positive signal and a differential negative signal output by any column output holding unit 71 is amplified and output to the analog-to-digital conversion circuit 80 has been described. However, according to the configuration of the column circuit provided in the solid-state imaging device, a configuration in which the column reset signal is output to the horizontal signal line 60 first and then the noise-removed optical signal is output to the horizontal signal line 60 is also conceived. In this case, it is possible to perform control as in an operation described in each embodiment of the present invention by reversing the order of the optical signal holding operation and the reset signal holding operation in the amplification and selection circuit 70.

While preferred embodiments of the present invention have been described and shown above, it should be understood that these are exemplary of the invention and the present invention is not limited to these embodiments and modified examples thereof. Within a range not departing from the gist or spirit of the present invention, additions, omissions, substitutions, and other modifications to the constitution can be made.

Also, the present invention is not to be considered as being limited by the foregoing description, and is limited only by the scope of the appended claims.

Also, in the solid-state imaging device according to each embodiment of the present invention, two semiconductor substrates may be connected by an inter-substrate connection portion or three or more semiconductor substrates may be connected by an inter-substrate connection portion. In the case of a solid-state imaging device in which three or more semiconductor substrates are connected by an inter-substrate connection portion, two semiconductor substrates among them correspond to the first semiconductor substrate and the second semiconductor substrate according to the claims.

What is claimed is:

1. A method of driving a solid-state imaging device, the solid-state imaging device comprising:

a plurality of column circuits which are arranged for each column of a plurality of pixels arranged in a matrix and configured to output a column pixel signal according to a pixel signal output by a pixel of a corresponding column, to which the plurality column circuits are periodically classified and connected, the plurality of horizontal signal lines being configured to transfer the column pixel signal output by any one of the connected column circuits and a column reset signal when the column circuit having output the column pixel signal is reset, and an amplification and selection circuit configured to select and sequentially sample either of the column pixel signal and the column reset signal transferred by each of the plurality of horizontal signal lines, and to amplify a differential signal based on the column pixel signal and the column reset signal output from the same column circuit and output the amplified differential signal, the method comprising:

causing the amplification and selection circuit to perform at least two operations among a first operation of sampling the column pixel signal, a second operation of sampling the column reset signal, and a third operation of amplifying the differential signal and outputting the amplified differential signal in parallel in the same period; and causing components connected to different horizontal signal lines to perform operations corresponding to the first operation, the second operation, and the third operation in that order, and causing the components to perform different operations in parallel in the same period with respect to the first to third operations.

2. The method of driving the solid-state imaging device according to claim 1, wherein the amplification and selection circuit includes:

a plurality of column output holding units corresponding to the plurality of horizontal signal lines, including a sampling capacitor configured to hold the column pixel signal transferred by the corresponding horizontal signal line in the first operation and to hold the column reset signal transferred by the corresponding horizontal signal line in the second operation, and configured to output a differential signal into which a signal of a difference between the column pixel signal and the column reset signal held in the sampling capacitor is converted in the third operation;

a feedback unit corresponding to all the plurality of column output holding units, including a first feedback capacitor and a second feedback capacitor for amplifying a signal, and configured to alternately switch a feedback capacitor for amplifying the differential signal output from the column output holding unit to either one of the first feedback capacitor and the second feedback capacitor for every third operation; and a differential amplification circuit configured to amplify the output differential signal to output the amplified differential signal as the difference signal in accordance with a ratio between the sampling capacitor provided in the column output holding unit configured to output the differential signal and the first feedback capacitor or the second feedback capacitor to which the feedback capacitor is switched in the third operation, and wherein, during a period in which the differential amplification circuit performs the third operation, the method includes, causing one column circuit and another column circuit among adjacent column circuits connected to the horizontal signal lines different from the horizontal signal line corresponding to the column output holding unit configured to output the differential signal in the third operation to output the column pixel signal and the column reset signal, respectively, in parallel in the same period;

causing the column output holding unit, which performs the first operation corresponding to the horizontal signal line by which the column pixel signal is transferred, to hold the transferred column pixel signal;

causing the column output holding unit, which performs the second operation corresponding to the horizontal signal line by which the column reset signal is transferred, to hold the transferred column reset signal; and causing the differential amplification circuit to be initialized during a period in which the first operation, the second operation, and the third operation are switched.

3. The method of driving the solid-state imaging device according to claim 1, wherein the amplification and selection circuit includes:

a plurality of column output holding units corresponding to the plurality of horizontal signal lines, including a sampling capacitor configured to hold the column pixel signal transferred by the corresponding horizontal signal line in the first operation and to hold the column reset signal transferred by the corresponding horizontal signal line in the second operation, and configured to output a differential signal into which a signal of a difference between the column pixel signal and the column reset signal held in the sampling capacitor is converted in the third operation;

a feedback unit corresponding to all the plurality of column output holding units, including a first feedback capacitor and a second feedback capacitor for amplifying a signal, and configured to alternately switch a feedback capacitor for amplifying the differential signal output from the column output holding unit to either one of the first feedback capacitor and the second feedback capacitor for every third operation; and a differential amplification circuit configured to amplify the output differential signal to output the amplified differential signal as the difference signal in accordance with a ratio between the sampling capacitor provided in the column output holding unit configured to output the differential signal and the first feedback capacitor or the second feedback capacitor to which the feedback capacitor is switched in the third operation, and wherein the method includes:

setting a group for every predetermined number of different horizontal signal lines and causing the column pixel signal and the column reset signal to be sequentially output simultaneously from different column circuits connected to the horizontal signal lines belonging to the same group to the connected horizontal signal lines;

causing the column output holding units, each of which performs the first operation corresponding to the horizontal signal line by which the column pixel signal is transferred, to simultaneously hold transferred column pixel signals;

causing the column output holding units, each of which performs the second operation corresponding to the horizontal signal line by which the column reset signal is transferred, to simultaneously hold transferred column reset signals;

causing each column output holding unit, which outputs the differential signal in the third operation, to exclusively output the differential signal and causing the column output holding unit, which does not output the differential signal to maintain hold states of the column pixel signal and the column reset signal or a hold state of the differential signal; and causing the differential amplification circuit to be initialized during a period in which the first operation, the second operation, and the third operation are switched.

4. The method of driving the solid-state imaging device according to claim 1, wherein the column circuit includes a signal storage unit configured to hold column pixel signals according to pixel signals output by pixels arranged in a plurality of rows in a corresponding column, and wherein the column circuit causes holding of the column pixel signal according to the pixel signal output by the pixel arranged in any row for the signal storage unit and outputting of the held column pixel signal according to the pixel signal output by the pixel arranged in another row to be performed in parallel in the same period.

5. A solid-state imaging device comprising:

a plurality of column circuits which are arranged for each column of a plurality of pixels arranged in a matrix and configured to output a column pixel signal according to a pixel signal output by a pixel of a corresponding column, to which the plurality column circuits are periodically classified and connected, the plurality of horizontal signal lines being configured to transfer the column pixel signal output by any one of the connected column circuits and a column reset signal when the column circuit having output the column pixel signal is reset, and an amplification and selection circuit configured to select and sequentially sample either of the column pixel signal and the column reset signal transferred by each of the plurality of horizontal signal lines, and to amplify a differential signal based on the column pixel signal and the column reset signal output from the same column circuit and output the amplified differential signal, the amplification and selection circuit including:

a plurality of column output holding units corresponding to the plurality of horizontal signal lines, including a sampling capacitor configured to hold the column pixel signal transferred by the corresponding horizontal signal line in a first operation of sampling the column pixel signal and to hold the column reset signal transferred by the corresponding horizontal signal line in a second operation of sampling the column reset signal, and configured to output a differential signal into which a signal of a difference between the column pixel signal and the column reset signal held in the sampling capacitor is converted in a third operation of amplifying the difference signal to output the amplified difference signal;

a feedback unit corresponding to all the plurality of column output holding units, including a first feedback capacitor and a second feedback capacitor for amplifying a signal, and configured to alternately switch a feedback capacitor for amplifying the differential signal output from the column output holding unit to either one of the first feedback capacitor and the second feedback capacitor for every third operation; and a differential amplification circuit configured to amplify the output differential signal to output the amplified differential signal as the difference signal in accordance with a ratio between the sampling capacitor provided in the column output holding unit configured to output the differential signal and the first feedback capacitor or the second feedback capacitor to which the feedback capacitor is switched in the third operation, wherein components provided in the amplification and selection circuit are vicinity to each other so that a wiring length between the differential amplification circuit and the sampling capacitor provided in the column output holding unit arranged at a position farthest from the differential amplification circuit becomes shorter than a wiring length of the horizontal signal line between the sampling capacitor and the column circuit arranged at a farthest position in the horizontal signal line.

6. The solid-state imaging device according to claim 5, further comprising:

a first semiconductor substrate on which light is incident, a second semiconductor substrate stacked on a surface of the first semiconductor substrate, the surface being opposite to a surface on which the light is incident, and an inter-substrate connection portion which electrically connects the first semiconductor substrate to the second semiconductor substrate, wherein, at least the plurality of pixels arranged in the matrix are formed on the first semiconductor substrate, and at least the amplification and selection circuit is formed on the second semiconductor substrate.

* * * * *